(12) United States Patent
Fink

(10) Patent No.: US 9,074,892 B2
(45) Date of Patent: Jul. 7, 2015

(54) SYSTEM AND METHOD OF DETERMINING A POSITION OF A REMOTE OBJECT

(71) Applicant: Ian Michael Fink, Austin, TX (US)

(72) Inventor: Ian Michael Fink, Austin, TX (US)

( * ) Notice: Subject to any disclaimer, the term of this patent is extended or adjusted under 35 U.S.C. 154(b) by 0 days.

(21) Appl. No.: 13/837,853

(22) Filed: Mar. 15, 2013

(65) Prior Publication Data

US 2014/0278075 A1    Sep. 18, 2014

(51) Int. Cl.
| | |
|---|---|
| G01C 21/00 | (2006.01) |
| G01C 21/04 | (2006.01) |
| G06F 17/00 | (2006.01) |
| G06F 17/10 | (2006.01) |
| G01C 3/00 | (2006.01) |

(52) U.S. Cl.
CPC .............. *G01C 21/00* (2013.01); *G01C 21/04* (2013.01); *G06F 17/00* (2013.01); *G06F 17/10* (2013.01); *G01C 3/00* (2013.01)

(58) Field of Classification Search
CPC .......... G01C 21/00; G01C 21/04; G01C 3/00; G06F 17/00; G06F 17/10
USPC .................................................. 701/468, 408
See application file for complete search history.

(56) References Cited

U.S. PATENT DOCUMENTS

| | | | |
|---|---|---|---|
| 3,952,420 | A | 4/1976 | Benjamin et al. |
| 4,134,681 | A | 1/1979 | Elmer |
| 4,866,626 | A | 9/1989 | Egli |
| 5,109,346 | A | 4/1992 | Wertz |
| 5,420,592 | A | 5/1995 | Johnson |
| 5,663,734 | A * | 9/1997 | Krasner .................... 342/357.25 |
| 5,831,572 | A | 11/1998 | Damilano |
| 6,025,790 | A | 2/2000 | Saneyoshi |
| 6,028,955 | A | 2/2000 | Cohen et al. |
| 6,377,906 | B1 | 4/2002 | Rowe |
| 6,417,801 | B1 | 7/2002 | van Diggelen |
| 6,535,282 | B2 | 3/2003 | Hedges et al. |
| 6,606,346 | B2 | 8/2003 | Abraham et al. |
| 6,651,000 | B2 | 11/2003 | van Diggelen et al. |
| 6,678,589 | B2 | 1/2004 | Robertson et al. |
| 6,842,246 | B2 | 1/2005 | Roufas et al. |
| 6,894,490 | B2 | 5/2005 | Lescourret |
| 6,922,632 | B2 | 7/2005 | Foxlin |
| 6,937,187 | B2 | 8/2005 | van Diggelen et al. |
| 6,980,921 | B2 | 12/2005 | Anderson et al. |

(Continued)

OTHER PUBLICATIONS

Fletcher Dunn and Ian Paraberry, *3D Math Primer for Graphics and Game Development*, 2002, Wordware Publishing, Inc., USA.

(Continued)

*Primary Examiner* — Mary Cheung
*Assistant Examiner* — Brian P Sweeney

(57) ABSTRACT

In one or more embodiments, one or more systems, methods and/or processes may determine a location of a remote object (e.g., a point and/or area of interest, landmark, structure that "looks interesting", buoy, anchored boat, etc.). For example, the location of a remote object may be determined via a first bearing, at a first location, and a second bearing, at a second location, to the remote object. For instance, the first and second locations can be determined via a position device, such as a global positioning system device. In one or more embodiments, the location of the remote object may be based on the first location, the second location, the first bearing, and the second bearing. For example, the location of the remote object may be provided to a user via a map. For instance, turn-by-turn direction to the location of the remote object may be provided to the user.

44 Claims, 63 Drawing Sheets

(56) References Cited

U.S. PATENT DOCUMENTS

| | | |
|---|---|---|
| 7,050,102 B1 | 5/2006 | Vincent |
| 7,106,189 B2 | 9/2006 | Burneske et al. |
| 7,522,999 B2 | 4/2009 | Wence et al. |
| 7,803,054 B1 | 9/2010 | Ogus et al. |
| 8,174,568 B2 | 5/2012 | Samarasekera et al. |
| 8,521,428 B1 | 8/2013 | Liccardo et al. |
| 8,682,581 B2 | 3/2014 | Psiaki et al. |
| 2003/0195907 A1 | 10/2003 | Budge |
| 2004/0107070 A1 | 6/2004 | Anderson |
| 2004/0125151 A1 | 7/2004 | Hamilton |
| 2004/0141187 A1 | 7/2004 | Johnston |
| 2005/0007371 A1 | 1/2005 | Nam et al. |
| 2005/0039176 A1 | 2/2005 | Fournie |
| 2005/0069174 A1 | 3/2005 | Uchiyama et al. |
| 2005/0242947 A1 | 11/2005 | Burneske |
| 2006/0038718 A1 | 2/2006 | Arakane et al. |
| 2006/0227039 A1 | 10/2006 | Schroeder et al. |
| 2007/0052950 A1 | 3/2007 | Taylor et al. |

OTHER PUBLICATIONS

Jack B. Kuipers, *Quaternions and Rotation Sequences*, 2002, Princeton University Press, USA.
Andrew J. Janson, *Visulizing Quaternions*, 2006, Morgan Kaufmann Publishers, USA.
Chris Hecker, "Physics, Part 4: The Third Dimension", *Game Developer Magazine*, Jun. 1997, pp. 15-22, USA.
Arthur S. Hathaway, *A Primer on Quaternions*, Feb. 2006, Project Gutenberg, USA.
Geoffrey Blewitt, "Basics of the GPS Technique: Observation Equations", 1997.
William Rowan Hamilton, "On Quaternions, or on a New System of Imaginaries in Algebra", *The London, Edinburg and Dublin Philosophical Magazine and Journal of Science*, 1844-1850, vols. xxv-xxxvi, edited 2000.
Alexander MacFarlane, *Vector Analysis and Quaternions*, Oct. 5, 2004, Project Gutenberg, USA.
I. Todhunter, *Spherical Trigonometry*, Nov. 12, 2006, Project Gutenberg, USA.
Ocean Server Technology, Inc., "Digital Compass Users Guide, OS5000 Series", 2007-2010, USA.
STMicroelectronics, "LSM303DLM, Sensor Module: 3-axis accelerometer and 3-axis magnetometer", Apr. 2011.
Elliot D. Kaplan and Christopher J. Hegarty, *Understanding GPS: Principles and Applications*, 2nd ed., 2006, Artech House, Inc., USA.
Eric Lengyel, *Mathematics for 3D Game Programming and Computer Graphics*, 3rd ed., 2012, Course Technology, USA.
Amed El-Rabbany, *Introduction to GPS: The Global Positioning System*, 2nd ed., 2006, Artech House, Inc., USA.

\* cited by examiner

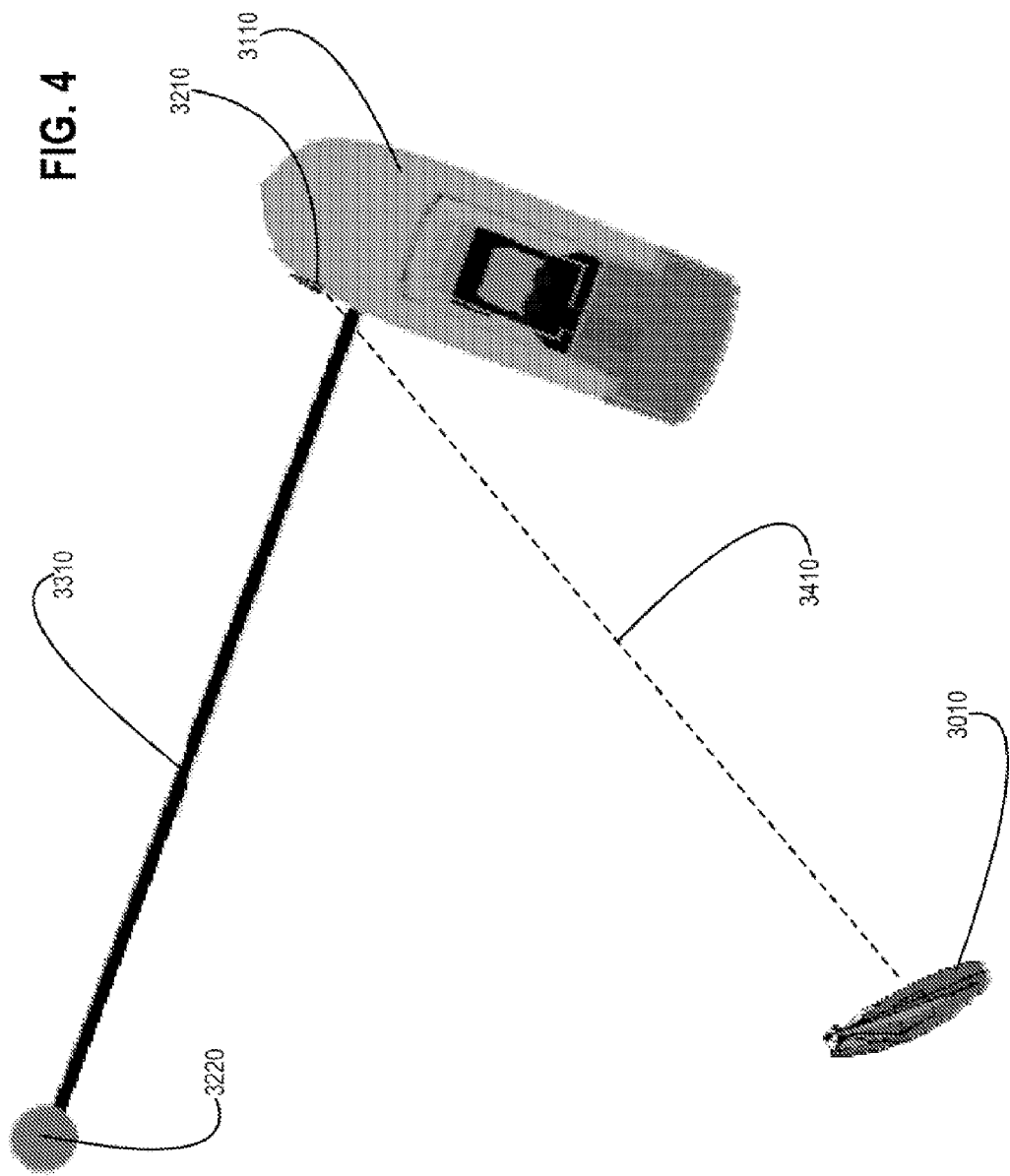

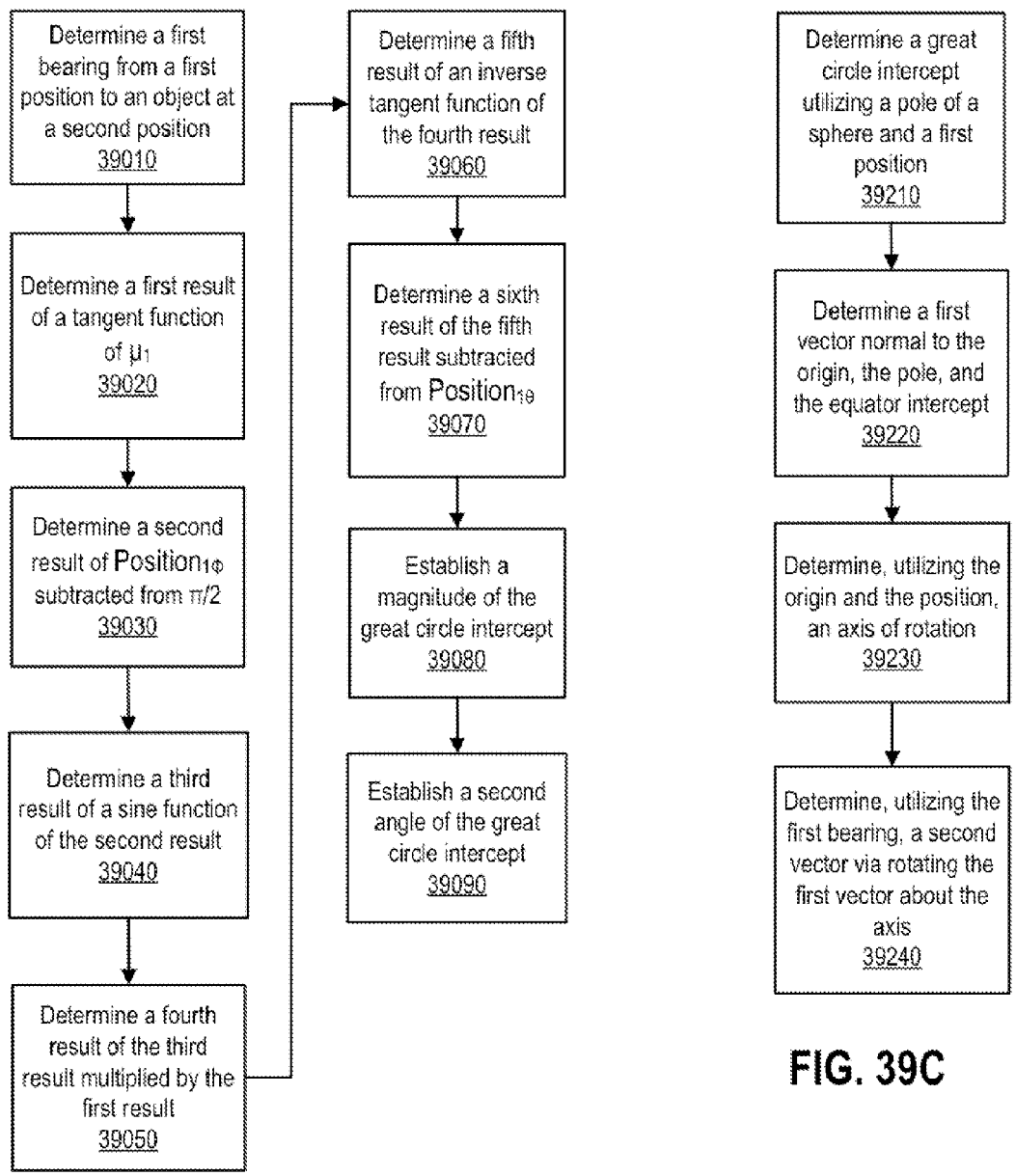

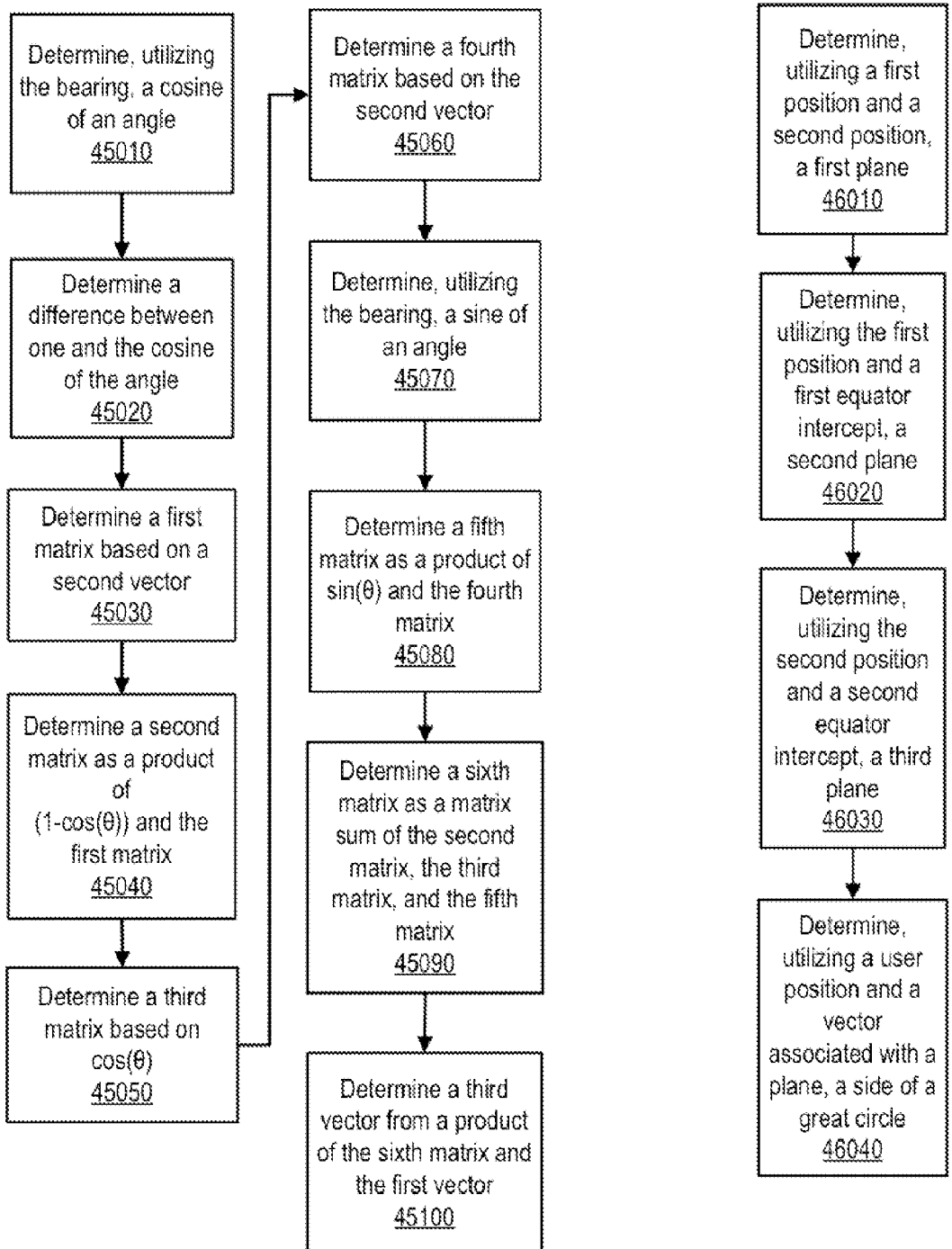

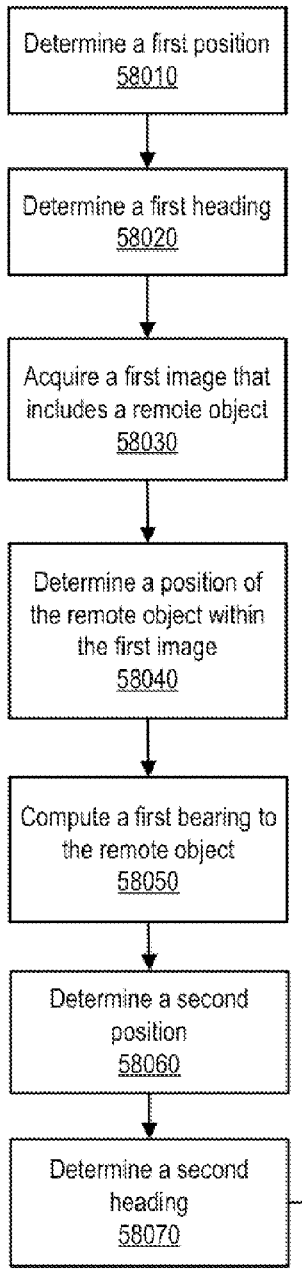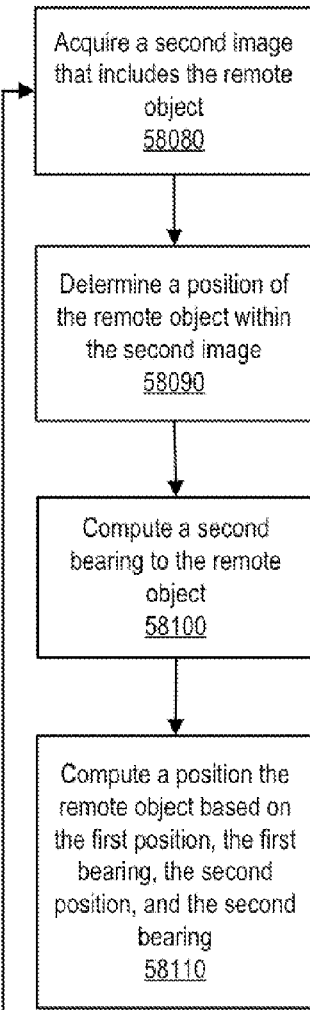
FIG. 58
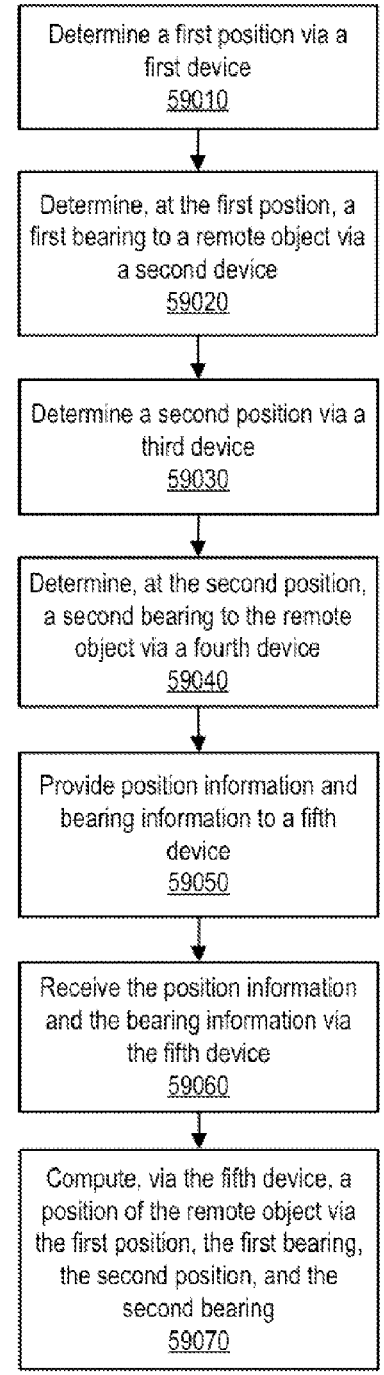
FIG. 59

SYSTEM AND METHOD OF DETERMINING A POSITION OF A REMOTE OBJECT

BACKGROUND

1. Technical Field

This disclosure relates generally to the field of navigation systems, and, more specifically, this disclosure pertains to the field of determining a position of a remote object via one or more mobile devices.

2. Description of the Related Art

In the past, determining a position of an end of a starting line of a sailboat race included maneuvering and/or positioning a vessel to a point proximate to the end of the starting line. As illustrated in FIG. 1A, a vessel 1010 may include a position device (e.g., a global positioning system (GPS) receiver and processor) that may determine a position of an antenna included in or coupled to the position device, where vessel 1010 is positioned proximate to staff 1210 which is used to form a first end of a starting line 1310. As shown, staff 1210 may be mounted on a vessel 1110 (e.g., a race committee boat). A second end of starting line 1310 is formed using object 1220 (e.g., a buoy, a floating tetrahedron, a vessel, etc.). As illustrated in FIG. 1B, vessel 1010 is positioned proximate to object 1220 which is used to form the second end of starting line 1310. After two positions respectively corresponding to the two ends of starting line 1310 are determined, a distance to starting line 1310 may be determined from another position of vessel 1110.

One or more issues may be or become problematic when utilizing one or more systems and/or methods of the past. In one example, a starting area may be "crowded". For instance, the starting area may be "crowded" with multiple vessels, such as vessels 1010-1018, and an amount of time may not exist for one or more of the multiple vessels 1010-1018 to determine the two ends of the line. In a second example, one or more ends of the starting line may be moved by the race committee, and an amount of time may not exist for one or more of the multiple vessels 1010-1018 to determine the two ends of the line. For instance, the race committee may move object 1220 from a first position to a second position and start a race shortly (e.g., one to five minutes) after moving object 1220 from the first position to the second position. In another example, multiple starts may occur, and a vessel may not be allowed near the starting area until the vessel's starting sequence.

Also in the past, determining a position of a point and/or area of interest (e.g., a landmark, a structure that "looks interesting", a remote object, etc.) at a distance was not possible for some (e.g., tourists, non-locals, etc.). For example, a family could be driving along a highway and spot a structure at a distance. Not knowing where and what the structure at the distance is, the family may not know where the structure at the distance is. For instance, structure 2010, as illustrated in FIG. 2, may not be known and/or its location may not be known to some.

BRIEF DESCRIPTION OF THE DRAWINGS

The embodiments will become apparent upon reading the following detailed description and upon reference to the accompanying drawings as follows:

FIG. 4 provides an alternate exemplary illustration of a vessel sighting a first object from a first position, according to one or more embodiments;

FIG. 39A provides an exemplary method of determining, utilizing a first bearing from a first position to an object at a second position, a first great circle intercept, according to one or more embodiments;

FIG. 45 provides an exemplary method of determining, utilizing a bearing from a first position to an object at a second position and matrices, a plane that includes the first position, the second position, and an origin, according to one or more embodiments;

FIG. 46 provides an exemplary method of determining a position relative to one or more great circles, according to one or more embodiments;

FIG. 58 provides an exemplary method of computing, utilizing one or more image sensors, a position of a remote object from two positions, according to one or more embodiments FIG. 59 provides an exemplary method of determining a position of a remote object via utilizing multiple devices at multiple positions, according to one or more embodiments;

Figure 1A:
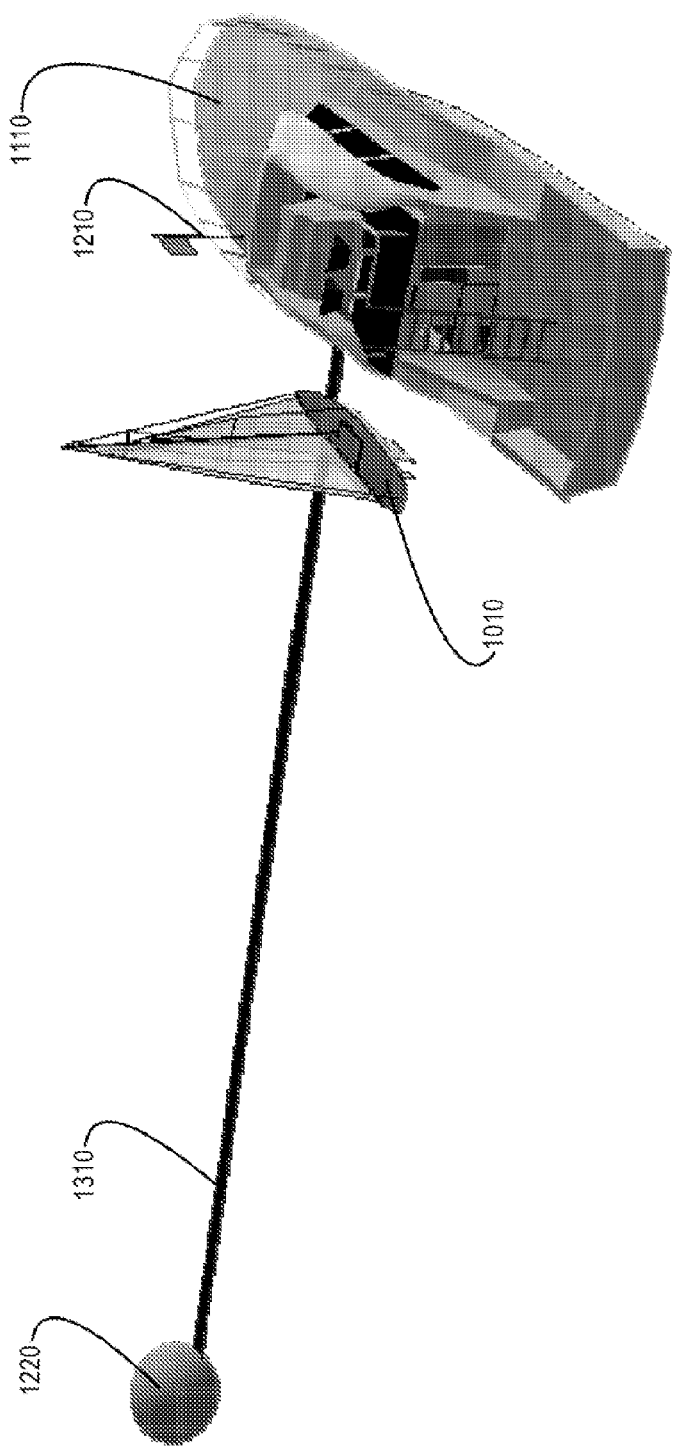
FIG. 1A provides a prior art illustration of a starting line of a sailboat race.
Figure 1B:
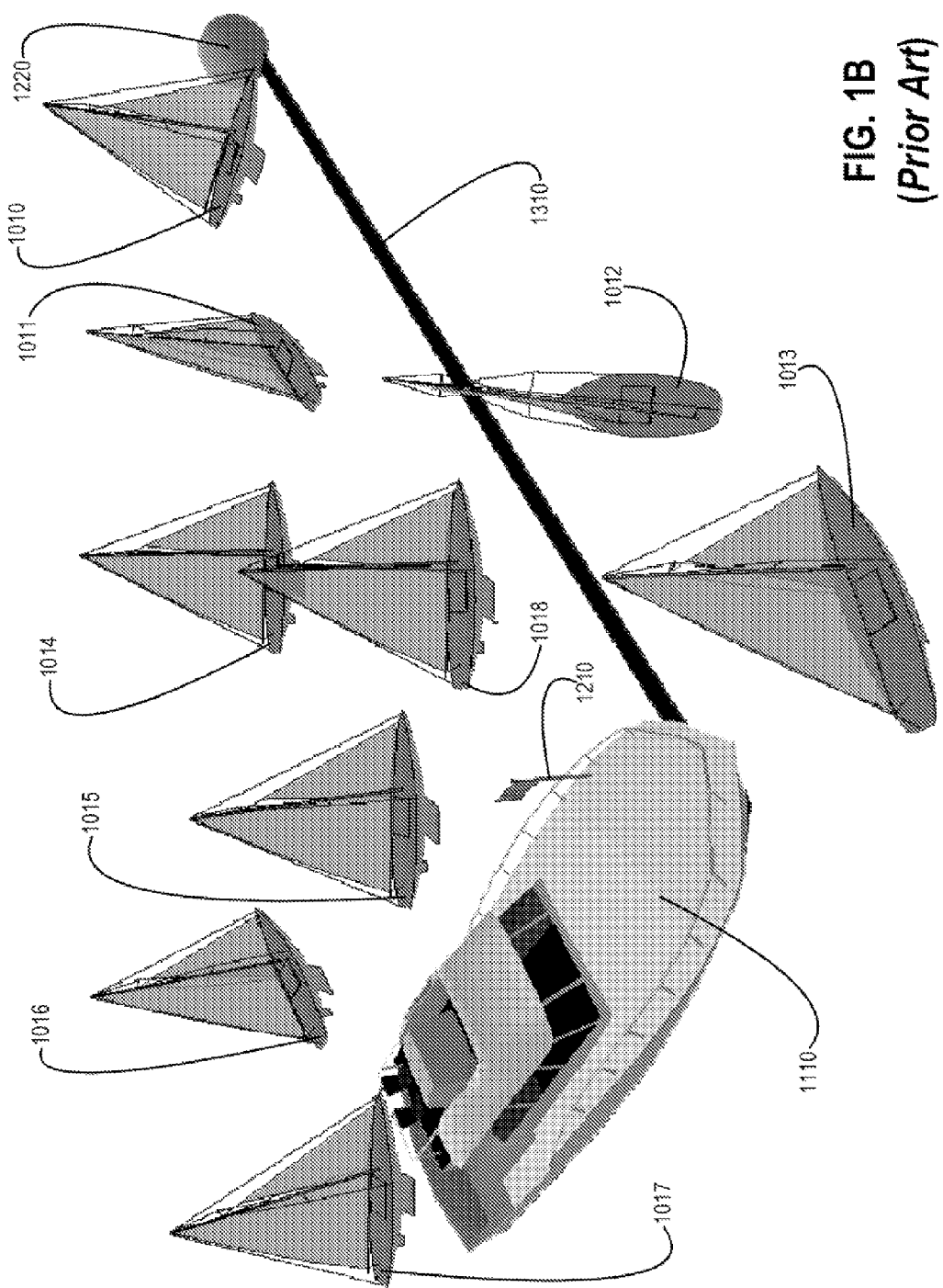
FIG. 1B provides a prior art illustration of a starting line of a sailboat race with multiple sailboats participating in a start of a sailboat race.
Figure 2:
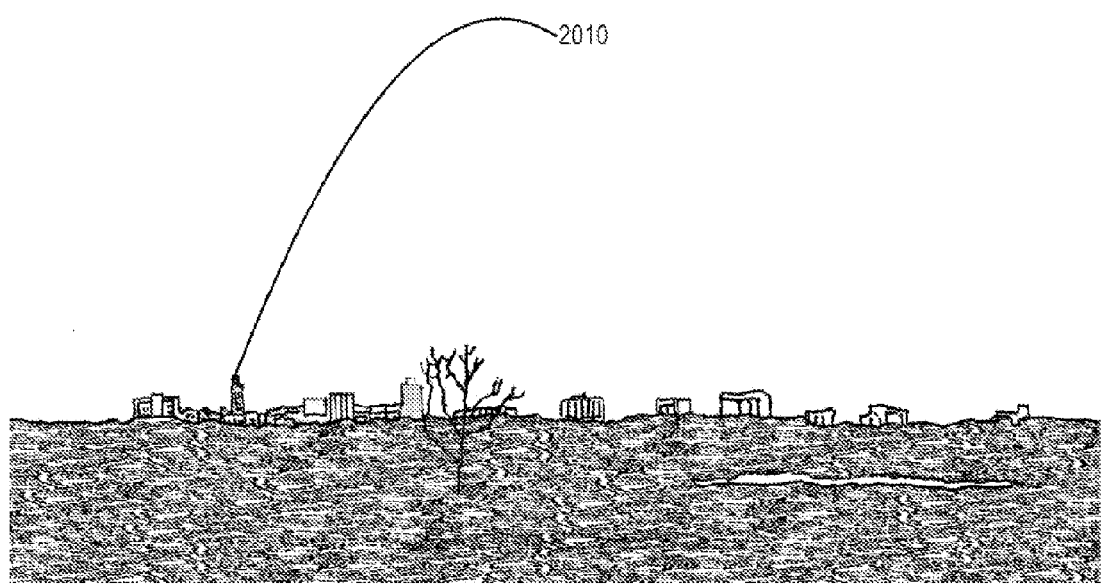
FIG. 2 provides a prior art illustration of a remote object.

While one or more embodiments, examples, and/or instances described may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of this disclosure. Moreover, some of the drawings and/or illustrations are not drawn to scale and are drawn and/or illustrated to show and/or demonstrate by way of example as may be expressed via drawings and/or illustrations.

DETAILED DESCRIPTION

In one or more embodiments, one or more systems, methods, and/or processes described herein may compute a position of a remote object. For example, computing the position of the remote object may be based on a first bearing at a first position and a second bearing at a second position. In one or more embodiments, a bearing to the remote object may be based on an angular difference between a geographic position and the remote object. In one example, the bearing to the remote object may be based on an angular difference between a geographic pole (e.g., a geographic north pole, a geographic south pole, etc.) and the remote object. In another example, the bearing to the remote object may be based on an angular difference between a magnetic pole (e.g., a magnetic north pole, a magnetic south pole, etc.) and the remote object.

In one or more embodiments, computing the angular difference between the geographic pole and the remote object may include computing an angular difference between a magnetic pole (e.g., a magnetic north pole, a magnetic south pole, etc.) and the remote object. For example, a bearing device may be oriented with respect to the remote object, and one or more measurements of a magnetic field of a planet may be utilized in computing the angular difference between the magnetic pole and the remote object. In one or more embodiments, the magnetic pole may not be at a same position as the geographic pole, and a declination angle and the angular difference between the magnetic pole and the remote object may be utilized in computing the angular difference between the geographic pole and the remote object.

In one or more embodiments, a declination angle may depend on one or more of a position and a time, among others. In one example, a declination angle at a first position may be different from a declination angle at a second position. In another example, a declination angle at a first point in time may be different from a declination angle at a second point in time. For instance, one or more positions of respective one or more magnetic poles of a planet may change over a period of time transpiring.

In one or more embodiments, a position of a remote object may be computed without interrogating the remote object with sound waves or electromagnetic waves. In one example, a position of a remote object may be computed without interrogating the remote object with sonar. In another example, a position of a remote object may be computed without interrogating the remote object with radar (e.g., laser radar, microwave radar, etc.). In one or more embodiments, a position of a remote object may be computed when the remote object is position outside a constellation of ranging signal generating devices. For example, a position of a remote object outside a constellation of pseudolites or satellites may be determined from a position within the constellation of pseudolites or satellites.

In one or more embodiments, a position of a remote object may be determined from various positions. In one example, a position of a remote object may be determined from positions on land. In a second example, a position of a remote object may be determined from positions on water (e.g., sea, ocean, river, lake, etc.). In a third example, a position of a remote object may be determined from positions in air (e.g., from an aerial vehicle, such as a glider, an airplane, a helicopter, etc.). In another example, a position of a remote object may be determined from positions in space (e.g., from a satellite, a space station, a space ship, a space vehicle, etc.).

In one or more embodiments, one or more mobile devices may be utilized in computing the position of the remote object based on the first bearing at the first position and the second bearing at the second position. In one example, a position device (e.g., a global position system device) may be utilized in computing one or more of the first position and the second position, among others. In another example, a bearing device may be utilized computing one or more of the first bearing and the second bearing, among others. For instance, the bearing device may be or include an electric compass that may transform an orientation of the bearing device into an angular difference between a magnetic pole and the orientation of the bearing device.

In one or more embodiments, one or more systems, methods, and/or processes described herein may compute a first plane that includes the first position, the position of the remote object, and an origin and may compute a second plane that includes the second position, the position of the remote object which may be utilized in computing the position of the remote object. For example, one or more systems, methods, and/or processes described herein may compute an intersection of the first plane and the second plane, where the intersection of the first plane and the second plane includes a line that includes the position of the remote object. For instance, the position of the remote object may be on a planet (e.g., Earth), and the intersection of the first plane and the second plane may include the position of the remote object. In one or more embodiments, computing the intersection of the first plane and the second plane may include computing a line and/or a vector. For example, computing the vector of the intersection of the first plane and the second plane may include computing an angular latitude measure and an angular longitude measure. For instance, the position of the remote object may be on the planet (e.g., at a radius from a center of the planet) and at the angular latitude measure and at the angular longitude measure.

In one or more embodiments, one or more devices and/or systems described herein may communicate, utilizing one or more signals, in one or more of a wireless fashion and a wired fashion. In one example, the bearing device may be a handheld bearing device that may communicate bearing information via one or more signals in a wireless fashion or in a wired fashion. In a second example, a global positioning device may communicate position information via one or more signals in a wireless fashion or in a wired fashion. In another example, a device, as described herein, may communicate information via one or more signals in a wireless fashion or in a wired fashion.

In one or more embodiments, one or more devices and/or systems described herein may communicate utilizing one or more media and/or protocols that may include one or more portions of one or more of NMEA (National Marine Electronics Association) 0180, NMEA 0182, NMEA 0183, NMEA 2000, IEEE (Institute of Electrical and Electronics Engineers) 802.3, IEEE 802.11, IEEE 802.15, IEEE 802.15.4, Bluetooth, ZigBee, an open wireless protocol, and a proprietary wireless protocol, among others. In one example, one or more devices and/or systems described herein may communicate, utilizing IEEE 802.11, with another device. For instance, one or more devices and/or systems described herein may be or include a WiFi access point that may communicate information with one or more of a laptop computer, a personal digital assistant, a smart phone, a tablet computing device, a digital wearable device (e.g., a digital watch, a device coupled to a lanyard, a device coupled to a headband, etc.), and a digital music player, among others. In another example, one or more devices and/or systems described herein may communicate, utilizing one or more of Bluetooth, ZigBee, and IEEE 802.15.4, among others, with another device. For instance, one or more devices and/or systems described herein may communicate information, via Bluetooth, ZigBee, and/or IEEE 802.15.4, with one or more of a laptop computer, a personal digital assistant, a smart phone, a tablet computing device, a digital wearable device (e.g., a digital watch, a device coupled to a lanyard, a device coupled to a headband), and a digital music player, among others.

In one or more embodiments, one or more devices and/or systems described herein may be controlled and/or configured in one or more of a wireless fashion and a wired fashion. In one example, one or more devices and/or systems described herein may be or include a WiFi access point that may receive configuration information (e.g., positions of marks in a sailboat race, declination information, playlist information, etc.) from a laptop computer, a personal digital assistant, a smart phone, a tablet computing device, a digital wearable device, and a digital music player, among others. In a second example, one or more devices and/or systems described herein may be controlled in a wireless fashion. In one instance, one or more devices and/or systems described herein may receive, in a wireless fashion or in a wired fashion, control information that indicates that a volume of an audio output device is to be increased or decreased. In a second instance, one or more devices and/or systems described herein may receive, in a wireless fashion or in a wired fashion, control information that indicates that a next song is to be output via an audio output device.

In a third example, one or more devices and/or systems described herein may receive, in a wireless fashion or in a wired fashion, control information that indicates that a clock may be started and/or initiated (e.g., a countdown clock to a start of a sailboat race). In a fourth example, one or more devices and/or systems described herein may receive, in a wireless fashion, configuration information that indicates that a time (e.g., global positioning time, WWVB time, etc.) that may be utilized in configuring one or more clocks, timing mechanisms, and/or timing devices of the one or more devices and/or systems described herein.

In a fifth example, one or more devices and/or systems described herein may receive, via an audio interface (e.g., a microphone), control information that indicates control information and/or configuration information. For instance, one or more devices and/or systems described herein may include a speech to text device that may transform speech from a language from a human to one or more of text, numbers, configurations, and commands, among others. In another example, one or more devices and/or systems described herein may be coupled to a wide area network (e.g., an Internet) and may receive information from the wide area network. For instance, declination information, weather information, sea condition information, etc. may be received from the wide area network. In one or more embodiments, the wide area network may be accessed via one or more of local area network, a public switched telephone network, a cellular telephone communications network, a satellite telephone communications network, and a satellite communications network, among others.

In one or more embodiments, a position, as utilized herein, may mean an estimated position. In one example, a position device may provide position information such as a computed position and a radius of uncertainty (e.g., a few centimeters to a few meters). In another example, a bearing device may be accurate to a tenth to five tenths of a degree. For instance, the accuracy of the bearing device may measured via a RMS (root mean square) method or process. In one or more embodiments, computing a position of a remote object may be computing an estimated position of a remote object, where an accuracy may be based on one or more accuracies of devices utilized in computing the estimated position of the remote object.

Figure 3:
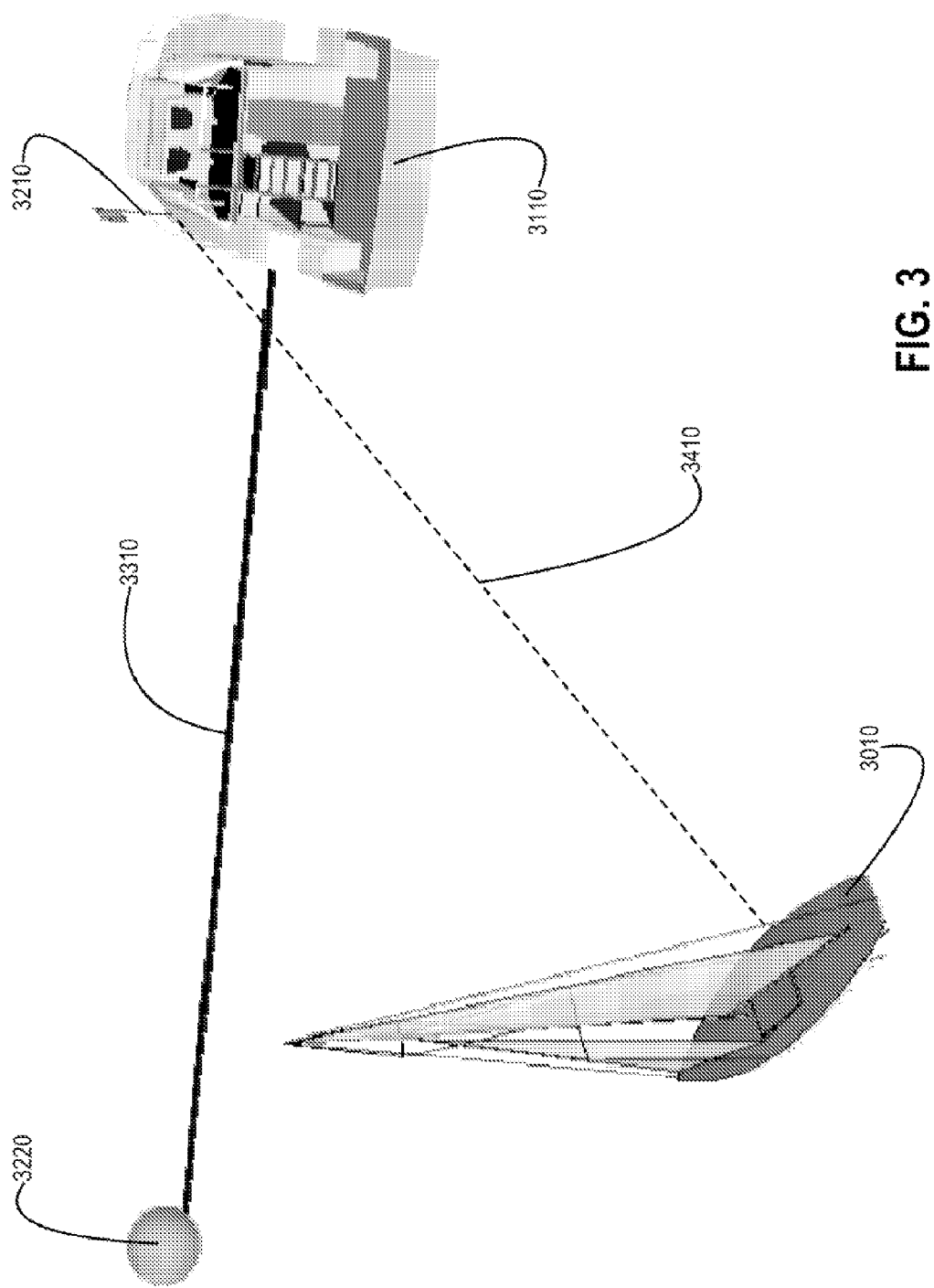
FIG. 3 provides an exemplary illustration of a vessel sighting a first object from a first position, according to one or more embodiments.

Turning now to FIG. 3, a vessel sighting a first object from a first position is illustrated, according to one or more embodiments. In one or more embodiments, a first object 3210 may be or include a first end of a starting line 3310, and a second object 3220 may be or include a second end of starting line 3310. As shown, a user (e.g., an occupant, a crew member, etc.) of a vessel 3010 may sight object 3210. For example, the user may sight object 3210 utilizing a sighting device. In one or more embodiments, object 3210 may be or include a staff (e.g., a flag staff), which may be mounted on a vessel 3110 (e.g., a race committee boat). As illustrated, the user may establish a sight line 3410 utilizing a sighting device. FIG. 4 illustrates another view of establishing sight line 3410 utilizing the sighting device, according to one or more embodiments.

Figure 5A:
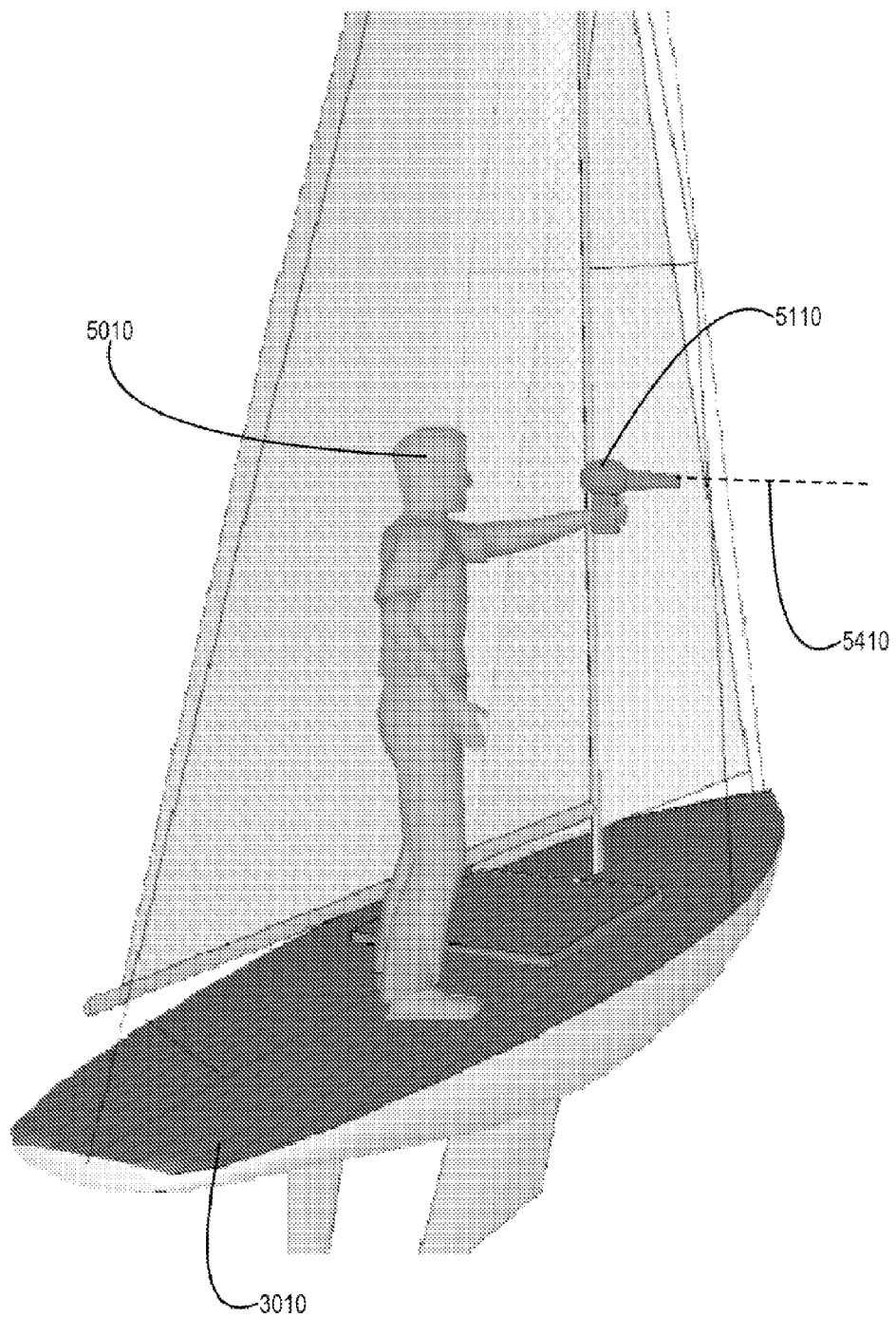
FIG. 5A provides an exemplary illustration of a user sighting a remote object, according to one or more embodiments.
Figure 5B:
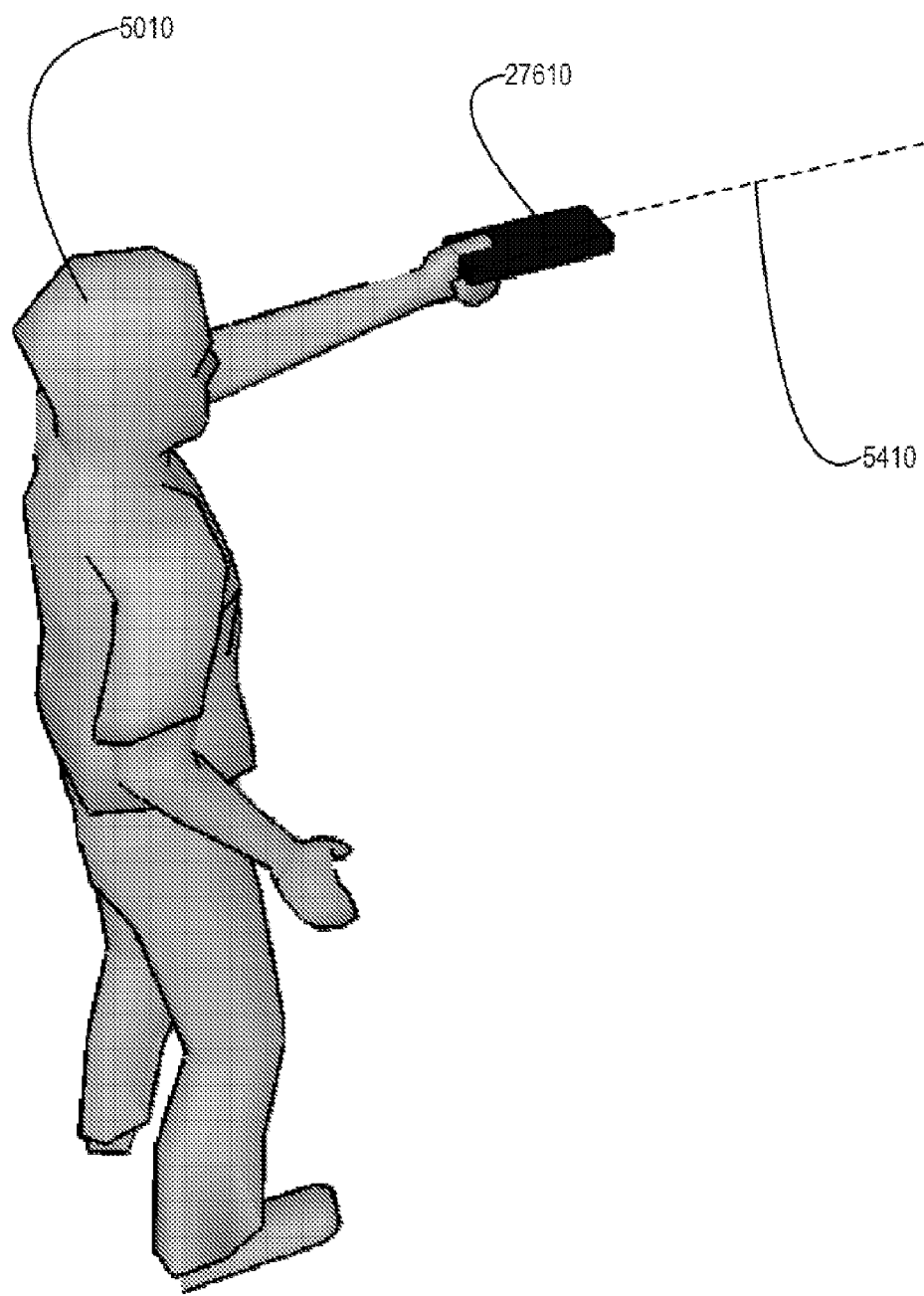
FIG. 5B provide provides another exemplary illustration of a user sighting a remote object, according to one or more embodiments.

Turning now to FIGS. 5A and 5B, a user sighting a remote object is illustrated, according to one or more embodiments. As shown in FIG. 5A, a user 5010 (e.g., an occupant, a crew member, etc.) of vessel 3010 may, utilizing sighting device 5110, sight a remote object. As illustrated, user 5010 may orient sighting device 5110 to establish a sight line 5410 to an object. In one example, user 5010 may orient sighting device 5110 to establish a sight line to object 3210, and sight line 5410 may be or include sight line 3410. In another example, user 5010 may orient sighting device 5110 to establish a sight line to object 3220, and sight line 5410 may be or include sight line 7410.

In one or more embodiments, sighting device 5110 may have or include a form that is similar to one or ore of a handheld firearm, a rifle, a hair dryer, and a handheld drill, among others. In one example, sighting device 5110 may have or include a pistol grip that may be grasped by a user. In another example, a top of sighting device 5110 may have or include an alignment guide or a scope that may be utilized in orienting sighting device 5110 such that sight line 5410 may be established from sighting device 5110 to an object. In one or more embodiments, sighting device 5110 may include a bearing device that may compute a magnetic bearing associated with sight line 5410 and a magnetic pole. For example, the bearing device may compute the magnetic bearing associated with sight line 5410 and the magnetic pole via one or more measurements of one or more magnetic fields associated with the magnetic pole. For instance, the bearing device may measure a magnetic field associated with the magnetic pole with respect to one or more axes and may compute the magnetic bearing, associated with sight line 5410 and the magnetic pole, utilizing one or more measurements of the magnetic field associated with the magnetic pole.

As illustrated in FIG. 5B, user 5010 may utilize a device 27610 to sight an object. In one or more embodiments, device 27610 may be or include one or more of a personal digital assistant (PDA), a portable computer, a smart phone, a wireless telephone (e.g., a cellular telephone, a satellite telephone, etc.), a digital music player, a tablet computing device, a wearable computing device, a communications device, and other wired or wireless device, among others. As shown, user 5010 may orient device 27610 to establish a sight line 5410 to an object. In one example, user 5010 may orient device 27610 to establish a sight line to object 3210, and sight line 5410 may be or include sight line 3410. In another example, user 5010 may orient device 27610 to establish a sight line to object 3220, and sight line 5410 may be or include sight line 7410.

In one or more embodiments, device 27610 may include a bearing device that may compute a magnetic bearing associated with sight line 5410 and a magnetic pole. For example, the bearing device may compute the magnetic bearing associated with sight line 5410 and the magnetic pole via one or more measurements of one or more magnetic fields associated with the magnetic pole. For instance, the bearing device may measure a magnetic field associated with the magnetic pole with respect to one or more axes and may compute the magnetic bearing, associated with sight line 5410 and the magnetic pole, utilizing one or more measurements of the magnetic field associated with the magnetic pole.

In one or more embodiments, device 27610 may include a position device that may provide one or more positions. For example, the position device may be or include a global positioning system device that may receive multiple location signals and/or ranging signals and/or may compute the one or more positions via the location signals and/or the ranging signals. In one or more embodiments, the position device may function as a bearing device.

Figure 6A:
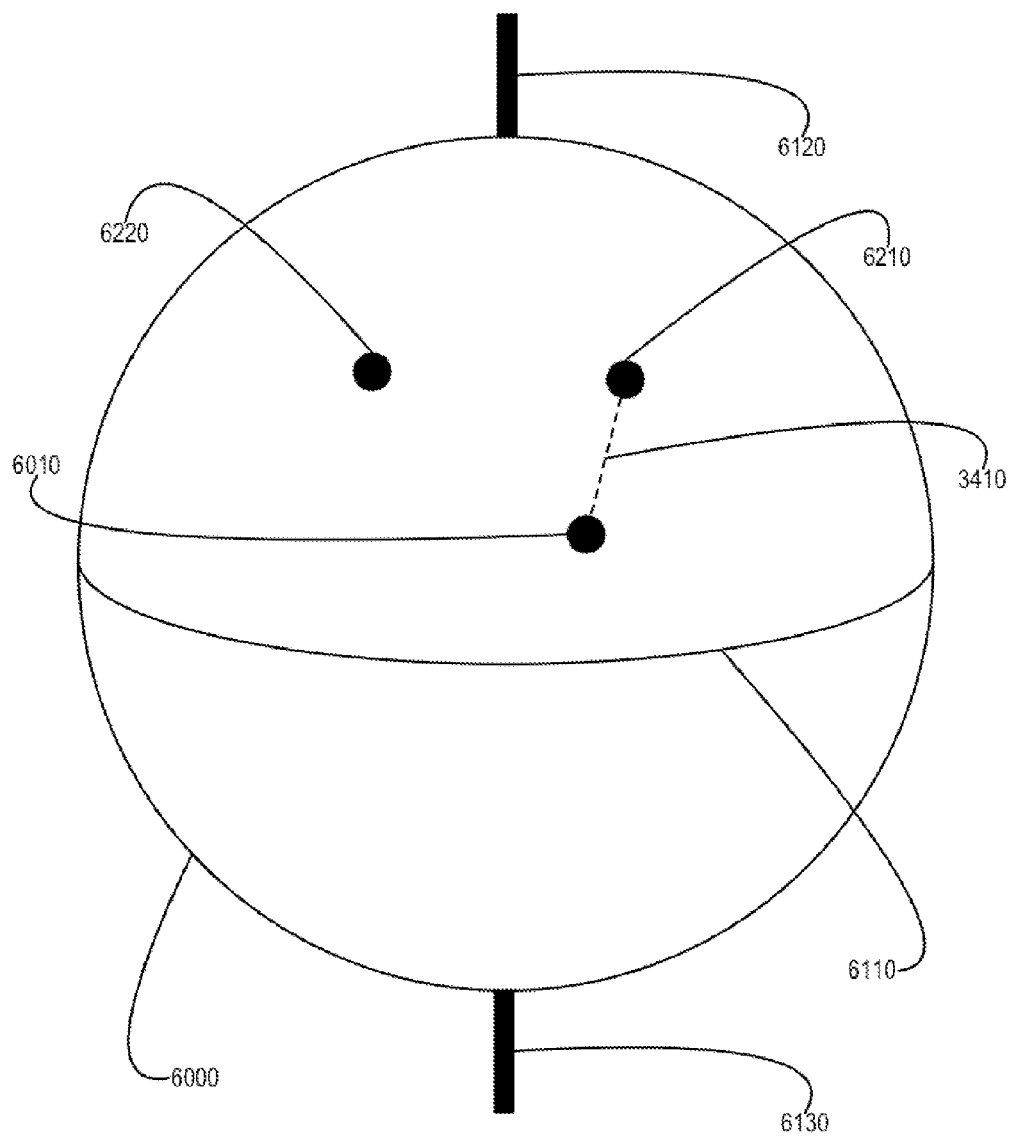
FIG. 6A illustrates an exemplary sphere and first exemplary positions associated with the sphere, according to one or more embodiments.

Turning now to FIG. 6A, an exemplary sphere and exemplary positions associated with the sphere are illustrated, according to one or more embodiments. As shown, a sphere 6000 may be associated with one or more of an equator 6110, a first pole 6120 (e.g., a north pole, etc.), and a second pole 6130 (e.g., a south pole), among others. In one or more embodiments, equator 6110 may be or include a great circle of sphere 6000 and may be perpendicular to a line between poles 6120 and 6130 and/or perpendicular to (e.g., normal to) a plane that includes poles 6120 and 6130. In one or more embodiments, equator 6110 may be or include a great circle of sphere 6000, where all points of the great circle are equidistant to both poles 6120 and 6130. In one or more embodiments, a great circle of a sphere may be an intersection of a plane and points of the surface of the sphere, where the plane includes an origin of the sphere. In one or more embodiments, a great circle of a sphere may be a Riemannian circle.

In one or more embodiments, a sphere, such as sphere 6000, may approximate a planet, may provide a model of a planet, and/or may be utilized as an approximation and/or a model of a planet. For example, sphere 6000 may model a planet, such as Earth (e.g., Earth 6710 of FIG. 6D), and/or may provide an approximation of a planet, such as Earth 6710 illustrated in FIG. 6E.

In one or more embodiments, a planet (e.g., Earth) may be approximated by an ellipsoid. For example, Earth may be associated with a mean equatorial radius of 6378.137 km and may be associated with a mean polar radius (e.g., a measure normal to the equatorial plane to a pole) of 6356.7523142 km. For instance, a cross-section of the Earth that is normal to its equatorial plane may be ellipsoidal. In one or more embodiments, a sphere, such as sphere 6000, may approximate an ellipsoid model of Earth. For example, determining distance measurements that are not over a horizon (e.g., a horizon of Earth) may utilize the sphere, such as sphere 6000, to approximate the ellipsoid model of Earth. For instance, this approximation of the ellipsoid model of Earth may reduce one or more computations in computing distance measurements that are not over the horizon. In one or more embodiments, modeling Earth may include utilizing information from WGS 84 (World Geodetic System 1984) or another geodetic system. For example, a measure of a radius from an origin to a position may be a function of the position.

In one or more embodiments, a radius of sphere 6000 may vary according to a position on a planet and/or according to a model. In one example, a radius of sphere 6000 may be or include a measure from an origin of sphere 6000 to an average sea level (e.g., a mean sea level (MSL)) of Earth. In a second example, a radius of sphere 6000 may be or include a measure from an origin of sphere 6000 to an average sea level of Earth adjusted by an altitude. In one instance, the altitude may be or include an altitude (e.g., a height above a sea level) of Lake Travis, Tex. In a second instance, the altitude may be or include an altitude (e.g., a height above a sea level) of Lake Tahoe, Nev. In a third instance, the altitude may be or include an altitude (e.g., a height below a sea level) of the Dead Sea. In another example, the altitude may be or include an altitude (e.g., a height below a sea level) of Death Valley.

In another example, a radius of sphere 6000 may changed according to a model. For instance, a model may utilize a first radius for one or more calculations and may utilize a second radius for one or more other calculations and/or for modeling a planet (e.g., Earth). In one or more embodiments, a model may utilize a unit radius (e.g., a radius of a unity value or "one" according to a metric and/or a measure) and may utilize a radius of MSL, plus an altitude if not at MSL. In one or more embodiments, an altitude may include a positive or negative number or measure.

As illustrated in FIG. 6A, positions 6010, 6210, and 6220 may be associated with positions on a surface of sphere 6000. In one example, position 6010 may be, include, and/or be associated with a first position of vessel 3010 and/or a first position of sighting device 5110. In a second example, position 6210 may be, include, and/or be associated with a position of object 3210. In another example, position 6220 may be, include, and/or be associated with a position of object 3210. As shown, sight line 3410 may be a sight line between positions 6010 and 6210.

Figure 6B:
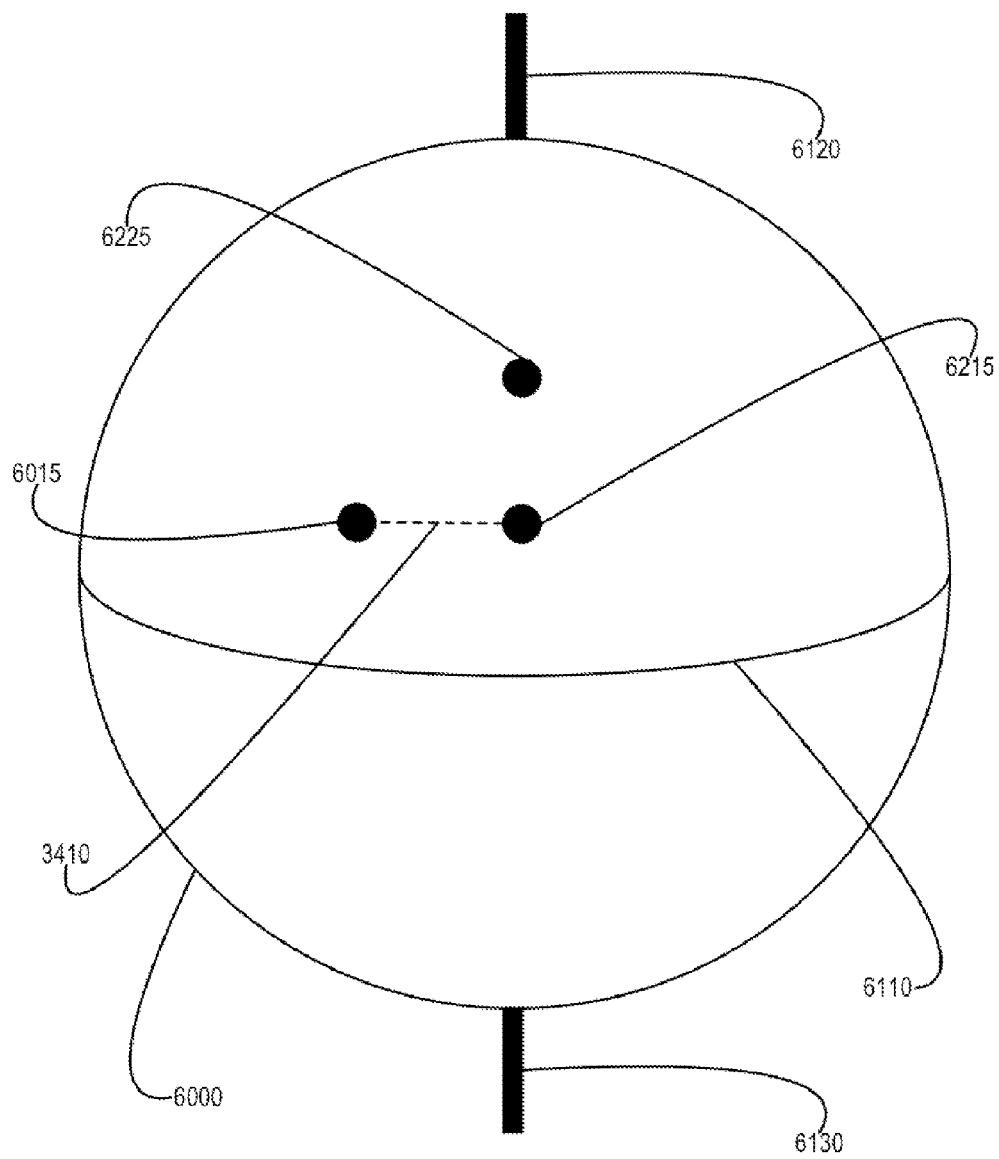
FIG. 6B illustrates an exemplary sphere and second exemplary positions associated with the sphere, according to one or more embodiments.

As illustrated in FIG. 6B, positions 6015, 6215, and 6225 may be associated with positions on a surface of sphere 6000. In one example, position 6015 may be, include, and/or be associated with a first position of vessel 3010 and/or a first position of sighting device 5110. In a second example, position 6215 may be, include, and/or be associated with a position of object 3210. In another example, position 6225 may be, include, and/or be associated with a position of object 3210. As shown, sight line 3410 may be a sight line between positions 6015 and 6215.

Figure 6C:
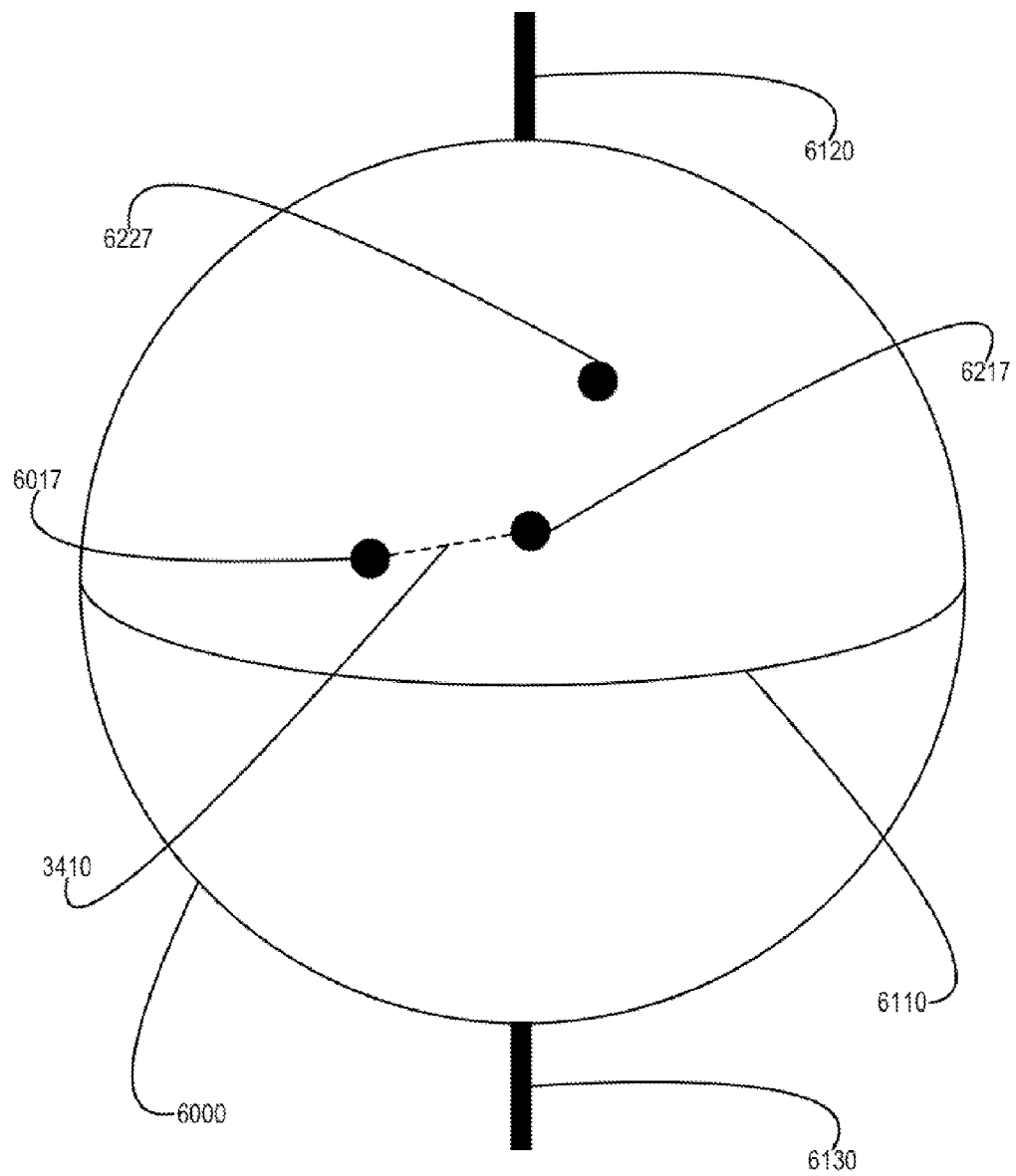
FIG. 6C illustrates an exemplary sphere and third exemplary positions associated with the sphere, according to one or more embodiments.
Figure 6D:
FIG. 6D illustrates an exemplary planet, according to one or more embodiments.
Figure 6E:
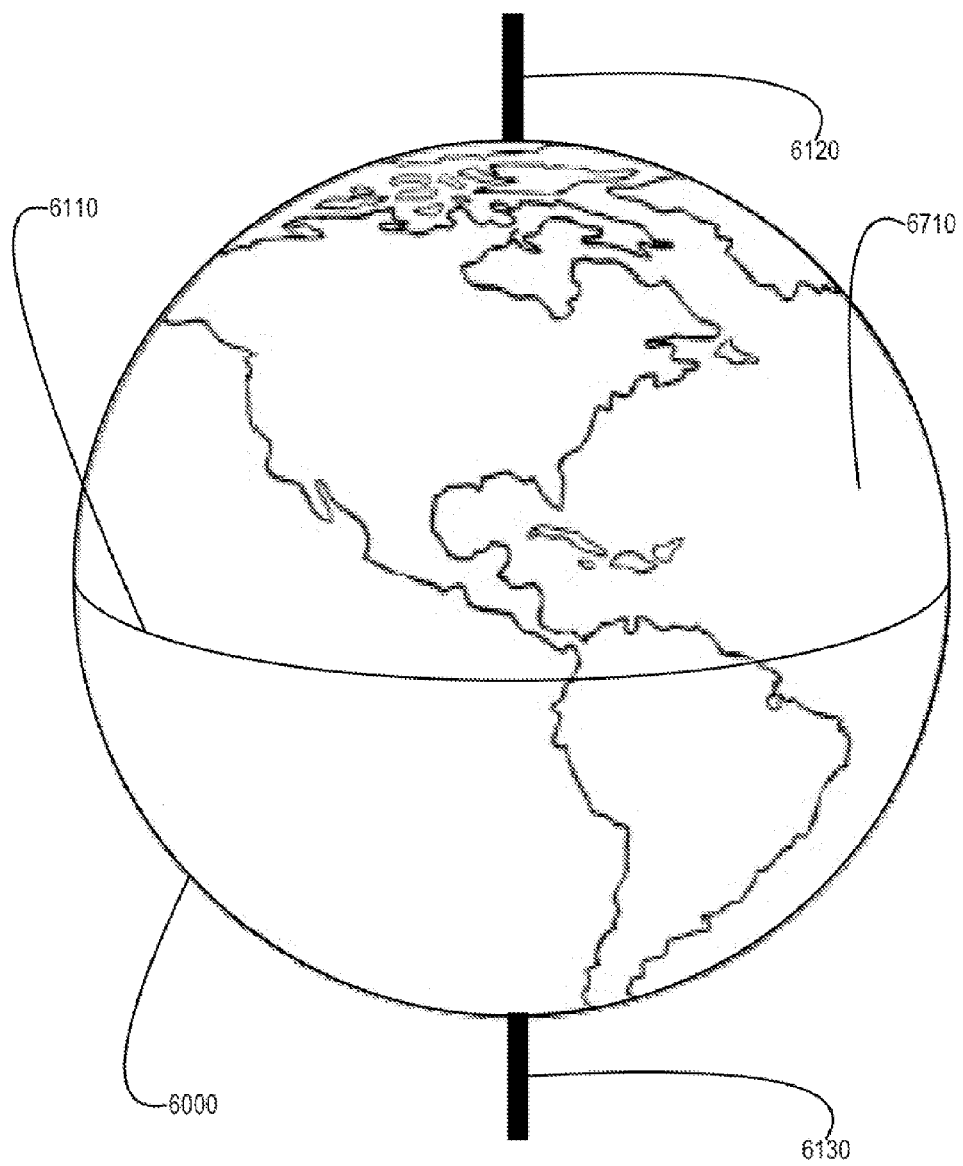
FIG. 6E illustrates an exemplary spherical model of a planet, according to one or more embodiments.

As illustrated in FIG. 6C, positions 6017, 6217, and 6227 may be associated with positions on a surface of sphere 6000. In one example, position 6017 may be, include, and/or be associated with a first position of vessel 3010 and/or a first position of sighting device 5110. In a second example, position 6217 may be, include, and/or be associated with a position of object 3210. In another example, position 6227 may be, include, and/or be associated with a position of object 3210. As shown, sight line 3410 may be a sight line between positions 6017 and 6217.

Figure 6F:
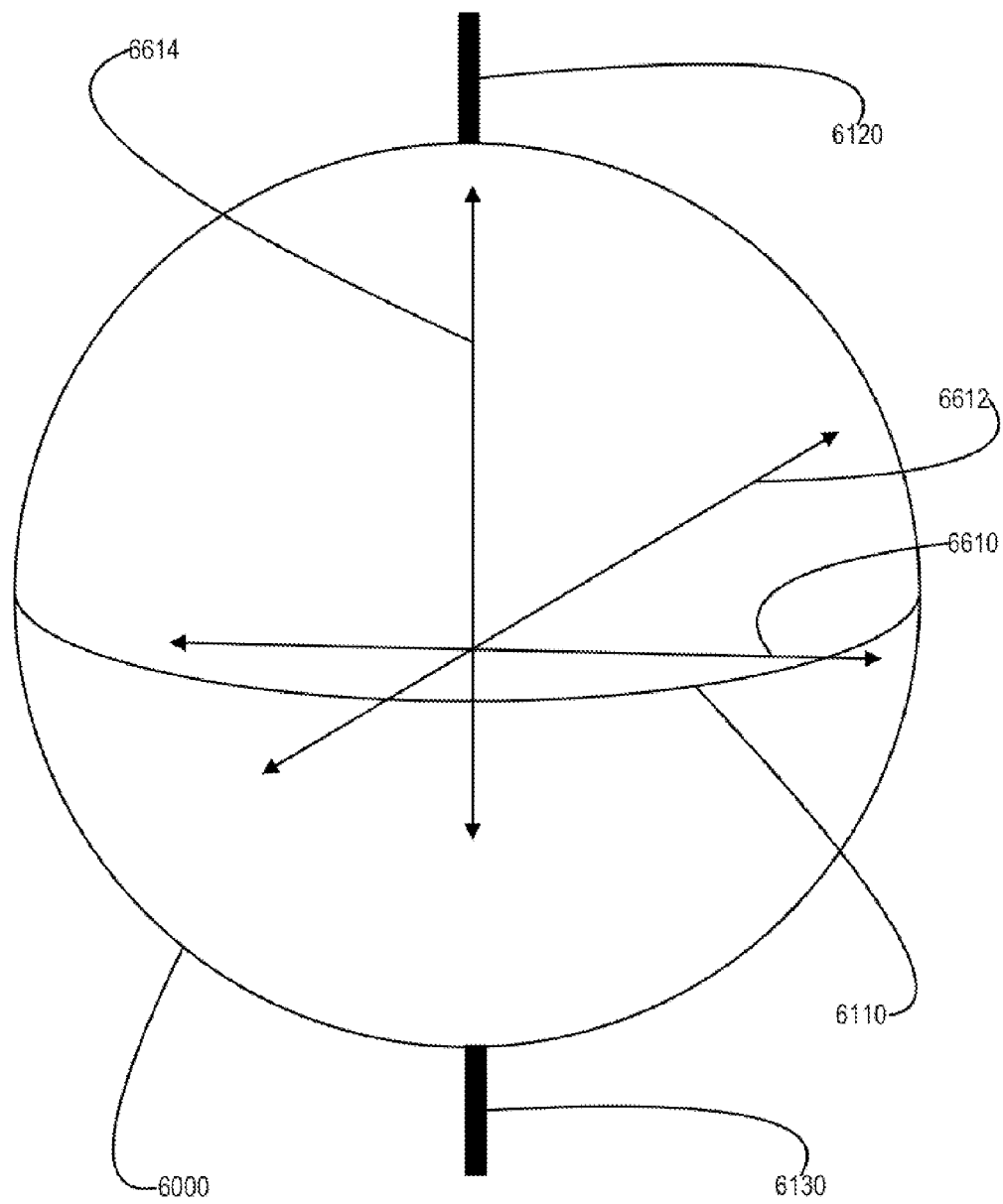
FIG. 6F illustrates an exemplary sphere and axes of a Cartesian coordinate system, according to one or more embodiments.
Figure 6G:
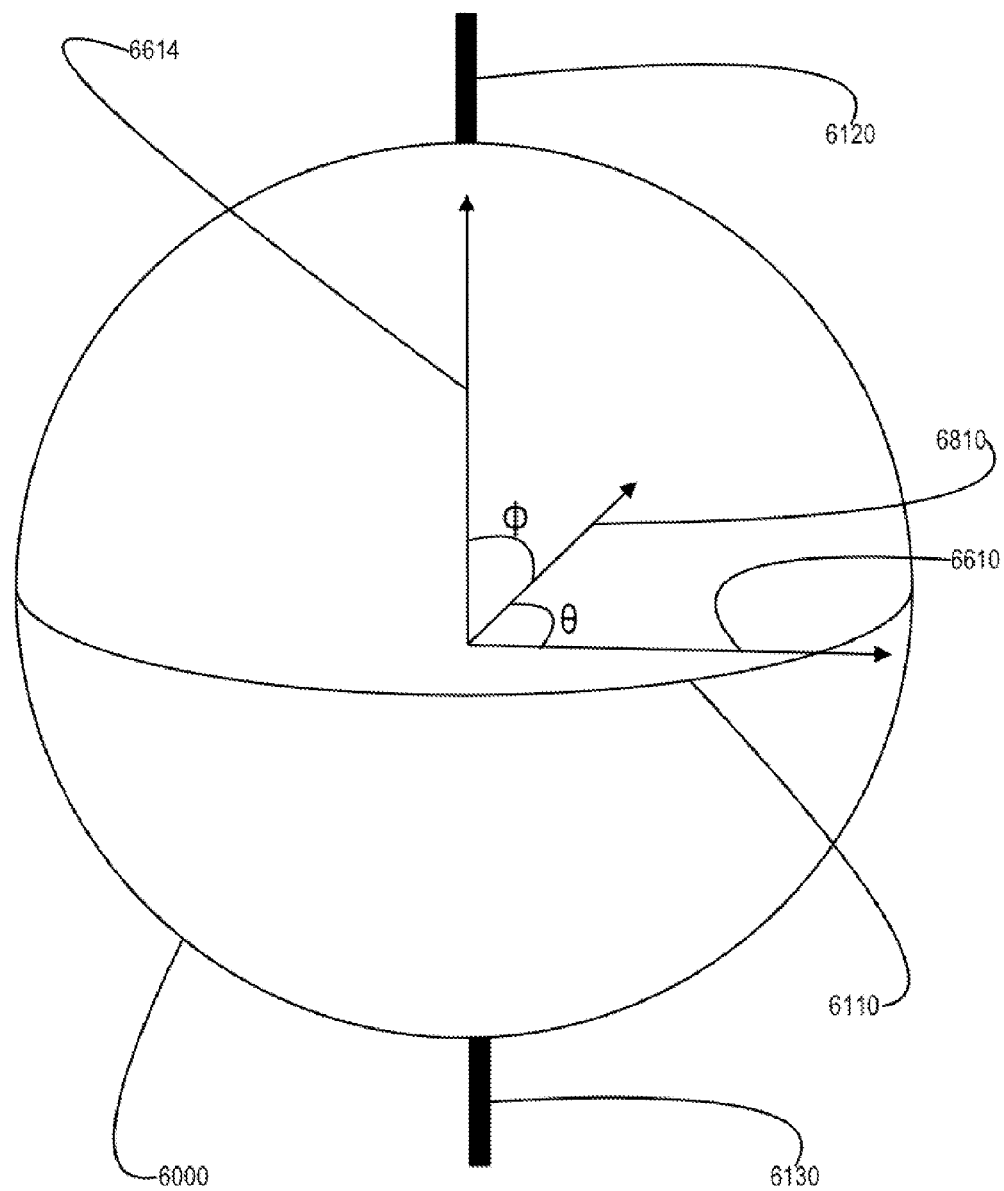
FIG. 6G illustrates an exemplary sphere and axes of a spherical coordinate system, according to one or more embodiments.

In one or more embodiments, one or more coordinate systems may be utilized. In one example, a Cartesian coordinate system may be utilized. For instance, as illustrated in FIG. 6F, axes 6610, 6612, and 6614 may be, include, correspond to, and/or be associated with an x-axis, a y-axis, and a z-axis, respectively. In a second example, a polar coordinate system may be utilized. For instance, as illustrated in FIG. 6G, a vector 6810 may be described with reference to a length or magnitude $\rho$, a first angle, $\theta$, to a first reference direction (e.g., a positive x-axis or axis 6610), and a second angle, $\phi$, to a second reference direction (e.g., a positive z-axis or axis 6614). In one or more embodiments, an origin of sphere 6000 be or include an origin of a coordinate system.

Figure 7:
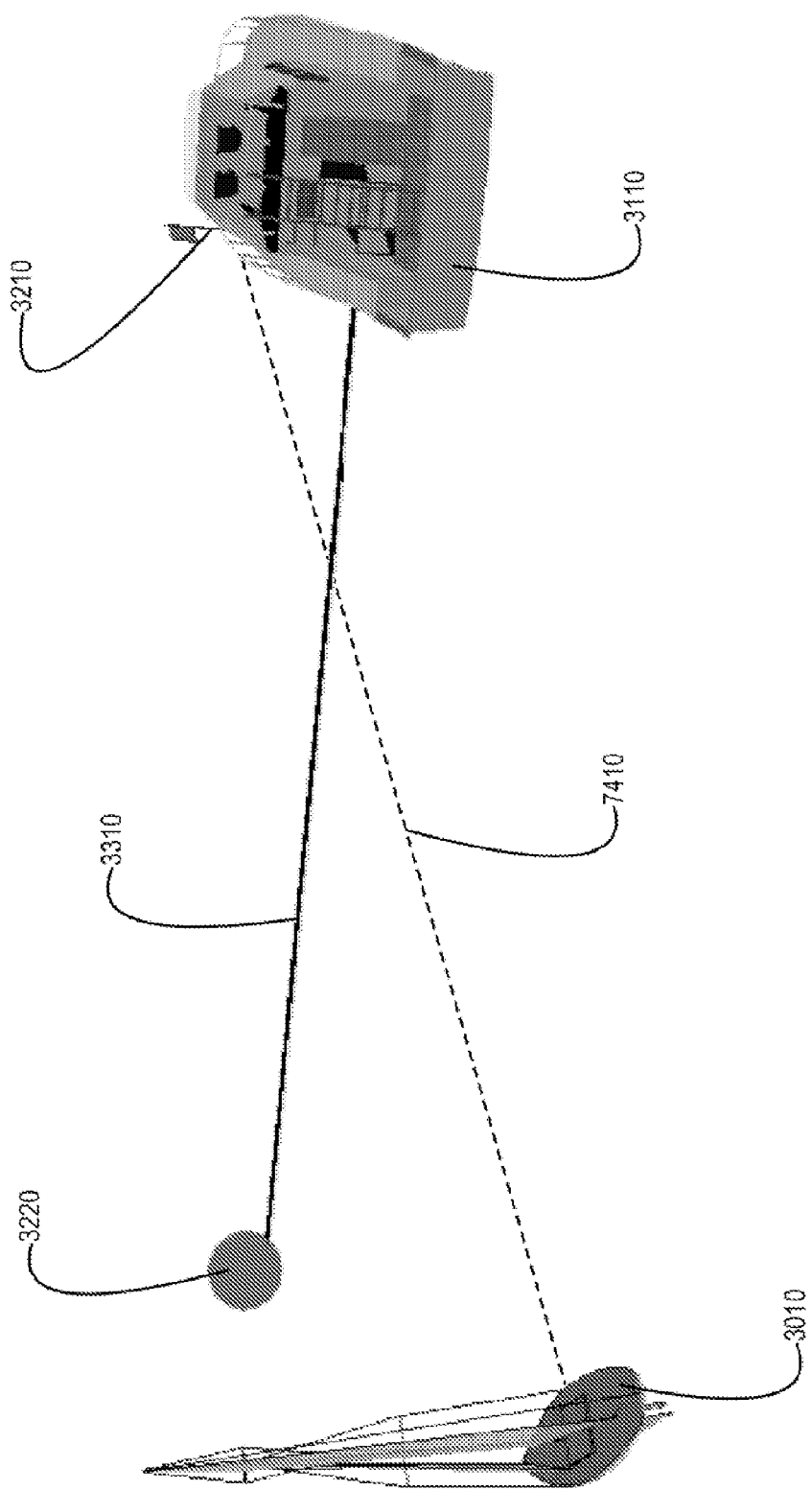
FIG. 7 provides an exemplary illustration of a vessel sighting a first object from a second position, according to one or more embodiments.
Figure 8:
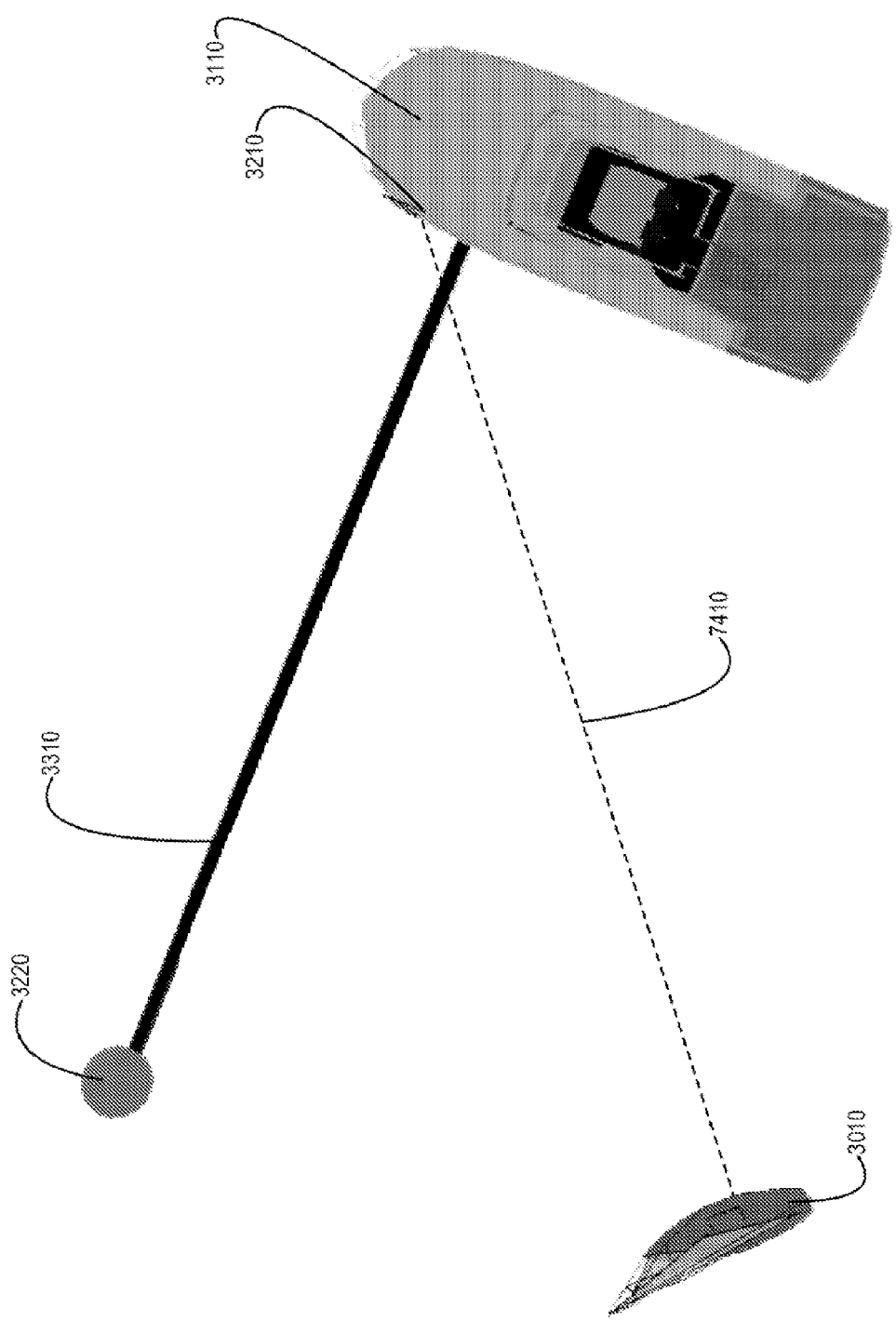
FIG. 8 provides an alternate exemplary illustration of a vessel sighting a first object from a second position, according to one or more embodiments.

Turning now to FIG. 7, a vessel sighting a first object from a second position is illustrated, according to one or more embodiments. As shown, a user associated with vessel 3010 may sight object 3210. For example, the user may sight object 3210 utilizing sighting device 5110. As illustrated, the user may establish a sight line 7410 utilizing sighting device 5110. For example, sight line 5410 may be or include sight line 7410. FIG. 8 illustrates another view of establishing sight line 7410 utilizing sighting device 5110, according to one or more embodiments.

Figure 9A:
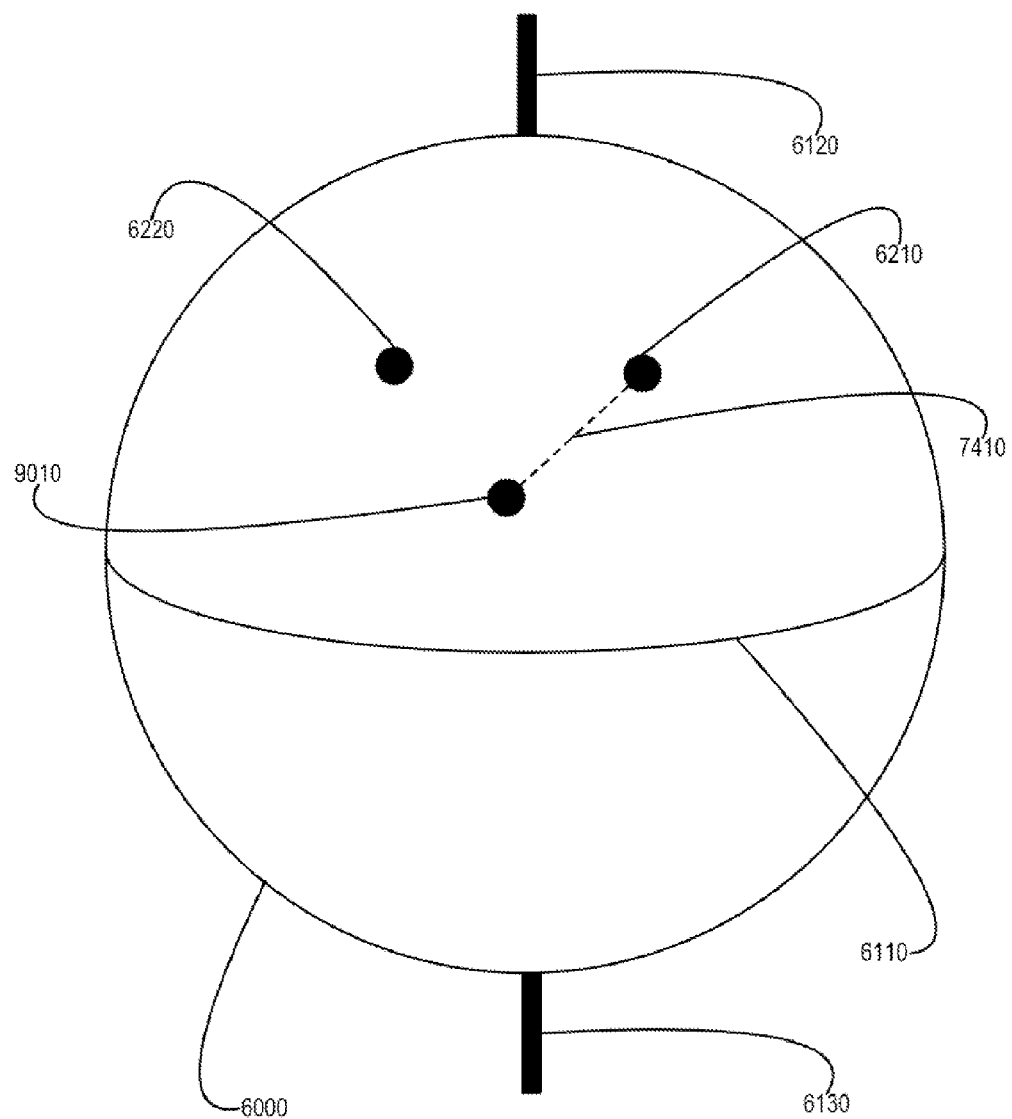
FIG. 9A provides an exemplary sphere, first positions associated with the sphere, and a sight line between two positions, according to one or more embodiments.
Figure 9B:
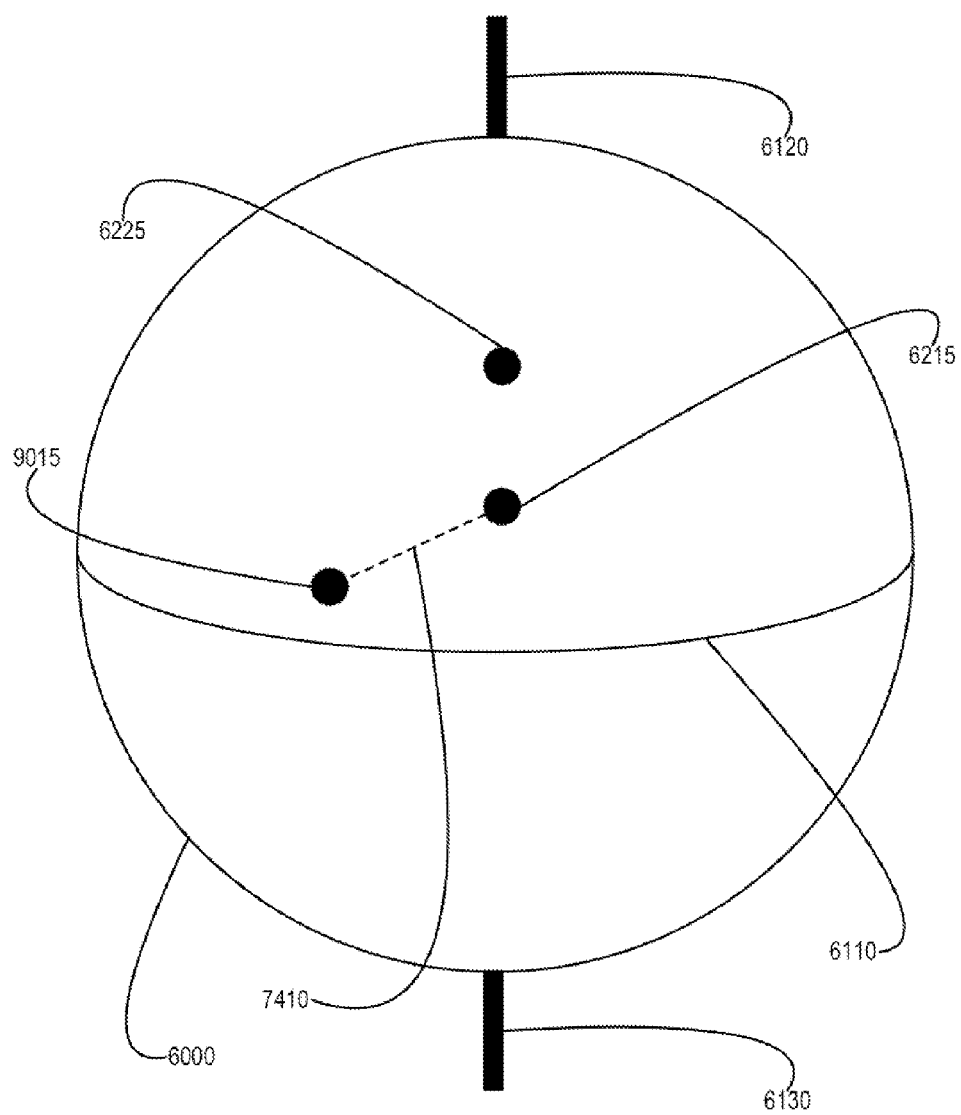
FIG. 9B provides an exemplary sphere, second positions associated with the sphere, and a sight line between two positions, according to one or more embodiments.
Figure 9C:
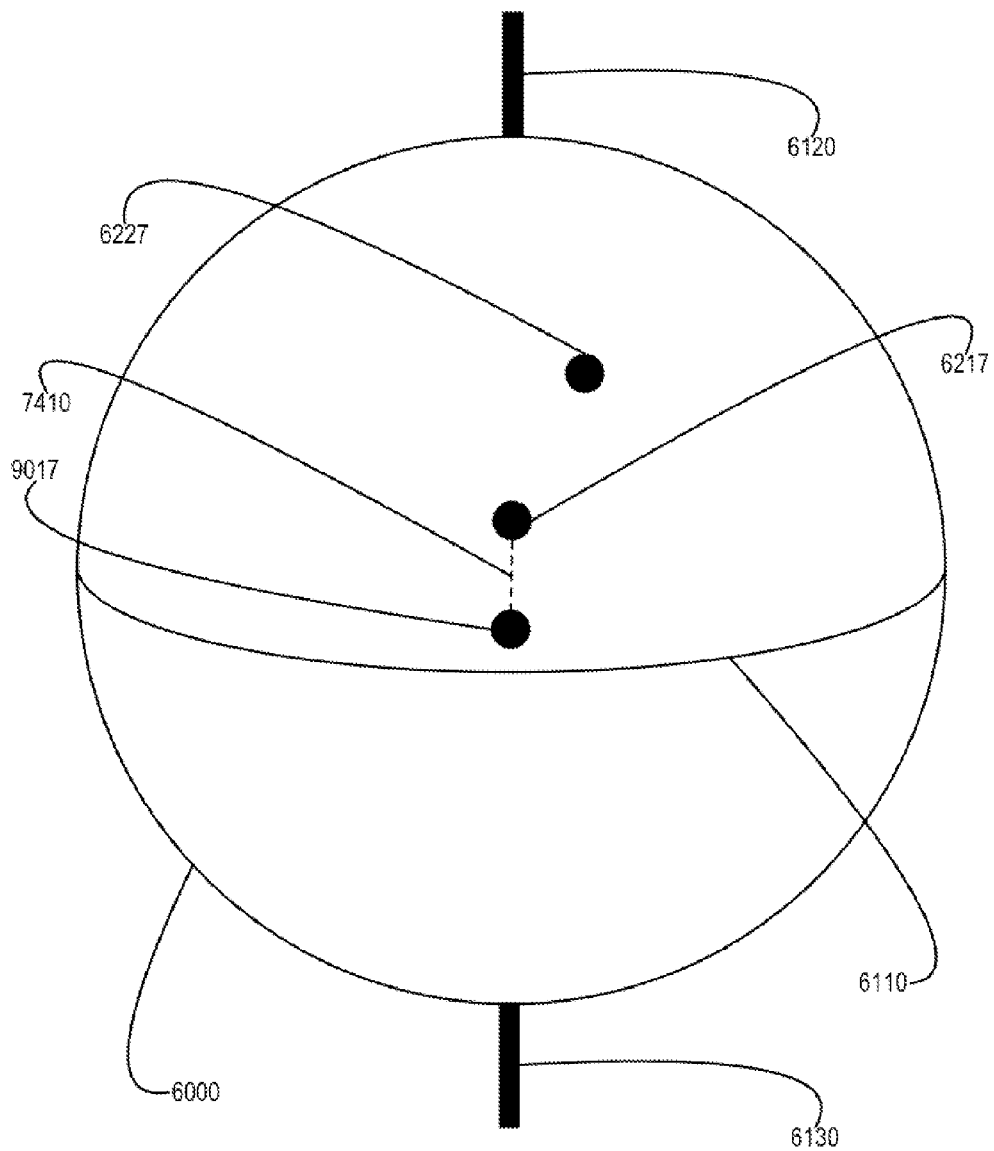
FIG. 9C provides an exemplary sphere, third positions associated with the sphere, and a sight line between two positions, according to one or more embodiments.

Turning now to FIGS. 9A-9C, exemplary spheres and positions associated with the sphere are illustrated, according to one or more embodiments. As shown in FIG. 9A, a position 9010 may be associated with positions on a surface of sphere 6000. In one example, position 9010 may be, include, and/or be associated with a second position of vessel 3010 and/or a second position of sighting device 5110. As shown, sight line 7410 may be a sight line between positions 9010 and 6210. In one or more embodiments, position 6010, a bearing associated with sight line 3410, position 9010, a bearing associated with sight line 7410 may be utilized to determine position 6210.

As shown in FIG. 9B, a position 9015 may be associated with positions on a surface of sphere 6000. In one example, position 9015 may be, include, and/or be associated with a second position of vessel 3010 and/or a second position of sighting device 5110. As shown, sight line 7410 may be a sight line between positions 9015 and 6215. In one or more embodiments, position 6015, a bearing associated with sight line 3410, position 9015, a bearing associated with sight line 7410 may be utilized to determine position 6215.

As shown in FIG. 9C, a position 9017 may be associated with positions on a surface of sphere 6000. In one example, position 9017 may be, include, and/or be associated with a second position of vessel 3010 and/or a second position of sighting device 5110. As shown, sight line 7410 may be a sight line between positions 9017 and 6217. In one or more embodiments, position 6017, a bearing associated with sight line 3410, position 9017, a bearing associated with sight line 7410 may be utilized to determine position 6217.

Figure 10:
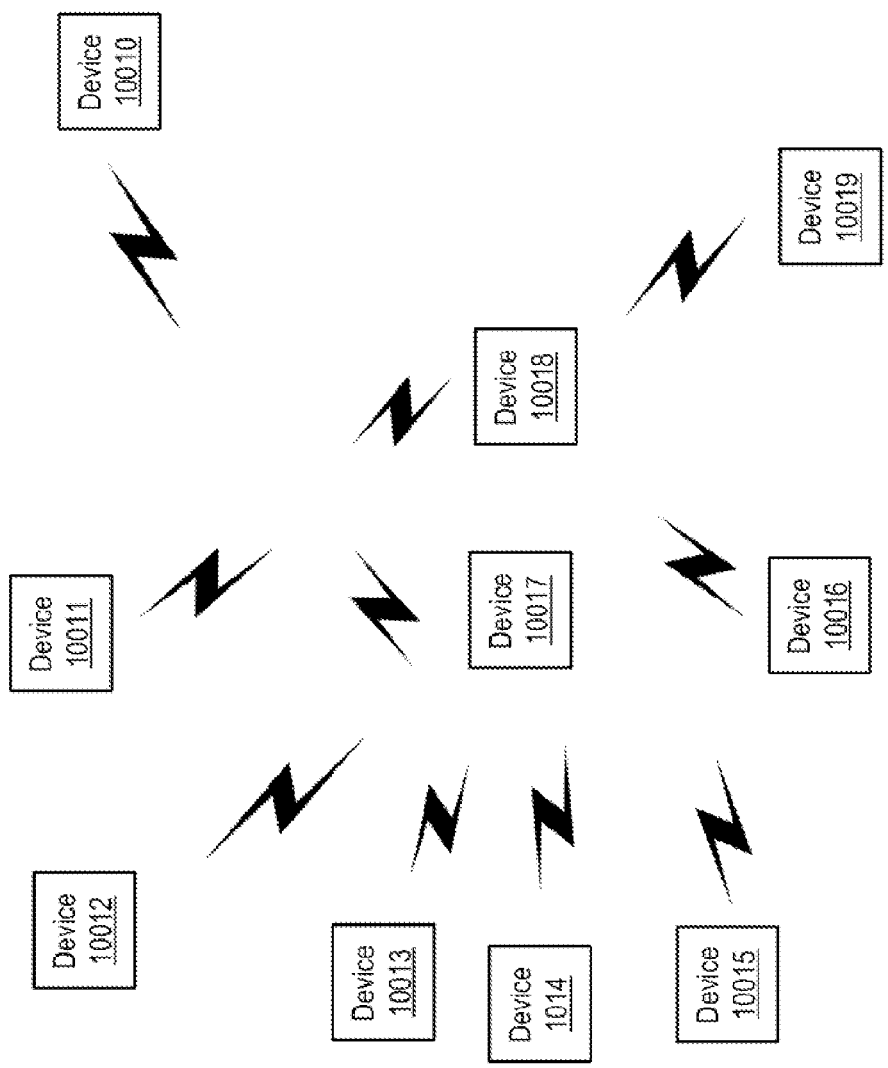
FIG. 10 provides an exemplary illustration of exemplary devices in a first exemplary configuration, according to one or more embodiments.
Figure 11:
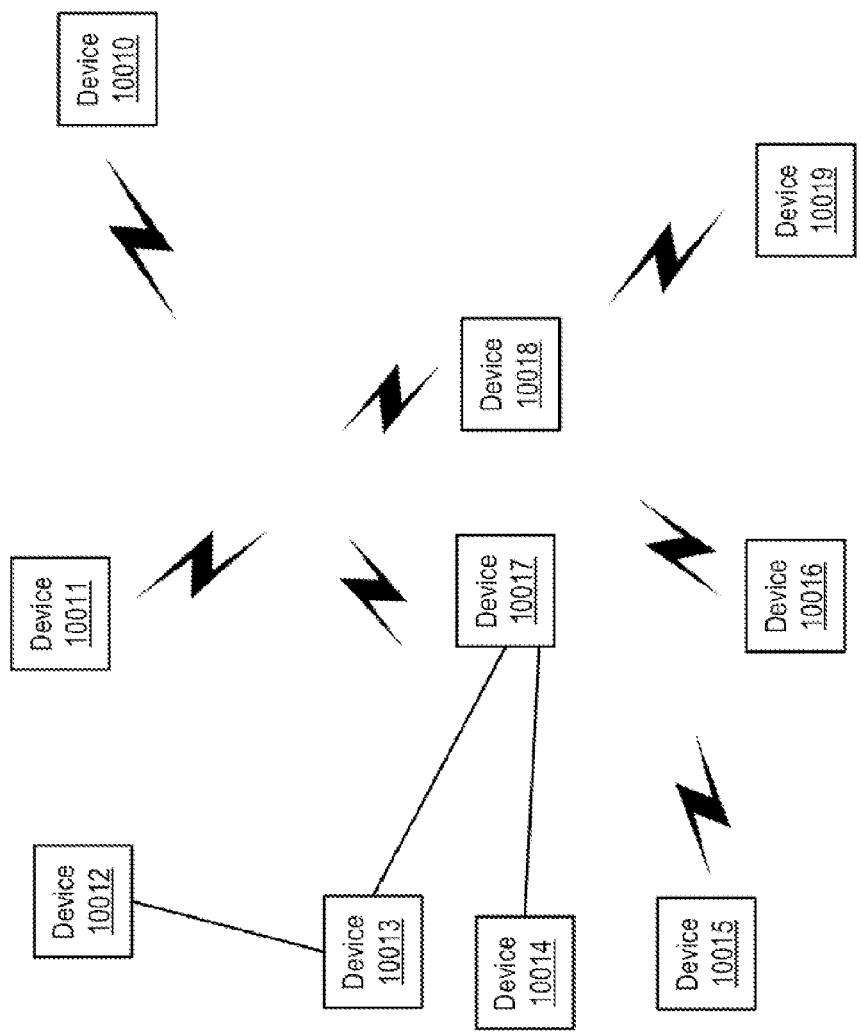
FIG. 11 provides an exemplary illustration of exemplary devices in a second exemplary configuration, according to one or more embodiments.
Figure 12:
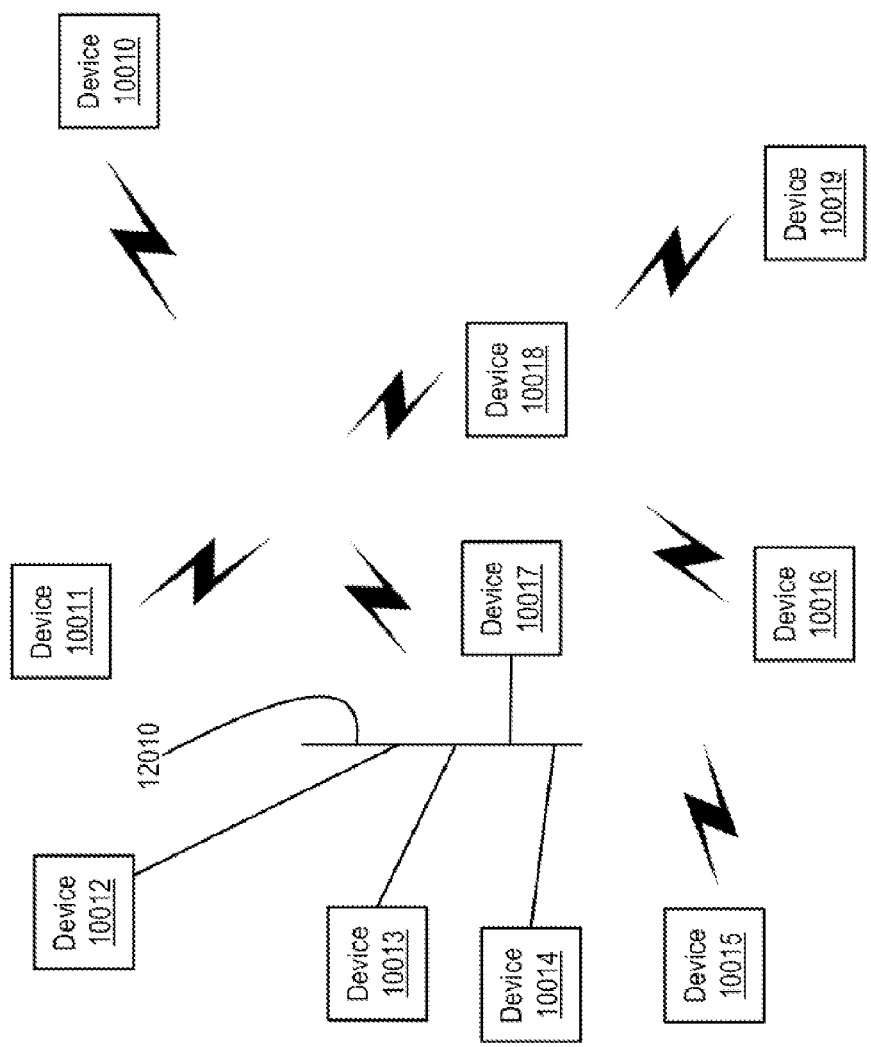
FIG. 12 provides an exemplary illustration of exemplary devices in a third exemplary configuration, according to one or more embodiments.

Turning now to FIGS. 10-12, exemplary devices are illustrated, according to one or more embodiments. As shown in FIG. 10, a device of devices 10010-10019 may wirelessly communicate with another device of devices 10010-10019. In one or more embodiments, devices 10010-10019 may communicate in a wireless mesh fashion. In one or more embodiments, devices 10010-10019 may communicate in a wireless bus fashion. For example, device 10017 may function as a center of a wireless star configuration. In one or more embodiments, a first portion of devices 10010-10019 may communicate in a wireless mesh fashion, and a second portion of devices 10010-10019 may communicate in a wireless bus fashion.

In one or more embodiments, two or more of devices 10010-10019 may wirelessly communicate utilizing one or more of IEEE (Institute of Electrical and Electronics Engineers) 802.11, IEEE 802.15, Bluetooth, IEEE 802.15.4, Zig- Bee, ZWave, wireless USB (universal serial bus), WMBUS (wireless meter bus), IEEE 11073, and a custom wireless protocol and/or interface. In one or more embodiments, a device that may communicate with another device may include one or more of a wireless transmitter, a wireless receiver, and a wireless transceiver.

As illustrated in FIG. 11, one or more of devices 10012-10014 and 10017 may communicate in a wired fashion, and device 10017 may wirelessly communicate with one or more of devices 10010, 10011, and 10015-10019. In one example, devices 10013, 10014, and 10017 may be coupled in a wired fashion utilizing a star configuration. In another example, devices 10013-10014, and 10017 may be coupled in a wired fashion utilizing a multiple star configuration. In one instance, device 10012 may communicate, in wired fashion, with one or more of devices 10014 and 10017 via device 10013. In a second instance, device 10012 may communicate, in a wired and/or wireless fashion, with one or more of devices 10010, 10011, and 10015-10019 via devices 10013 and 10017. In another instance, one or more of devices 10013 and 10014 may communicate, in a wired and/or wireless fashion, with one or more of devices 10010, 10011, and 10015-10019 via device 10017.

As shown in FIG. 12, one or more of devices 10012-10014 and 10017 may communicate in a wired fashion utilizing a wired bus. In one or more embodiments, a wired bus 12010 may couple devices 10012-10014 and 10017. In one example, wired bus 12010 may be or include a wired serial bus. In another example, wired bus 12010 may be or include a wired parallel bus.

In one or more embodiments, wired bus 12010 may communicate data utilizing and/or via at least one of wired Ethernet, 1-Wire, $I^2C$ (inter-integrated circuit), USB (universal serial bus), FireWire (e.g., IEEE 1394), SPI (serial peripheral interconnect), UART (universal asynchronous receiver/transmitter), RS-232, RS-422, RS-485, CAN (controller area network), LIN (local interconnect network), FlexRay, NMEA (National Marine Electronics Association) 2000 Bus, MOST (media oriented systems transport), DVI (digital visual interface), HDMI (high-definition multimedia interface), and D2B (domestic digital bus), among others. In one or more embodiments, a device of devices 10010-10019 may be or include a mobile device (MD). In one or more embodiments, a device of devices 10010-10019 may be or include one or more of a structure and a component, among others, of another device of devices 10010-10019. In one or more embodiments, a device of devices 10010-10019 may include one or more functionalities of another device of devices 10010-10019.

Figure 13:
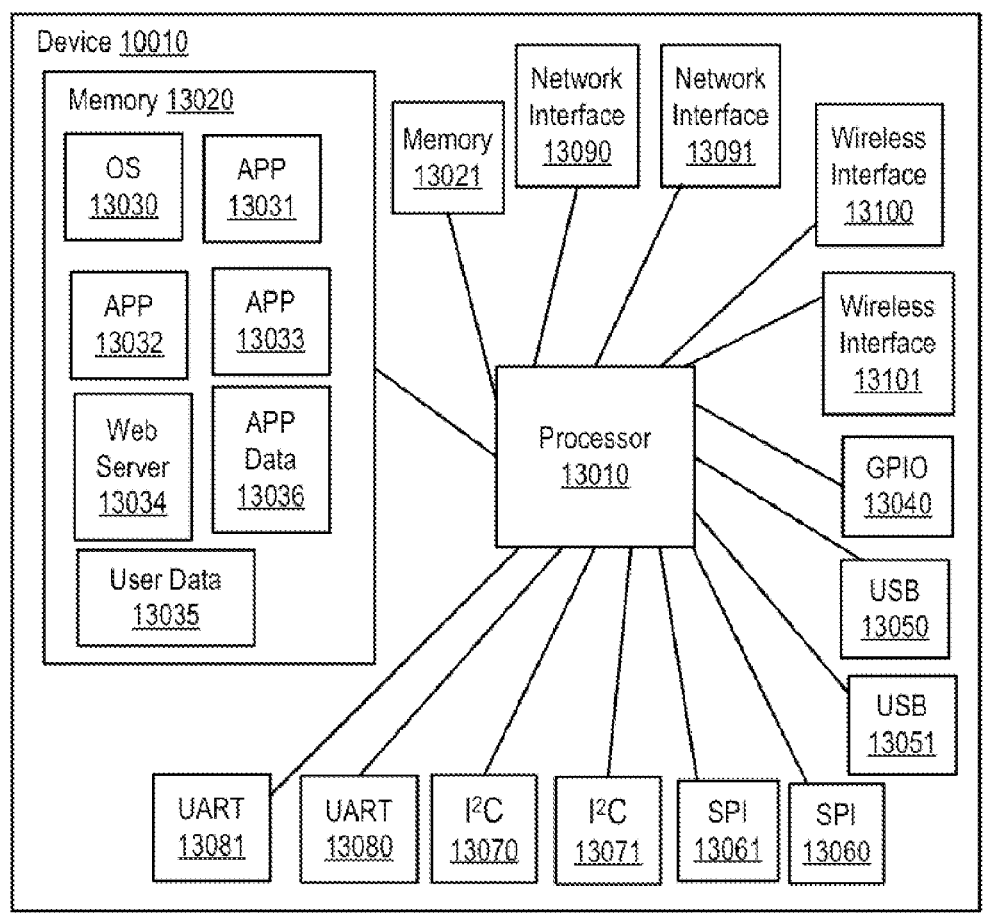
FIG. 13 provides an illustration with further detail of an exemplary device, according to one or more embodiments.

Turning now to FIG. 13, an exemplary device is illustrated, according to one or more embodiments. As shown, device 10010 may include one or more memories 13020 and 13021 coupled to a processor 13010. In one or more embodiments, a processor, described herein, may fetch and/or receive instructions from one or more of memories and execute the instructions to implement one or more of an exemplary method, a process, an exemplary method element, a process element, a portion of an exemplary method element, and a portion of a process element, described herein. For example, a processor may implement an instruction set architecture (ISA) and may execute instructions from and/or associated with the ISA. For instance, the ISA may include at least one of an ARM ISA, a MIPS32 ISA, a MSP430 ISA, an AVR ISA, an AVR-32 ISA, x86 ISA, a DSP (digital signal processor) ISA, a PPC ISA, and an 8051 ISA, among others.

In one or more embodiments, a processor may implement a custom ISA, and the processor may be or include at least one of an ASIC (application specific integrated circuit) and a FPGA (field programmable gate array). In one or more embodiments, at least one of an ASIC and a FPGA may be configured to implement one or more processes, methods, and/or systems described herein. In one or more embodiments, a processor may include one or more processing cores that implement at least one ISA. In one example, a processor may include multiple cores that implement one ISA. In another example, a processor may include multiple cores, where a first core may implement a first ISA and a second core implements a second ISA, different from the first ISA. For instance, the first ISA may include an ARM ISA, and the second ISA may include a C28x ISA.

In one or more embodiments, a processor may include a Havard architecture. For example, a processor may fetch and/or execute instructions from a first memory and may utilize a second memory, different from the first memory, for dynamic data storage and/or retrieval. For instance, a first memory may be or include non-volatile memory, and a second memory may be or include volatile memory. In one or more embodiments, a processor may include a Von Neumann architecture. For example, a processor may fetch and/or execute instructions from a first memory or a second memory, and the processor may utilize the first memory and/or the second memory for dynamic data storage and/or retrieval. In one or more embodiments, multiple memories may be combined into a single device, or the multiple memories may be included in two or more separate devices. In one example, one or more of memories may be included in a processor. In another example, one or more of memories may be external to a processor.

As illustrated, one or more of a GPIO (general purpose input/output) 13040, a USB interface 13050, a USB interface 13051, a SPI (serial peripheral interconnect) interface 13060, a SPI interface 13061, an $I^2C$ (inter-integrated circuit) interface 13070, an $I^2C$ interface 13071, a UART interface 13080, a UART interface 13081, a network interface 13090, a network interface 13091, a wireless interface 13100, and a wireless interface 13101 may be coupled to processor 13010. In one or more embodiments, one or more other devices and/or systems may be coupled to processor 13010 via one or more of components 13040-13101. In one example, device 10010 may be or include a SoC (system on chip) that includes one or more of components 13040-13101, and one or more other devices and/or systems may be coupled to processor 13010 via one or more of components 13040-13101. In a second example, device 10010 may be or include a microcontroller (e.g., a MCU) that includes one or more of components 13040-13101, and one or more other devices and/or systems may be coupled to processor 13010 via one or more of components 13040-13101. In another example, device 10010 may be or include an application(s) processor that includes one or more of components 13040-13101, and one or more other devices and/or systems may be coupled to processor 13010 via one or more of components 13040-13101.

As shown, memory 13020 may include one or more of an operating system (OS) 13030, applications (APPs) 13031-13033, a web server 13034, user data 13035, and application (APP) data 13036, among others. In one or more embodiments, processor 13010 may execute one or more of OS 13030, applications APPs 13031-13033, and web server 13034 and/or utilized one or more of user data 13035, and APP data 13036 to implement one or more of an exemplary method, a process, an exemplary method element, a process element, a portion of an exemplary method element, and a portion of a process element, described herein.

In one or more embodiments, an OS may include a realtime OS (RTOS). For example, the RTOS may include FreeRTOS, OpenRTOS, SafeRTOS, μC/OS-II, μC/OS-III, NuttX, SYS/BIOS, QNX, VxWorks, LynxOS OSE, Atomthreads, Contiki, Sybian OS, ThreadX, or Windows CE, among others. In one or more embodiments, OS 13030 may include an embedded OS. For example, the embedded OS may include a RTOS, embedded Linux, Linux, embedded FreeBSD, FreeBSD, embedded NetBSD, NetBSD, Apple iOS, Google Android, or Minix, among others.

In one or more embodiments, an OS may include a run-to-completion configuration, execution hierarchy, and/or scheduler for a processor. For example, an OS may include Tiny/OS. In one or more embodiments, an OS may include a state machine (e.g., a Mealy state machine, a Moore state machine, a hierarchical state machine, a finite state machine, etc.) configuration, execution hierarchy, and/or scheduler for processor 13010. For example, OS 13030 may include a hierarchical state machine kernel such as QP/C, QP/C++, or QP-nano, among others. In one or more embodiments, an OS may not be included in a device, and one or more of APPs, a web server, may be or include a "bare metal" configuration, execution hierarchy, and/or scheduler for a processor.

Figure 14:
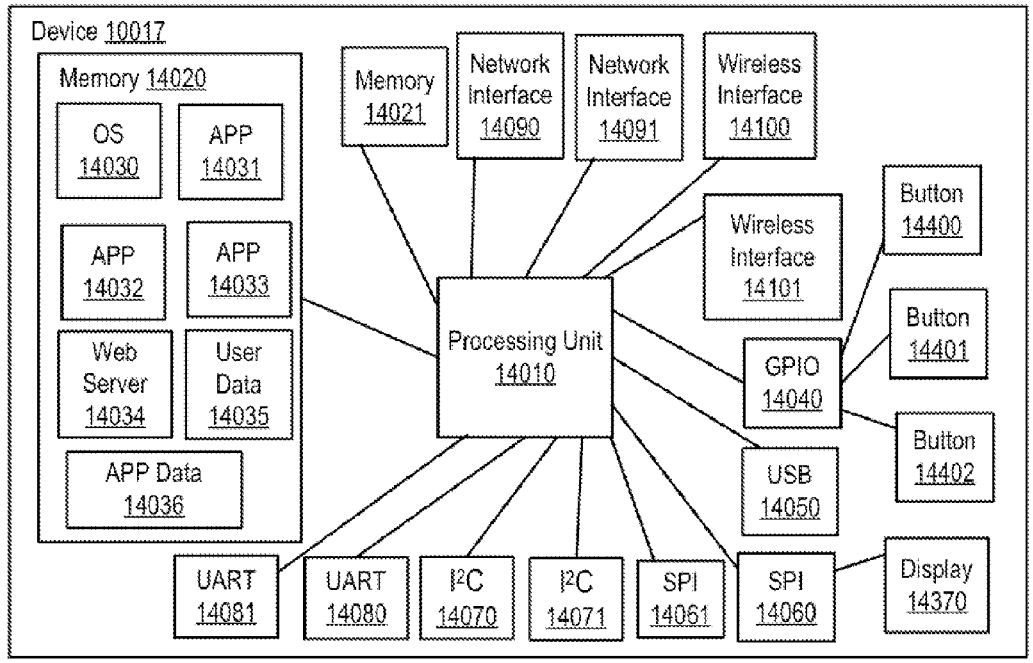
FIG. 14 provides an illustration with further detail of an exemplary device configured to include a display, according to one or more embodiments.

Turning now to FIG. 14, an exemplary device is illustrated, according to one or more embodiments. As shown, device 10017 may include a memory 14020 coupled to a processing unit 14010. As illustrated, memory 14020 may include one or more of an OS 14030, APPs 14031-14033, a web server 14034, user data 14035, and APP data 14036, among others. In one or more embodiments, processor 14010 may execute one or more of OS 14030, applications APPs 14031-14033, and web server 14034 and/or utilized one or more of user data 14035, and APP data 14036 to implement one or more of an exemplary method, a process, an exemplary method element, a process element, a portion of an exemplary method element, and a portion of a process element, described herein.

As shown, processing unit 14010 may be coupled to a memory 14021, a GPIO interface 14040, a USB interface 14050, one or more SPI interfaces 14060 and 14061, one or more I²C interfaces 14070 and 14071, one or more UARTs 14080 and 14081, one or more network interfaces 14090 and 14091, and one or more wireless interfaces 14100 and 14101, among others. As illustrated, one or more buttons 14400-14402 may be coupled to GPIO interface 14040. In one or more embodiments, processing unit 14010 may receive user input via one or more buttons. As shown, a display 14370 may be coupled to SPI interface 14060. In one or more embodiments, processing unit 14010 may provide output via a display.

Figure 15:
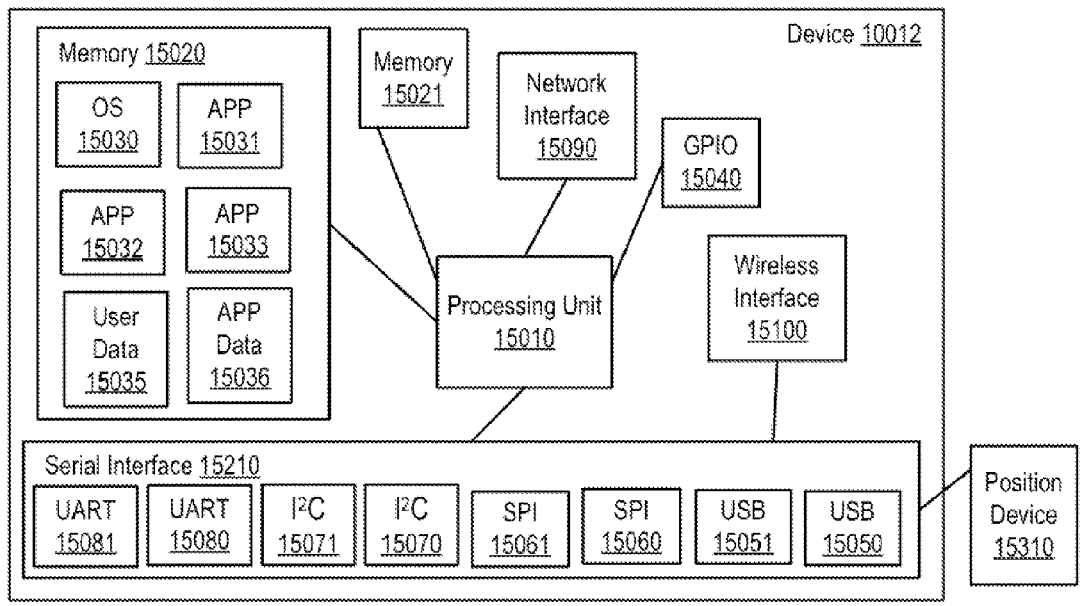
FIG. 15 provides an illustration with further detail of an exemplary device configured to be coupled to a position device, according to one or more embodiments.

Turning now to FIG. 15, an exemplary device is illustrated, according to one or more embodiments. As shown, device 10012 may include one or more memories 15020 and 15021 coupled to a processing unit 15010. As illustrated, memory 15020 may include one or more of an OS 15030, APPs 15031-15033, user data 15035, and APP data 15036, among others. In one or more embodiments, processor 15010 may execute one or more of OS 15030, and applications APPs 15031-15033, and/or utilized one or more of user data 15035, and APP data 15036 to implement one or more of an exemplary method, a process, an exemplary method element, a process element, a portion of an exemplary method element, and a portion of a process element, described herein. As shown, processor 15010 may be coupled to one or more of a GPIO interface 15040 and a network interface 15090, among others.

As illustrated, processing unit 15010 may be coupled to a serial interface 15210, and serial interface 15210 may include one or more of one or more UARTs 15080 and 15081, one or more of I²C interfaces 15070 and 15071, one or more SPI interfaces 15060 and 15061, and one or more USB interfaces 15050 and 15051, among others. As shown, serial interface 15210 may be coupled to one or more of a position device 15310 and a wireless interface 15100, among others.

Figure 16:
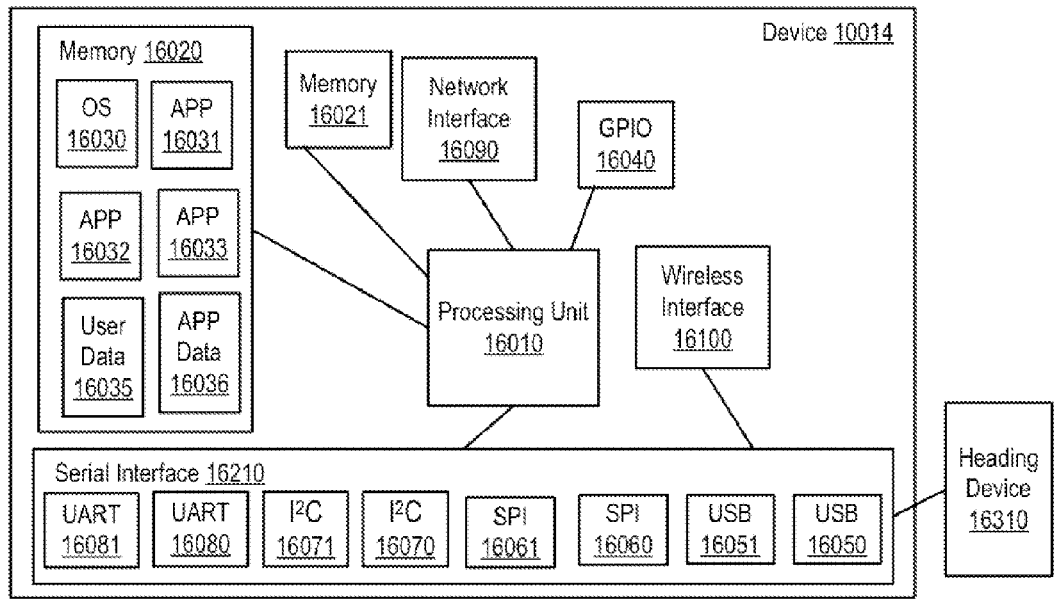
FIG. 16 provides an illustration with further detail of an exemplary device configured to be coupled to a heading device, according to one or more embodiments.

Turning now to FIG. 16, an exemplary device is illustrated, according to one or more embodiments. As shown, device 10014 may include one or more memories 16020 and 16021 coupled to a processing unit 16010. As illustrated, memory 16020 may include one or more of an OS 16030, APPs 16031-16033, user data 16035, and APP data 16036, among others. In one or more embodiments, processor 16010 may execute one or more of OS 16030, and APPs 16031-16033, and/or utilized one or more of user data 16035, and APP data 16036 to implement one or more of an exemplary method, a process, an exemplary method element, a process element, a portion of an exemplary method element, and a portion of a process element, described herein. As shown, processor 16010 may be coupled to one or more of a GPIO interface 16040 and a network interface 16090, among others.

As illustrated, processing unit 16010 may be coupled to a serial interface 16210, and serial interface 16210 may include one or more of one or more UARTs 16080 and 16081, one or more of I²C interfaces 16070 and 16071, one or more SPI interfaces 16060 and 16061, and one or more USB interfaces 16050 and 16051, among others. As shown, serial interface 16210 may be coupled to one or more of a heading device 16310 and a wireless interface 16100, among others.

Figure 17:
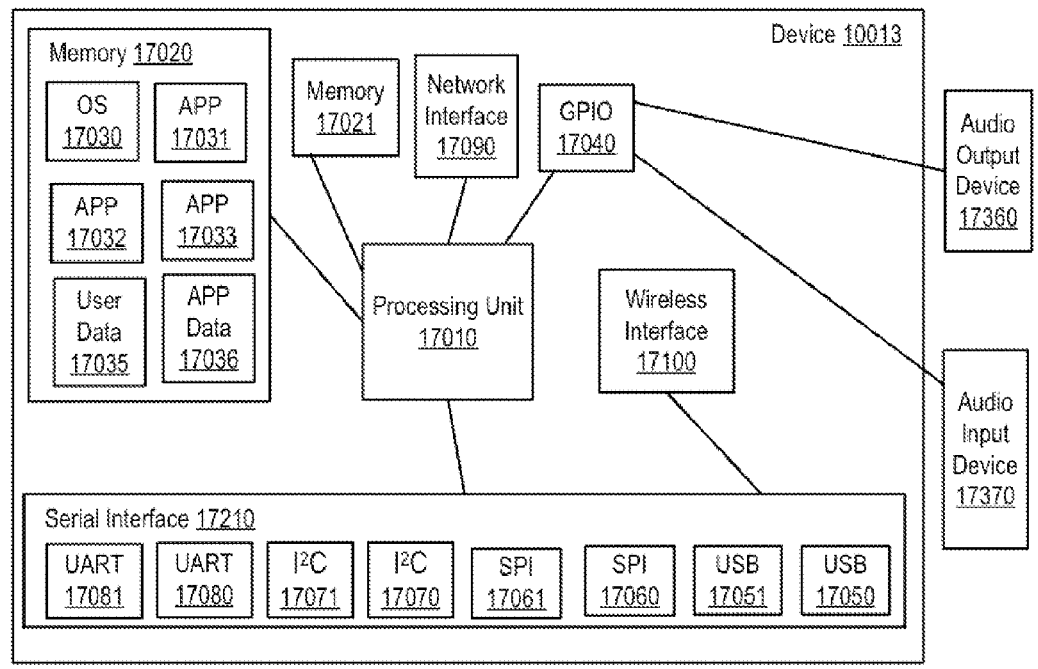
FIG. 17 provides an illustration with further detail of an exemplary device configured to coupled to one or more audio devices, according to one or more embodiments.

Turning now to FIG. 17, an exemplary device is illustrated, according to one or more embodiments. As shown, device 10013 may include one or more memories 17020 and 17021 coupled to a processing unit 17010. As illustrated, memory 17020 may include one or more of an OS 17030, APPs 17031-17033, user data 17035, and APP data 17036, among others. In one or more embodiments, processor 17010 may execute one or more of OS 17030, and APPs 17031-17033, and/or utilized one or more of user data 17035, and APP data 17036 to implement one or more of an exemplary method, a process, an exemplary method element, a process element, a portion of an exemplary method element, and a portion of a process element, described herein. As shown, processor 17010 may be coupled to one or more of a GPIO interface 17040 and a network interface 17090, among others. As illustrated, GPIO interface 17040 may be coupled to one or more of an audio output device 17360 and an audio input device 17370, among others.

As shown, processing unit 17010 may be coupled to a serial interface 17210, and serial interface 17210 may include one or more of one or more UARTs 17080 and 17081, one or more of I²C interfaces 17070 and 17071, one or more SPI interfaces 17060 and 17061, and one or more USB interfaces 17050 and 17051, among others. As illustrated, serial interface 17210 may be coupled to one or more of a heading device 17310 and a wireless interface 17100, among others.

Figure 18A:
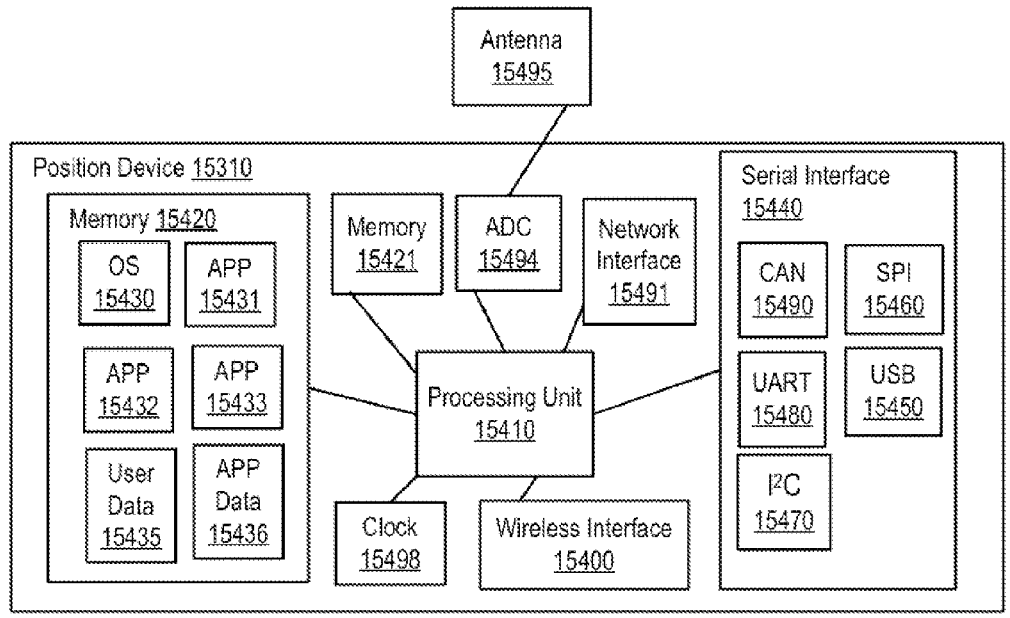
FIG. 18A provides an illustration with further detail of an exemplary position device configured to be coupled to an antenna, according to one or more embodiments.

Turning now to FIG. 18A, a position device is illustrated, according to one or more embodiments. As shown, position device 15310 may include one or more memories 15420 and 15421 coupled to a processor 15410. As illustrated, memory 15420 may include one or more of an OS 15430, user data 15435, APP data 15436, and one or more APPs 15431-15433, among others. In one example, user data 15435 may include information associated with one or more waypoints. In a second example, APP data may include configuration information that may allow position device 15310 to determine a position. In another example, one or more of OS 15430 and one or more of APPs 15431-15433 may include instructions that are executable by processor 15410 to implement one or more processes, methods, and/or systems described herein.

As illustrated, position device 15310 may include a serial interface 15440 coupled to processor 15410. As shown, serial interface may include one or more of a USB interface 15450, a SPI interface 15460, an I²C interface 15470, a UART interface 15480, and a CAN interface 15490, among others. As shown, position device 15310 may include one or more of a wireless interface 15400 and a network interface 15490. In one or more embodiments, position device 15310 may communicate with one or more other devices via one or more of wireless interface 15400, serial interface 15440, and network interface 15490, among others.

Figure 18B:
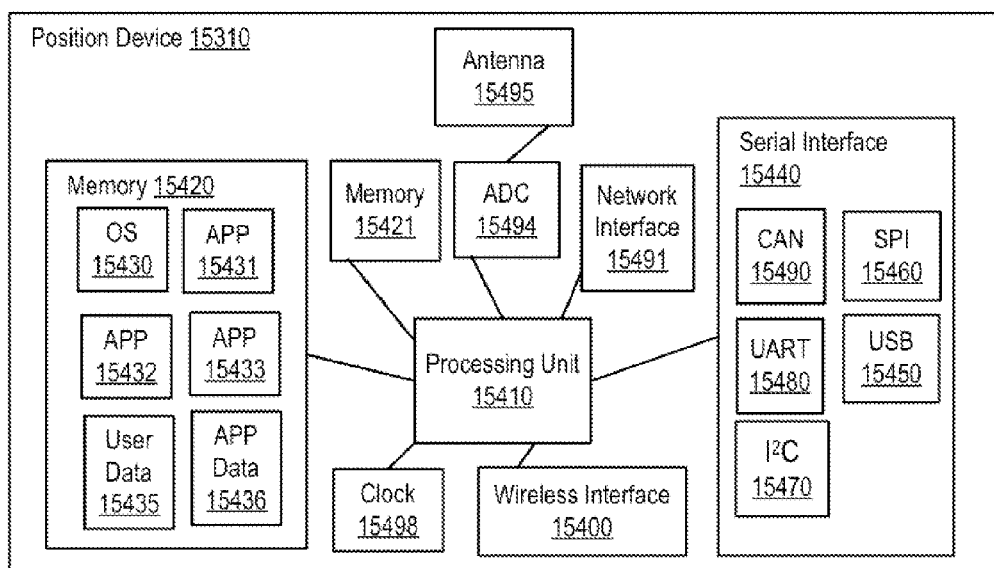
FIG. 18B provides an illustration with further detail of an exemplary position device configured to include an antenna, according to one or more embodiments.

As shown, an antenna 15495 may be coupled to processing unit 15410 via an analog to digital converter (ADC) 15494. In one or more embodiments, position device 15310 may determine a position based on a location of antenna 15495. In one example, antenna 15495 may be a passive antenna. In another example, antenna 15495 may be an active antenna. For instance, antenna 15495 may include one or more active electronic components (e.g., one or more transistors) and/or one or more active electronic circuits (e.g., one or more of an amplifier and an impedance matching circuit, among others). In one or more embodiments, position device 15310 may include antenna 15495, as shown in FIG. 18B.

As illustrated, a clock 15498 may be coupled to processing unit 15410. In one or more embodiments, clock 15498 may be or may not be synchronized with one or more clocks of respective one or more satellites, pseudolites, and/or ground stations. In one example, a bias error (e.g., a consistent error, repeatable error, etc.) and/or a constant offset may be associated with clock 15498 and a system time (e.g., a global positioning system time). In another example, one or more clocks of respective one or more of satellites, pseudolites, and/or ground stations may be offset from the system time. In one or more embodiments, clock 15498 may include an oscillator that may be utilized in generating time information and/or timing information. In one example, clock 15498 may include a ceramic oscillator. In another example, clock 15498 may include a quartz oscillator. In one or more embodiments, clock 15498 may be or include an atomic clock that may be utilized in generating time information and/or timing information. For example, clock 15498 may be or include a chip-scale atomic clock.

In one or more embodiments, time information and/or timing information from clock 15498 may be utilizing in determining a position of antenna 15495. For example, a pseudo range from antenna 15495 to a satellite, pseudolite, or ground station may be determined utilizing clock 15498 which may be or may not by synchronized with a clock of the satellite, pseudolite, or ground station. For instance, the pseudo range may be determined utilizing first time information from the satellite, pseudolite, or ground station and second time information from clock 15498 which may be or may not be synchronized with the clock of the satellite, pseudolite, or ground station.

In one or more embodiments, position device 15310 may determine a position of antenna 15495 via receiving multiple signals, via antenna 15495, from respective multiple satellite(s), pseudolite(s), and/or ground station(s). In one example, position device 15310 may determine a position of antenna 15495 via receiving at least three signals from respective at least three satellites, pseudolites, and/or ground stations. In another example, position device 15310 may determine a position of antenna 15495 via receiving at least four signals from respective at least four satellites, pseudolites, and/or ground stations. For instance, the at least four signals from respective at least four satellites, pseudolite, and/or ground stations may be utilized in populating information associated with four equations of four unknowns (e.g., $x_a$, $y_a$, and $z_a$ of antenna 15495 and a time offset), and processor 15410 may execute instructions from a memory (e.g., memory 15420, memory 15421, etc.) to compute the four unknowns that are associated with and/or that include the position of antenna 15495.

In one or more embodiments, signals from multiple satellites, pseudolites, and/or ground stations may include a direct sequence spread spectrum (DSSS) modulation that may provide a structure for transmission and/or reception ranging signals and/or navigation data. In one example, the signals from multiple of satellite(s), pseudolite(s), and/or ground station(s) may include ranging signals that may include PRN (pseudorandom noise) codes that may binary phase shift key (BPSK) one or more carrier frequencies of the signals from multiple satellites, pseudolites, and/or ground stations. In one instance, a carrier frequency and/or center frequency may include 1176.45 MHz (e.g., L5). In a second instance, a carrier frequency and/or center frequency may include 1227.6 MHz (e.g., L2). In another instance, a carrier frequency and/or center frequency may include 1575.42 MHz (e.g., L1). In another example, the signals from multiple of satellite(s), pseudolite(s), and/or ground station(s) may include ranging signals that may include M-codes that may include and/or utilize a binary offset carrier that may be referred to as BOC(m,n) codes. For instance, M-codes may include BOC(10,5) codes.

In one or more embodiments, utilizing BOC(m,n) codes may include modulating a signal, where a modulated signal divides signal power, mainly, between two spectral lobes symmetrically about a center frequency. In one example, a center frequency may include 1176.45 MHz (e.g., L5). In a second example, a center frequency may include 1227.6 MHz (e.g., L2). In another example, a center frequency may include 1575.42 MHz (e.g., L1).

In one or more embodiments, a signal received from a satellite, pseudolite, or ground station may include one or more of navigation data and one or more ranging codes, among others. For example, the signal received from the satellite, pseudolite, or ground station that includes the one or more of the navigation data and the one or more ranging codes may include a spread spectrum format. For instance, the spread spectrum format may include a CDMA (code division multiple access) format.

In one or more embodiments, ADC 15494 may sample the signal from the satellite, pseudolite, or ground station and may transform the signal from the satellite or ground station to a digital signal that may be processed by processing unit 15410. In one example, the signal from the satellite or ground station may include a BOC(m,n) code, the signal from the satellite, pseudolite, or ground station may be down converted to an intermediate frequency signal, and ADC 15494 may sample the intermediate frequency signal at a rate at least twice a chipping rate (e.g., a digital clock rate, a digital clock frequency, etc.) of the BOC(m,n) code.

In another example, the signal from the satellite, pseudolite, or ground station may include a PRN code, the signal from the satellite, pseudolite, or ground station may be down converted to an intermediate frequency signal, and ADC 15494 may sample the intermediate frequency signal at a rate at least twice a chipping rate (e.g., a digital clock rate, a digital clock frequency, etc.) of the PRN code. In one instance, the chipping rate may be 1.023 MHz for a L1 C/A code. In another instance, the chipping rate may be 10.23 MHz for a L1 and L2 P(Y) code. In one or more embodiments, oversampling may reduce a receiver sensitivity to an analog to digital conversion, which may reduce a number of bits required for an analog to digital conversion.

In one or more embodiments, processing unit 15410 may perform one or more DSP functions. In one example, processing unit 15410 may execute instructions from a memory to perform one or more DSP functions. In another example, processing unit 15410 may include a digital signal processing unit that may perform one or more DSP functions. In one or more embodiments, processing unit 15410 may receive samples from ADC 15494 and may process the samples. In one example, multiple digital signal processing channels may process multiple codes from respective multiple satellites, pseudolites, and/or ground stations. For instance, N (e.g., a positive integer greater than one) digital signal processing channels may process N codes from respective N satellites, pseudolites, and/or ground stations. In another example, the digital signal processing unit may include N (e.g., a positive integer greater than one) digital signal processing channels that may process N codes from respective N satellites, pseudolites, and/or ground stations.

In one or more embodiments, each channel of the multiple digital signal processing channels may compute code measurements, carrier-phase measurements, and/or navigation data demodulation. For example, each channel of the multiple digital signal processing channels may include code and/or carrier tracking loops to compute the code measurements, the carrier-phase measurements, and/or the navigation data demodulation. In one or more embodiments, each channel of the multiple digital signal processing channels may correspond to and/or may be associated with one or more types of satellite-to-antenna, pseudolite-to-antenna, or ground station-to-antenna measurements. For example, the one or more types measurements may include one or more of a pseudo range, a delta range (e.g., a delta pseudo range), and a Doppler shift, among others.

In one or more embodiments, processing unit 15410 may compute a position of antenna 15495 from the N digital signal processing channels. For example, N may be four, and processing unit 15410 may compute a solution to four equations associated with four unknowns to compute the position of antenna 15495. For instance, the four unknowns may include $x_a$, $y_a$, and $z_a$ (of a Cartesian coordinate system) corresponding to the position of antenna 15495 and a time offset, and each of the four equations may be populated with corresponding information from, or derived from, a respective one of the four digital signal processing channels.

In one or more embodiments, one or more signals from a satellite, pseudolite, or ground station may include a unique ranging code. For example, a first ranging code from a first satellite, pseudolite, or ground station may be different from a second ranging code from a second satellite, pseudolite, or ground station, different from the first satellite, pseudolite, or ground station. For instance, the first ranging code and the second range code may include and/or be associated with low cross-correlation properties.

In one or more embodiments, one or more signals from a satellite, pseudolite, or ground station may include ephemeris information that may be utilized by position device 15310 in determining a position of the satellite, pseudolite, or ground station. For example, the one or more signals from the satellite, pseudolite, or ground station may include one or more of a reference time of ephemeris, a square root of a semimajor axis of an orbit, an eccentricity of an orbit, an inclination angle, a longitude of an ascending node (e.g., at a weekly epoch), an argument of a perigee at the reference time of ephemeris, a mean anomaly at the reference time of ephemeris, a rate of change of the inclination angle, a rate of change of longitude of the ascending node, a mean motion correction, an amplitude of sine correction to an argument of latitude, an amplitude of cosine correction to the argument of latitude, an amplitude of sine correction to an orbital radius, an amplitude of cosine correction to the orbital radius, an amplitude of sine correction to the inclination angle, and an amplitude of cosine correction to the inclination angle, among others.

For instance, position device 15310 may utilize the ephemeris information to determine a position (e.g., $x_s$, $y_s$, $z_s$ in a Cartesian coordinate system) of the satellite, pseudolite, or ground station. In one or more embodiments, position device 15310 may transform the one or more signals (e.g., analog signals) from the satellite, pseudolite, or ground station into the ephemeris information to determine a position (e.g., $x_s$, $y_s$, $z_s$ in a Cartesian coordinate system) of the satellite, pseudolite, or ground station. In one or more embodiments, $x_s$, $y_s$, $z_s$ in a Cartesian coordinate system may be associated with an Earth-centered Earth-fixed (ECEF) coordinate system. For example, the ECEF coordinate system rotates with Earth. For instance, a latitude, a longitude, and a height (e.g., a distance from a center of Earth, a distance above a surface of Earth, etc.) may rotate with Earth.

In one or more embodiments, position device 15310 may determine a position of antenna 15495 and a time offset based on at least four positions of at least four different satellites, pseudolites, and/or ground stations. For example, a pseudorange for an ith satellite may be expressed as pseudorange$_i = \|\vec{s}_i - \vec{a}\| + ct_{pd}$; where $\vec{s}_i$ is a position of the ith satellite, $\vec{a}$ is a position of antenna 15495, c is a speed of light (e.g., an assumed or an approximate propagation speed of the one or more signals from the ith satellite), and $t_{pd}$ is an advance of clock 15498 with respect to the system time (i.e., global position system time). In one or more embodiments, pseudorange$_i$ may be computed i ∈ {1 ... M} for some M≥4, and the position of antenna 15495 may be a position associated with a radius of uncertainty. For example, computing the position of antenna 15495 may minimize the radius of uncertainty and/or reduce an approximation of a position of antenna 15495. For instance, computing the position of antenna 15495 may utilize a least squares fit method and/or process. In one or more embodiments, $\|\vec{s}_i - \vec{a}\| + ct_{pd}$ may be approximated by a Taylor series expansion in computing the position of antenna 15495. For example, the Taylor series expansion of $\|\vec{s}_i - \vec{a}\| + ct_{pd}$ may produce linear equations that may be utilized in a least squares fit method and/or process. For instance, the Taylor series expansion of $\|\vec{s}_i - \vec{a}\| + ct_{pd}$ may be or include a Taylor series expansion of $\sqrt{(x_i - x_a)^2 + (y_i - y_a)^2 + (z_i - z_a)^2} + ct_{pd}$.

In one or more embodiments, position device 15310 may determine a position of antenna 15495 and a time offset based on at least three positions of at least three different satellites, pseudolites, and/or ground stations. For example, a pseudorange for an ith satellite may be expressed as pseudorange$_i = \|\vec{s}_i - \vec{a}\| + ct_{pd}$; where $\vec{s}_i$ is a position of the ith satellite, $\vec{a}$ is a position of antenna 15495, c is a speed of light (e.g., an assumed or an approximate propagation speed of the one or more signals from the ith satellite), and $t_{pd}$ is an advance of clock 15498 with respect to the system time (i.e., global position system time). In one or more embodiments, pseudorange$_i$ may be computed i ∈ {1 ... M} for some M≥3, and the position of antenna 15495 may be a position associated with a radius of uncertainty. In one example, clock 15498 may be at least as accurate a clock on one of the three satellites. For instance, clock 15498 may be at least as accurate an atomic clock. In another example, a height of antenna 15495 may be available (e.g., known) and may be utilized in computing multiple pseudoranges.

In one or more embodiments, position device 15310 may determine a position of antenna 15495 and a time offset based on multiple positions of multiple different satellites, pseudolites, and/or ground stations. For example, a pseudorange for an ith satellite may be expressed as $\text{pseudorange}_i = \|\bar{s}_i - \bar{a}\| + ct_{pd}$; where $\bar{s}_i$ is a position of the ith satellite, $\bar{a}$ is a position of antenna 15495, c is a speed of light (e.g., an assumed or an approximate propagation speed of the one or more signals from the ith satellite), and $t_{pd}$ is an advance of clock 15498 with respect to the system time (e.g., global position system time). In one or more embodiments, a Kalman filtering system, method and/or process may be utilized in computing the multiple pseudoranges. For example, a Kalman filtering system, method and/or process may be utilized in computing one or more of position data, velocity data, and time data, among others. In one instance, the multiple pseudoranges may include three or more pseudoranges. In another instance, the multiple pseudoranges may include four or more pseudoranges.

In one or more embodiments, a Kalman filtering system, method and/or process may be utilized in integrating data from multiple sensors. For example, a Kalman filtering system, method and/or process may include a statistical filtering system, method and/or process that combines a dynamic model of a system with one or more statistical behaviors of errors associated with the system. For instance, a Kalman filtering system, method and/or process may manage and/or endure one or more of GPS signal interruption, magnetic anomalies, and sensor irregularities, among others, to minimize one or more degradations of one or more accuracies.

In one or more embodiments, position device 15310 may provide the position of antenna 15495 to another device. For example, position device 15310 may provide the position of antenna 15495 to another device via at least one of wireless interface 15400, network interface 15490, and serial interface 15440.

In one or more embodiments, a position may be determined based on positions of multiple ground stations and/or pseudolites wirelessly communicating or being capable of wirelessly communicating with a position device. In one example, a position of a device may be determined via multilateration which is a navigation technique that may utilize measurements of differences in distances to two or more multiple ground stations and/or pseudolites, at previously determined or known locations, that broadcast one or more signals at previously determined or known times. In a second example, a position of a device may be determined via trilateration which is a navigation technique that may utilize distances or absolute measurements of time-of-flight from three or more ground stations and/or pseudolites. In another example, a position of a device may be determined via triangulation which is a navigation technique that may utilize measurements of absolute angles.

Figure 18C:
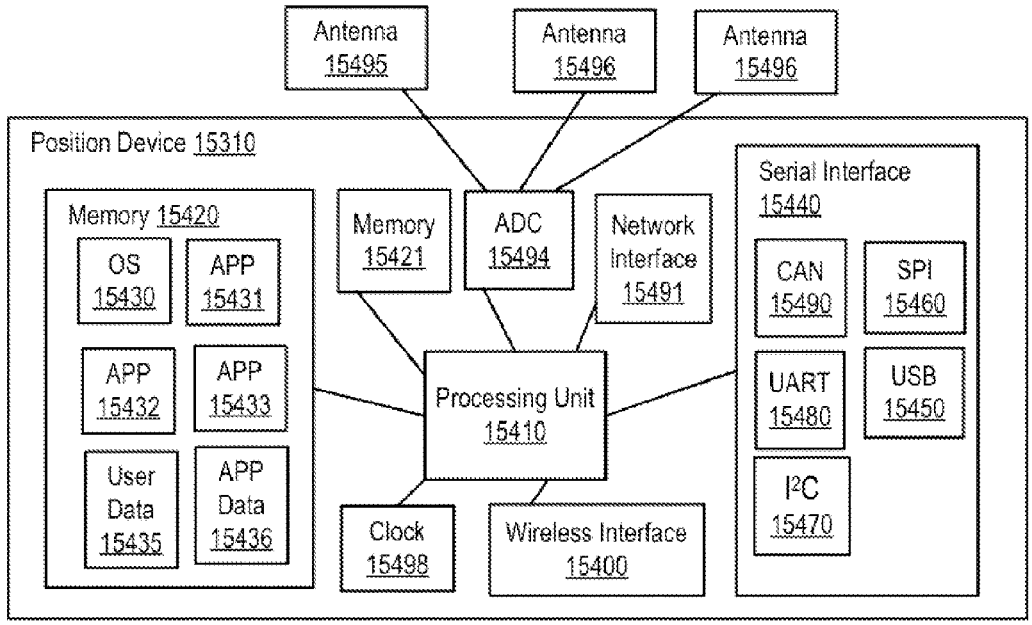
FIG. 18C provides an illustration with further detail of an exemplary position device configured to be coupled to two or more antennas, according to one or more embodiments.

As illustrated in FIG. 18B, position device 15310 may include antenna 15495. As shown in FIG. 18A, antenna 15495 may be external to and coupled to position device 15310. In one or more embodiments, position device 15310 may utilize and may be coupled to two or more antennas. For example, position device 15310 may utilize and may be coupled to two or more antennas such as two or more of antennas 15495-15497 as illustrated in FIG. 18C. In one or more embodiments, position device 15310 may utilize two or more antennas to determine one or more of instantaneous heading information and yaw information, among others. For example, each of the two or more antennas may be located at least one meter from another of the two or more antennas.

Figure 19:
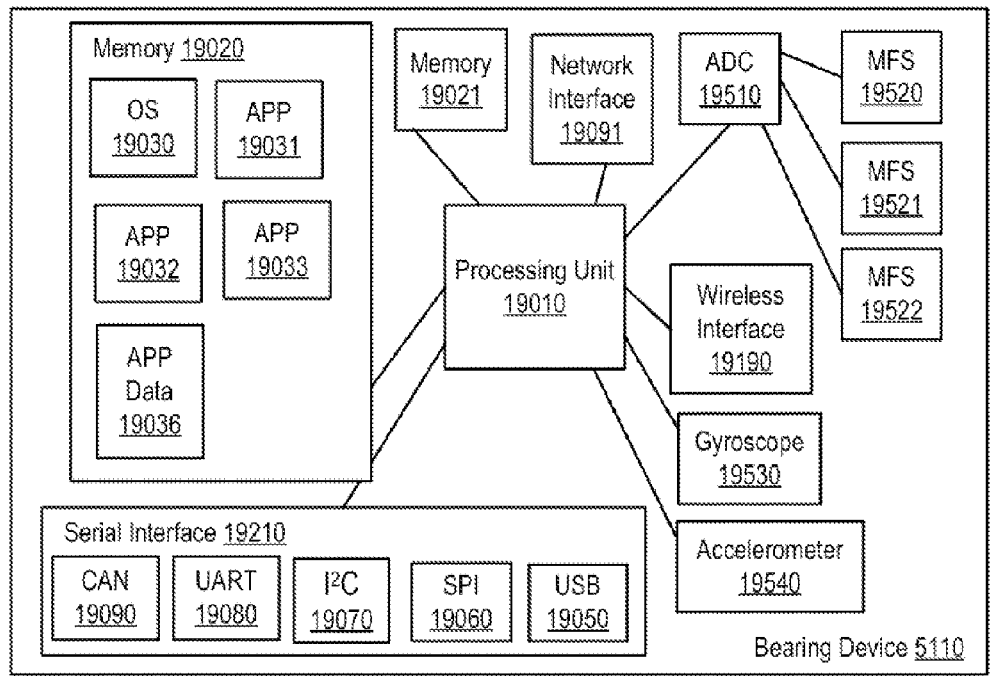
FIG. 19 provides an illustration with further detail of an exemplary bearing device, according to one or more embodiments.

Turning now to FIG. 19, a bearing device is illustrated, according to one or more embodiments. As shown, bearing device 5110 may include one or more memories 19020 and 19021 coupled to a processing unit 19010. As illustrated, memory 19020 may include one or more of an OS 19030, APP data 19036, and one or more APPs 19031-19033, among others. In one example, APP data 19036 may include information associated with an angle of declination, soft iron offset information, hard iron offset information, etc. In a second example, APP data may include configuration information that may allow bearing device 5110 to determine a bearing, as described herein. In another example, one or more of OS 19030 and one or more of APPs 19031-19033 may include instructions that are executable by processing unit 19010 to implement one or more processes, methods, and/or systems described herein.

As illustrated, bearing device 5110 may include a serial interface 19210 coupled to processing unit 19010. As shown, serial interface 19210 may include one or more of a USB interface 19050, a SPI interface 19060, an I$^2$C interface 19070, a UART interface 19080, and a CAN interface 19090, among others. As shown, bearing device 5110 may include one or more of a wireless interface 19000 and a network interface 19091. In one or more embodiments, bearing device 5110 may communicate with one or more other devices via one or more of wireless interface 19190, serial interface 19210, and network interface 19091, among others.

As shown, one or more of magnetic field sensors (MFSs) 19520-19522 may be coupled to processing unit 19010 via an ADC 19510. In one or more embodiments, a magnet field sensor (MFS) (e.g., a MFS device) may transform a magnetic field into voltages, currents, and/or numbers. For example, the MFS may transform magnetic field magnitudes into voltages, currents, and/or numbers. For instance, the MFS may transform magnetic field magnitudes into one or more machine-readable (e.g., computer-readable) signals. In one or more embodiments, the magnetic field that is transformed into one or more of voltages, currents, numbers, and machine-readable (e.g., computer-readable) signals, among others, may be a magnetic field of a planet (e.g., an Earth).

In one or more embodiments, a MFS may transform magnetic field magnitudes into one or more analog signals (e.g., one or more voltage signals, one or more current signals, etc.), and ADC 19510 may transform the one or more analog signals associated with the magnetic field magnitudes into digital data that may be utilized by processing unit 19010. For example, a MFS may include one or more of a magnetometer, a saturable core magnetometer, a fluxgate magnetometer, a Hall effect sensor, a magneto-resistive sensor, and a magneto-inductive sensor, among others, and ADC 19510 may transform the one or more analog signals, from the MFS, associated with the magnetic field magnitudes into digital data that may be utilized by processing unit 19010.

In one or more embodiments, a MFS may be associated with an axis of measurement, and the MFS may transform magnetic field magnitudes associated with the axis of measurement into one or more signals (e.g., voltages, currents, machine-readable signals, computer-readable signals, etc.). For example, a measurement of a magnetic field magnitude may be or include a function of an angle between the magnetic field and the axis of measurement associated with the MFS. For instance, magnetic field magnitude may be proportional to a trigonometric function (e.g., sine, cosine, tangent, arcsine, arccosine, arctangent, etc.) of an angle between the magnetic field and the axis of measurement associated with the MFS (e.g., an angle between one or more lines of flux of the magnetic field and the axis of measurement associated with the MFS).

In one or more embodiments, axes of MFSs 19520-19522 may correspond with respective three orthogonal axes of bearing device 5110. For example, an axis of MFS 19520 may correspond to the left and right of the page that includes FIG. 19 (e.g., a x-axis), an axis of MFS 19521 may correspond to the bottom and top of the page that includes FIG. 19 (e.g., a y-axis), and an axis of MFS 19522 may correspond to a line out of the page that includes FIG. 19 (e.g., a z-axis).

In one or more embodiments, measuring magnetic field magnitudes along three orthogonal axes may be utilized in computing more readings when bearing device 5110 is tilted or is not orthogonal to a line from an origin (e.g., a center of sphere 6000, a center of Earth, etc.) to bearing device 5110. For example, measuring magnetic field magnitudes along three orthogonal axes and determining one or more tilt angles of bearing device 5110 (e.g., one or more angles of pitch of bearing device 5110, one or more angles of roll of bearing device 5110, etc.) may permit more accurate computations of bearings than measuring magnetic field magnitudes along two orthogonal axes when bearing device 5110 is tilted or is not orthogonal to a line from an origin (e.g., a center of sphere 6000, a center of Earth, etc.) to bearing device 5110.

Figure 20:
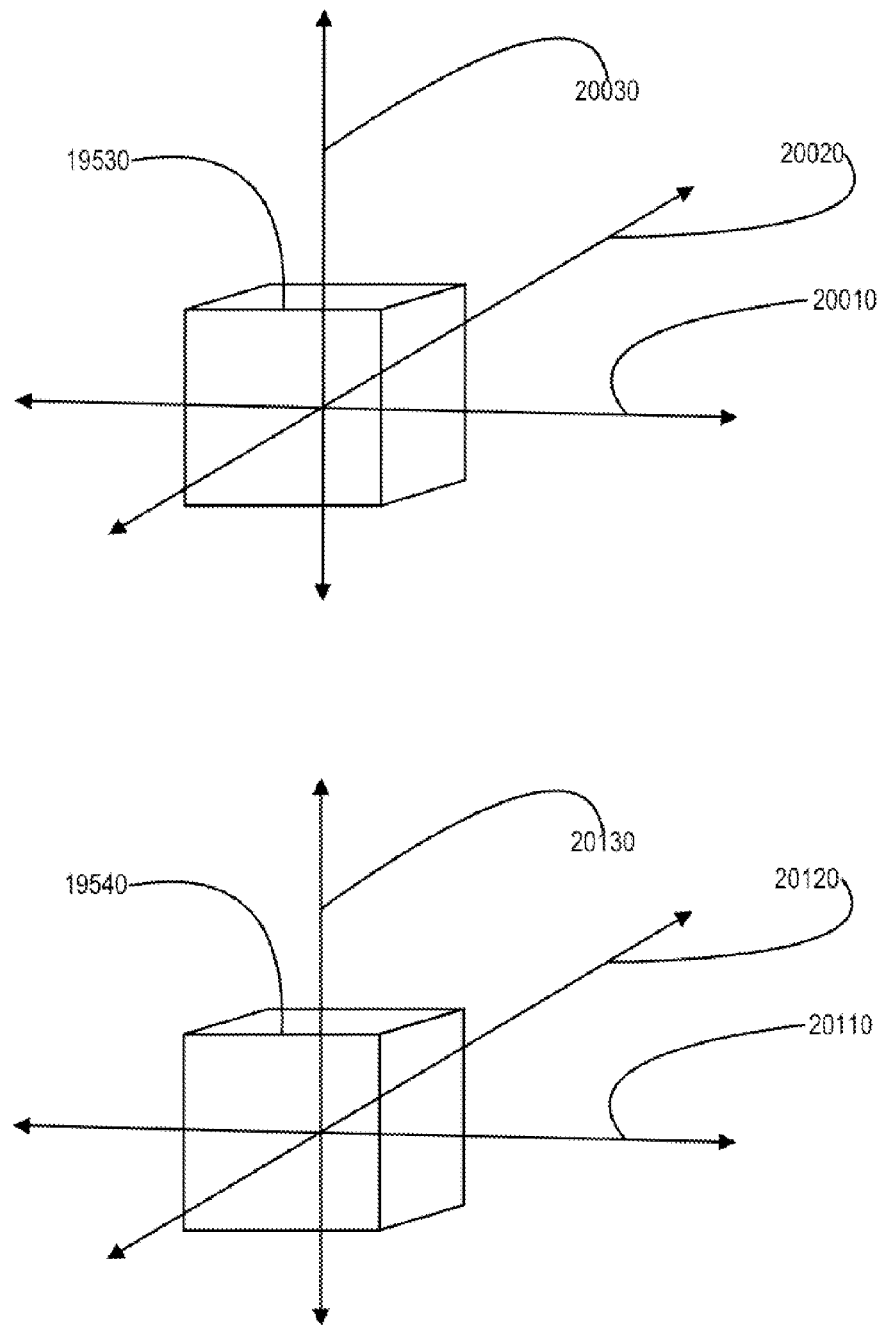
FIG. 20 illustrates exemplary axes of exemplary devices, according to one or more embodiments.

In one or more embodiments, computing one or more tilt angles may include receiving data from an accelerometer. As illustrated, bearing device 5110 may include an accelerometer 19540 coupled to processing unit 19010. For example, accelerometer 19540 may include a micro electromechanical system (MEMS) that may transform one or more changes of one or more angles of pitch, roll, and yaw into voltages, currents, numbers, and/or machine-readable (e.g., computer-readable) signals. For instance, accelerometer 19540 may be associated with axes 20110-20130, as illustrated in FIG. 20. In one or more embodiments, computing one or more tilt angles may include receiving data from a gyroscope. As shown in FIG. 19, bearing device 5110 may include a gyroscope 19530 coupled to processing unit 19010. For example, gyroscope 19530 may include a MEMS that may transform one or more changes of one or more angles of pitch, roll, and yaw into voltages, currents, numbers, and/or machine-readable (e.g., computer-readable) signals. For instance, gyroscope 19530 may be associated with axes 20010-20030, as illustrated in FIG. 20.

In one or more embodiments, an accelerometer device (e.g., accelerometer 19540) may transform accelerations along an axis into voltages, currents, and/or numbers. In one example, an accelerometer device may transform one or more rates of change in velocity into voltages, currents, and/or numbers. For instance, an accelerometer device may transform one or more rates of change in velocity into one or more machine-readable (e.g., computer-readable) signals. In another example, an accelerometer device may transform one or more phenomena of weight (e.g., one or more forces of gravity upon an object associated with a mass) associated with a test mass at rest in a frame of reference of the accelerometer device into voltages, currents, and/or numbers. In one instance, the accelerometer device may transform one or more phenomena of weight associated with a test mass at rest in a frame of reference of the accelerometer device into one or more machine-readable (e.g., computer-readable) signals. In another instance, the accelerometer device may include a MEMS that may transform accelerations along an axis into voltages, currents, numbers, and/or machine-readable (e.g., computer-readable) signals.

In one or more embodiments, the accelerometer device may transform one or more phenomena of weight associated with a test mass at rest in a frame of reference of the accelerometer device and associated with an axis of the accelerometer device into one or more machine-readable (e.g., computer-readable) signals. For example, determining a tilt or difference in angle between a first axis and the axis associated with the accelerometer device may include determining a difference between a first acceleration and a second acceleration. For instance, the first acceleration may be determined when the axis associated with the accelerometer device corresponds to and/or is aligned with a vector from an origin (e.g., an center of a sphere, a center of mass of a planet, etc.), and the second acceleration the second acceleration may be determined when the axis associated with the accelerometer device does not correspond to and/or is not aligned with a vector from the origin. In one or more embodiments, a difference between the first acceleration and the second acceleration may be utilized in determining an angle between the axis associated with the accelerometer device and a vector from the origin. For example, the difference between the first acceleration and the second acceleration may be utilized in determining an angle of tilt (e.g., angle of pitch and/or angle of roll) of the accelerometer device and/or a structure that is coupled to the accelerometer device.

Figure 21:
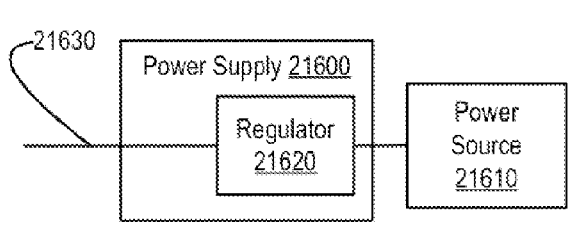
FIG. 21 illustrates an exemplary power supply configured to be coupled to an exemplary power source, according to one or more embodiments.

Turning now to FIG. 21, an exemplary power system is illustrated, according to one or more embodiments. As shown, a power supply 21600 may include a regulator 21620 which may be coupled to a power source 21610. In one or more embodiments, power source 21610 may supply one or more electrical currents at one or more voltages. In one example, power source 21610 may include a battery. In a second example, power source 21610 may include a photovoltaic cell (e.g., a solar cell). In a third example, power source 21610 may include a fuel cell. In another example, power source 21610 may include a generator. In one or more embodiments, regulator 21620 may regulate one or more of one or more voltages and one or more currents. In one or more embodiments, power from regulator 21620 may be transmitted to one or more devices described herein via a transmission line 21630. In one or more embodiments, a transmission line may include and/or be associated with an electrical ground and/or an electrical reference.

Figure 22:
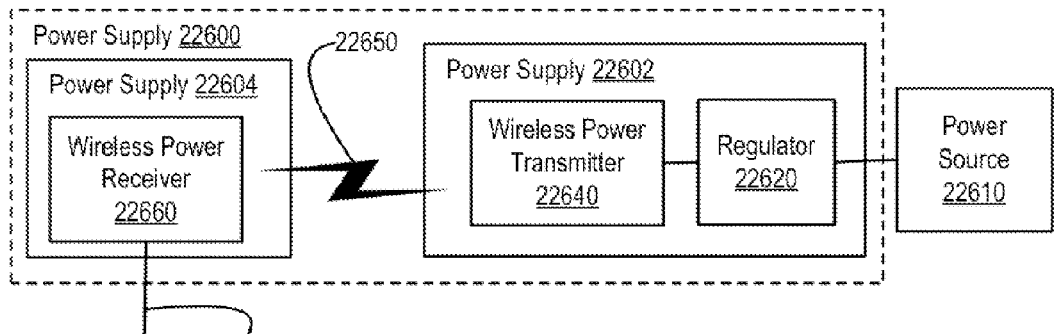
FIG. 22 illustrates an exemplary power system, according to one or more embodiments.

Turning now to FIG. 22, an exemplary power system is illustrated, according to one or more embodiments. As shown, a power supply 22600 may include one or more of power supplies 22602 and 22604. As illustrated, power supply 22602 may include a regulator 22620 which may be coupled to a power source 22610 and a wireless power transmitter 22640. In one or more embodiments, power source 22610 may supply one or more electrical currents at one or more voltages. In one example, power source 22610 may include a battery. In a second example, power source 22610 may include a photovoltaic cell (e.g., a solar cell). In a third example, power source 22610 may include a fuel cell. In another example, power source 22610 may include a generator. In one or more embodiments, regulator 22620 may regulate one or more of one or more voltages and one or more currents.

In one or more embodiments, wireless power transmitter 22640 may transmit one or more power electromagnetic signals 22650 to power supply 22604. As shown, power supply 22604 may include a wireless power receiver 22660 that may receive the one or more power electromagnetic signals 22650. In one or more embodiments, power from wireless power receiver 22660 may be transmitted to one or more devices described herein via a transmission line 22630.

Figure 23:
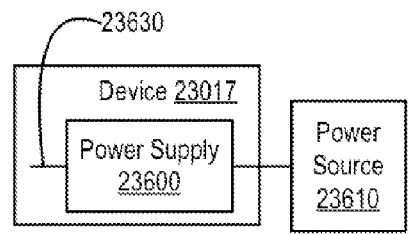
FIG. 23 illustrates an exemplary mobile device configured to include an exemplary power supply configured to be coupled to an exemplary power source, according to one or more embodiments.

Turning now to FIG. 23, a mobile device is illustrated, according to one or more embodiments. As shown, device 23017 may include a power supply 23600 that may be coupled to a power source 23610. In one or more embodiments, power source 23610 may supply one or more electrical currents at one or more voltages. In one example, power source 23610 may include a battery. In a second example, power source 23610 may include a photovoltaic cell (e.g., a solar cell). In a third example, power source 23610 may include a fuel cell. In another example, power source 23610 may include a generator.

In one or more embodiments, power supply 23600 may include one or more structures and/or functionalities described with reference to power supply 21600. In one or more embodiments, power from power supply 23600 may be transmitted to one or more components of device 23017 via a transmission line 23630. In one or more embodiments, one or more other devices described herein may include one or structures and/or functionalities as those described with reference to device 23017.

Figure 24:
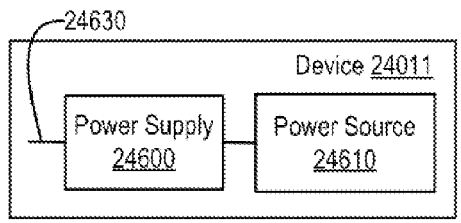
FIG. 24 illustrates an exemplary mobile device configured to include an exemplary power supply and an exemplary power source, according to one or more embodiments.

Turning now to FIG. 24, a mobile device is illustrated, according to one or more embodiments. As shown, device 24011 may include a power supply 24600 and a power source 24610. As illustrated, power supply 24600 may be coupled to power source 24610. In one or more embodiments, power supply 24600 may include one or more structures and/or functionalities described with reference to power supply 21600. In one or more embodiments, power source 24610 may supply one or more electrical currents at one or more voltages. In one example, power source 22610 may include a battery. In a second example, power source 24610 may include a photovoltaic cell (e.g., a solar cell). In a third example, power source 24610 may include a fuel cell. In another example, power source 24610 may include a generator.

In one or more embodiments, power from power supply 24600 may be transmitted to one or more components of device 24011. In one or more embodiments, one or more other devices described herein may include one or structures and/or functionalities as those described with reference to device 24011 via a transmission line 24630.

Figure 25:
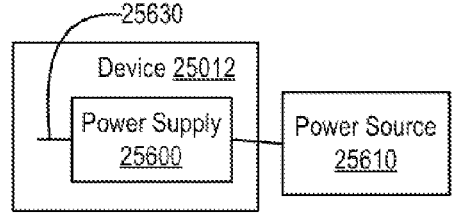
FIG. 25 illustrates an exemplary mobile device configured to include an exemplary power supply coupled to an exemplary power source, according to one or more embodiments.

Turning now to FIG. 25, a mobile device is illustrated, according to one or more embodiments. As shown, device 25012 may include a power supply 25600 that may be coupled to a power source 25610. In one or more embodiments, power source 25610 may supply one or more electrical currents at one or more voltages. In one example, power source 25610 may include a battery. In a second example, power source 25610 may include a photovoltaic cell (e.g., a solar cell). In a third example, power source 25610 may include a fuel cell. In another example, power source 25610 may include a generator.

In one or more embodiments, power supply 25600 may include one or more structures and/or functionalities described with reference to power supply 21600. In one or more embodiments, power from power supply 25600 may be transmitted to one or more components of device 25012 via a transmission line 25630. In one or more embodiments, one or more other devices described herein may include one or structures and/or functionalities as those described with reference to device 25012.

Figure 26:
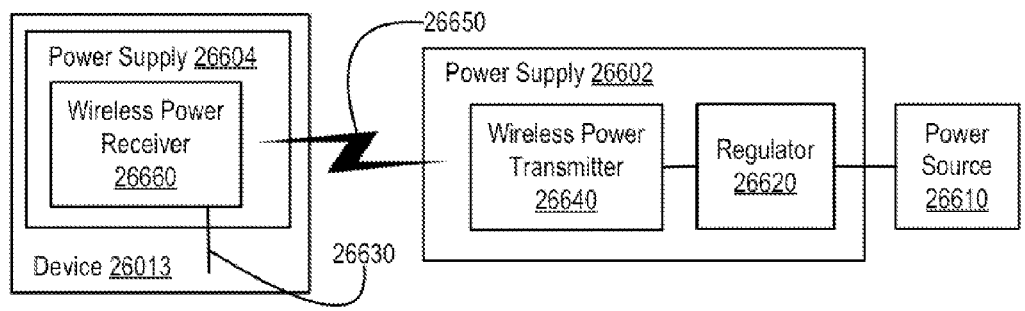
FIG. 26 illustrates an exemplary mobile device configured to include an exemplary power supply that includes a wireless power receiver, according to one or more embodiments.

Turning now to FIG. 26, mobile device and a power supply are illustrated, according to one or more embodiments. As shown, power supply 26602 may include a regulator 26620 which may be coupled to a power source 26610 and a wireless power transmitter 22640. In one or more embodiments, power source 22610 may supply one or more electrical currents at one or more voltages. In one example, power source 26610 may include a battery. In a second example, power source 26610 may include a photovoltaic cell (e.g., a solar cell). In a third example, power source 26610 may include a fuel cell. In another example, power source 26610 may include a generator. In one or more embodiments, regulator 26620 may regulate one or more of one or more voltages and one or more currents.

In one or more embodiments, wireless power transmitter 26640 may transmit one or more power electromagnetic signals 26650 to power supply 26604. As illustrated, device 26013 may include a power supply 26604 which may include a wireless power receiver. As shown, power supply 26604 may include a wireless power receiver 26660 that may receive the one or more power electromagnetic signals 26650. In one or more embodiments, power from wireless power receiver 26660 may be transmitted to one or more components of device 26013 via a transmission line 26630. In one or more embodiments, one or more other devices described herein may include one or structures and/or functionalities as those described with reference to device 26013.

Figure 27A:
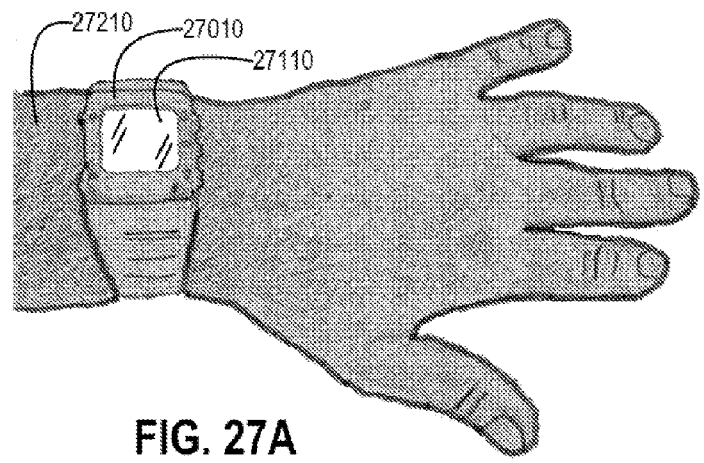
FIG. 27A provides an exemplary illustration of an exemplary wearable mobile device of a first configuration, according to one or more embodiments.
Figure 27B:
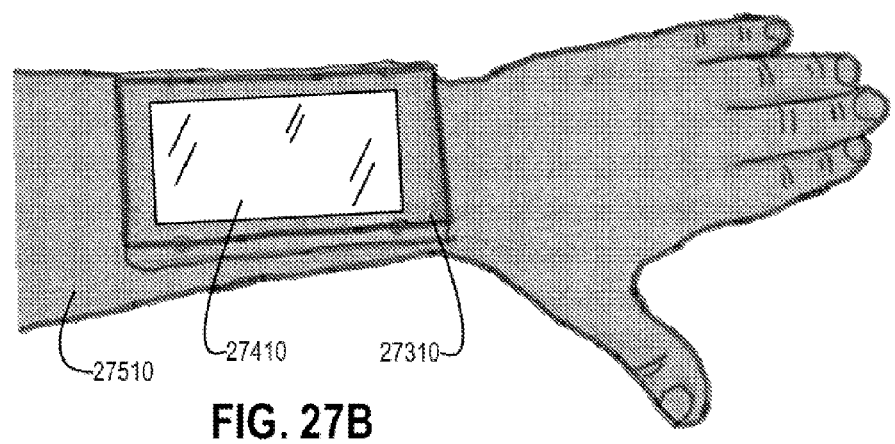
FIG. 27B provides an exemplary illustration of an exemplary wearable mobile device of a second configuration, according to one or more embodiments.

Turning now to FIGS. 27A and 27B, exemplary wearable devices are illustrated, according to one or more embodiments. As illustrated in FIG. 27A, a device 27010 may include a display 27110 and may be worn by via a portion of a user 27210. In one or more embodiments, device 27010 may include one or more structures and/or functionalities of one or more devices described herein. As shown in FIG. 27B, a device 27310 may include a display 27410 and may be worn by via a portion of a user 27510. In one or more embodiments, device 27310 may include one or more structures and/or functionalities of one or more devices described herein.

Figure 27C:
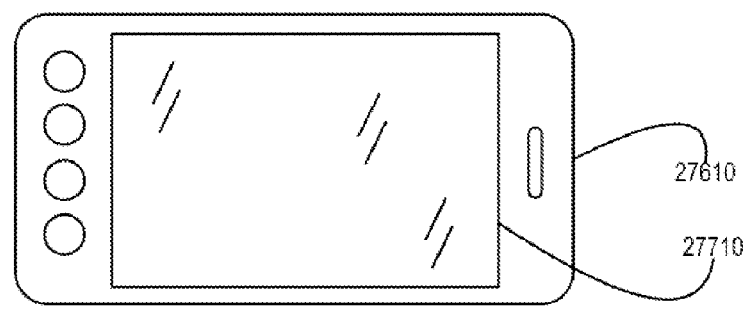
FIG. 27C provides an exemplary illustration of an exemplary mobile device, according to one or more embodiments.

Turning now to FIG. 27C, exemplary mobile device is illustrated, according to one or more embodiments. As shown in FIG. 27C, a device 27610 may include a display 27710. In one or more embodiments, device 27610 may include one or more structures and/or functionalities of one or more devices described herein. In one or more embodiments, device 27610 may be or include one or more of a wireless telephone (e.g., a cellular telephone, a satellite telephone, etc.), a personal digital assistant, a digital music player, a palm computing device, and a tablet computing device, among others.

Figure 28A:
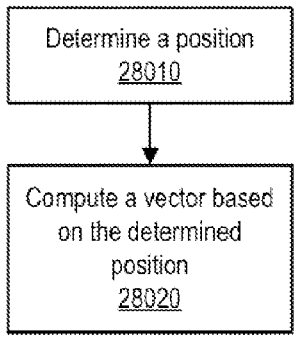
FIG. 28A illustrates an exemplary method of determining a plane that includes a determined position and a pole, according to one or more embodiments.

Turning now to FIG. 28A, an exemplary method of determining a plane that includes a determined position and a pole is illustrated, according to one or more embodiments. At 28010, a position may be determined. In one example, position 6010 (as illustrated in FIG. 6A) may be determined. In a second example, position 6015 (as illustrated in FIG. 6B) may be determined. In a third example, position 6017 (as illustrated in FIG. 6C) may be determined. In a fourth example, position 9010 (as illustrated in FIG. 9A) may be determined. In a fifth example, position 9015 (as illustrated in FIG. 9B) may be determined. In another example, position 9017 (as illustrated in FIG. 9C) may be determined.

In one or more embodiments, a plane may be associated with, may correspond to, and/or may be described by a vector that is normal to (e.g., perpendicular to) the plane. For example, a plane may be described as $a \cdot x + b \cdot y + c \cdot z = 0$, and a vector that is normal to (e.g., perpendicular to) the plane may be $(a, b, c)$.

At 28020, a vector, based on the position, may be computed. For example, the vector may be computed via a vector cross product of a vector corresponding to the determined position and a vector corresponding to a pole (e.g., a north pole, a south pole, etc.). In one or more embodiments, the computed vector is normal to a plane that includes the determined position and the pole, and the computed vector may be utilized to describe the plane that includes the determined position and the pole.

Figure 28B:
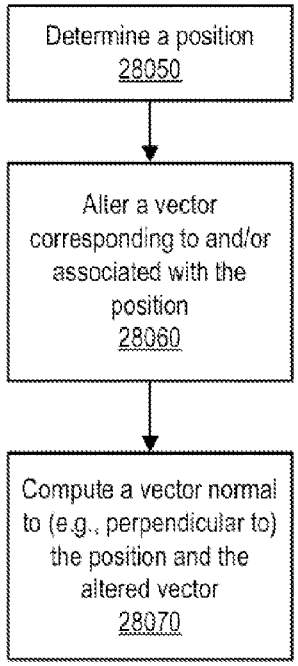
FIG. 28B illustrates an exemplary method of determining a plane that includes a determined position, according to one or more embodiments.

Turning now to FIG. 28B, an exemplary method of determining a plane that includes a determined position, according to one or more embodiments. At 28050, a position may be determined. In one example, position 6010 (as illustrated in FIG. 6A) may be determined. In a second example, position 6015 (as illustrated in FIG. 6B) may be determined. In a third example, position 6017 (as illustrated in FIG. 6C) may be determined. In a fourth example, position 9010 (as illustrated in FIG. 9A) may be determined. In a fifth example, position 9015 (as illustrated in FIG. 9B) may be determined. In another example, position 9017 (as illustrated in FIG. 9C) may be determined.

At 28060, a vector corresponding to and/or associated with the position may be altered. In one example, the position may include a spherical coordinate form that may be utilized for the vector corresponding to and/or associated with the position. For instance, a position device may provide the position in a spherical coordinate form (e.g., latitude and longitude) that may be utilized for the vector corresponding to and/or associated with the position. In another example, the position may be converted to a spherical coordinate form that may be utilized for the vector corresponding to and/or associated with the position. For instance, the position may include a Cartesian coordinate form and may be converted into a spherical coordinate form that may be utilized for the vector corresponding to and/or associated with the position. In one or more embodiments, altering the vector corresponding to and/or associated with the position may include setting a component of the vector. For example, the vector corresponding to and/or associated with the position may include $(\rho, \theta, \phi)$, and the $\phi$ component may be set to $$\frac{\pi}{2}$$

, producing $$\left(\rho, \theta, \frac{\pi}{2}\right).$$

At 28070, a vector normal to the altered vector corresponding to and/or associated with the position may be determined. In one example, a vector normal to the altered vector corresponding to and/or associated with the position may be determined via adding ninety degrees or by $$\frac{\pi}{2}$$

radians to the θ component of the altered vector. For instance, adding ninety degrees or by $$\frac{\pi}{2}$$

radians to the θ component of the altered vector may produce $$\left(\rho, \theta + \frac{\pi}{2}, \frac{\pi}{2}\right).$$

In another example, a vector normal to the altered vector corresponding to and/or associated with the position may be determined via subtracting ninety degrees or by $$\frac{\pi}{2}$$

radians from the θ component of the altered vector. For instance, subtracting ninety degrees or $$\frac{\pi}{2}$$

radians from the θ component of the altered vector may produce $$\left(\rho, \theta - \frac{\pi}{2}, \frac{\pi}{2}\right).$$

In one or more embodiments, adding or subtracting ninety degrees or $$\frac{\pi}{2}$$

radians to the θ component of the altered vector may produce a vector that is normal the vector corresponding to and/or associated with the position and that is included in a plane that includes equator 6110 of sphere 6000. For example, at least one of $$\left(\rho, \theta + \frac{\pi}{2}, \frac{\pi}{2}\right)$$

and $$\left(\rho, \theta - \frac{\pi}{2}, \frac{\pi}{2}\right)$$

may be utilized to describe a plane that includes the determined position and a pole of sphere 6000. For instance, the at least one of $$\left(\rho, \theta + \frac{\pi}{2}, \frac{\pi}{2}\right)$$

and $$\left(\rho, \theta - \frac{\pi}{2}, \frac{\pi}{2}\right)$$

may be converted into a Cartesian coordinate system, where the at least one of $$\left(\rho, \theta + \frac{\pi}{2}, \frac{\pi}{2}\right)$$

and $$(\rho, \theta - \frac{\pi}{2}, \frac{\pi}{2}),$$

converted into a Cartesian coordinate system, may be utilized to describe a plane that includes the determined position and a pole of sphere 6000.

Figure 29:
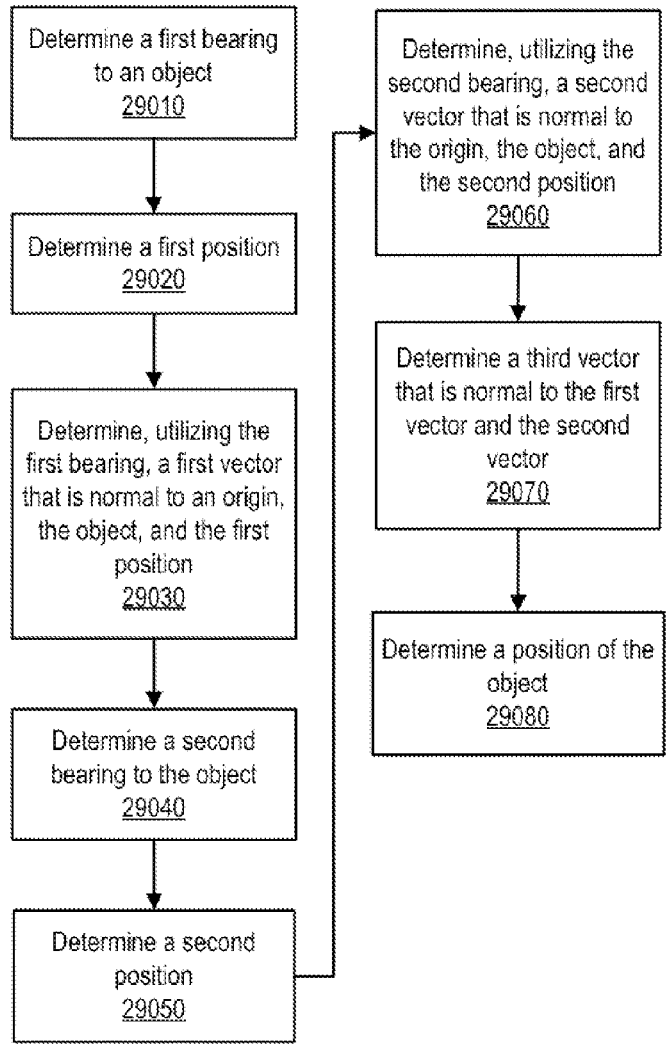
FIG. 29 illustrates an exemplary method of determining a position of a remote object, according to one or more embodiments.

Turning now to FIG. 29, an exemplary method of determining a position of an object is illustrated, according to one or more embodiments. At 29010, a first bearing to an object may be determined. In one or more embodiments, user 5010 may align bearing device 5110 with the object. For example, user 5010, at a first position (e.g., position 6010), may align bearing device 5110 with object 3210. In one or more embodiments, bearing device 5110 may determine a first angle of the object, with respect to a magnetic pole (e.g., a magnetic north pole). In one example, the first angle may be utilized as the first bearing. In another example, the first bearing may be based on the first angle, determined via the bearing device, and an angle of declination. For instance, the first bearing may be computed as a sum of the first angle, determined via the bearing device, and the angle of declination.

At 29020, a first position may be determined. For example, position device 15310 may determine the first position (e.g., position 6010). In one or more embodiments, the first position corresponds to the first bearing. In one example, the first bearing to the object and the first position may be determined simultaneously. In a second example, the first bearing to the object and the first position may be determined concurrently. For instance, at least one portion of determining the first bearing to the object and at least one portion of determining the first position may occur during an amount of time transpiring. In another example, the first bearing to the object and the first position may be determined serially such that an amount of time transpiring does not adversely affect an accuracy of determining the position of the object. For instance, determining the first position may be determined within a foot or two of determining the first bearing. In one example, a system that determines the position of the object may be moving. For instance, the system that determines the position of the object may be moving at a first speed. In another example, a system that determines the position of the object may be stationary.

Figure 30A:
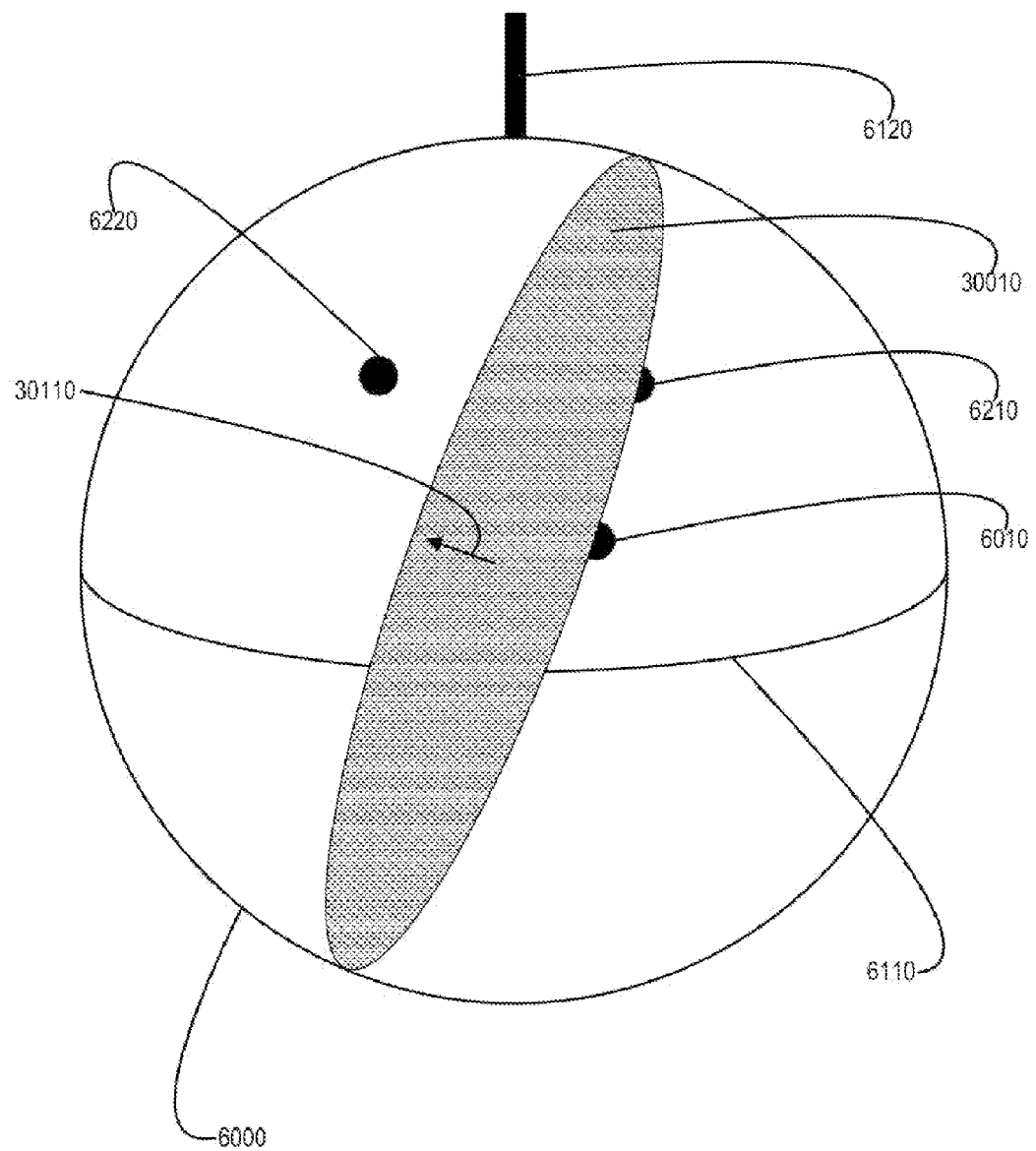
FIG. 30A provides an exemplary illustration of a first determined vector associated with a first plane, according to one or more embodiments.

At 29030, a first vector that is normal to an origin, the object, and the first position may be determined. For example, a vector 30110, as illustrated in FIG. 30A, may be determined as the first vector. For instance, the origin, the object (e.g., at position 6210), and the first position (e.g., position 6010) may be a basis for a plane 30010, which is illustrated in FIG. 30A as an intersection with sphere 6000. In one or more embodiments, determining the first vector may include utilizing the first bearing. For example, plane 30010 may intersect surface of sphere 6000 at a great circle 30215, as illustrated in FIG. 30B.

Figure 30B:
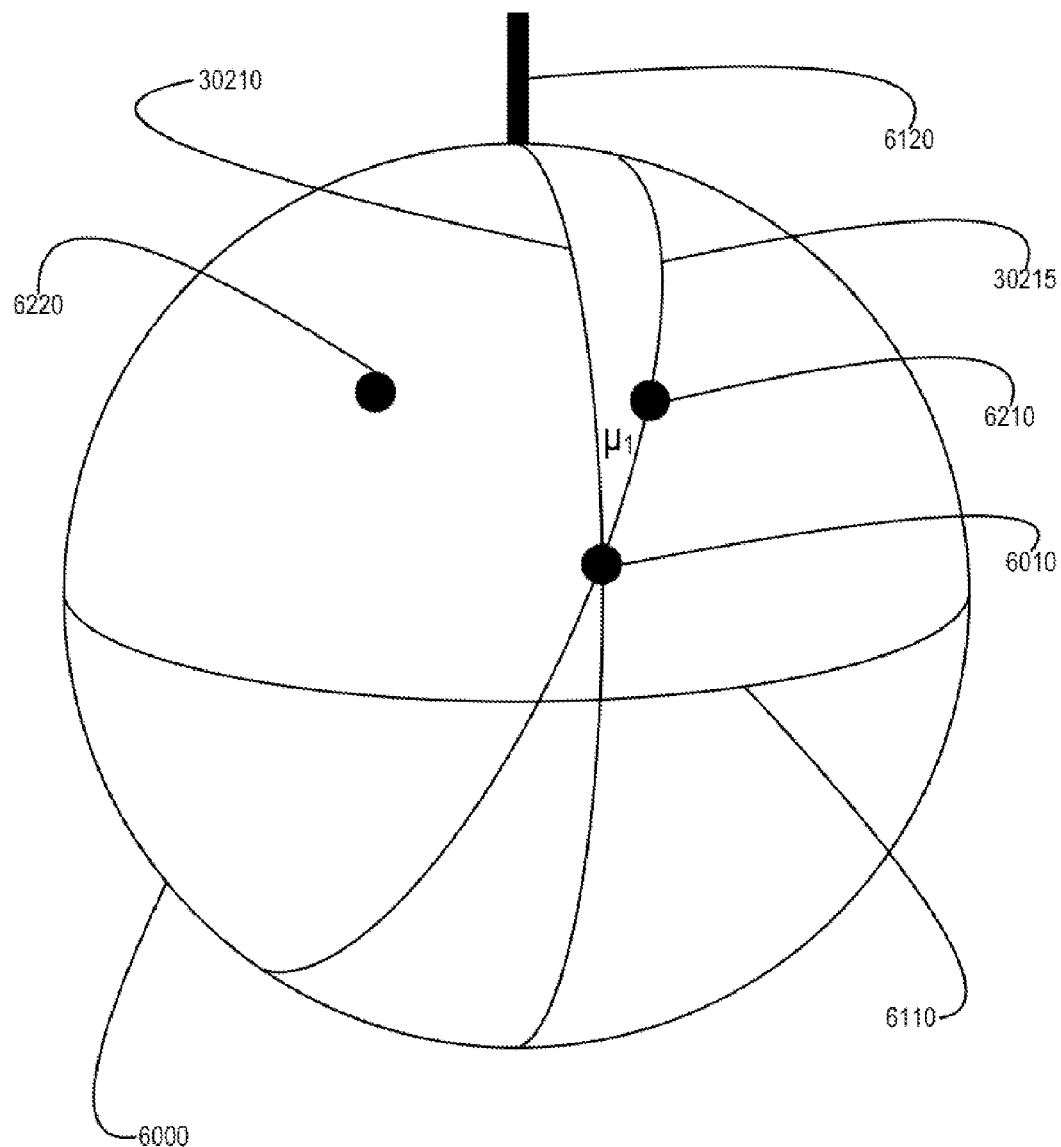
FIG. 30B provides an exemplary illustration of an intersection of a first plane with a surface of a sphere at a first angle with respect to a pole, according to one or more embodiments.

As further illustrated in FIG. 30B, great circle 30215 may be at an angle $\mu_1$ to pole 6120. In one or more embodiments, angle $\mu_1$ may be the first bearing. In one or more embodiments, angle $\mu_1$ may be based on the first bearing and an angle of declination. For example, a declination angle (e.g., an offset angle) may be added or subtracted to the first bearing in determining $\mu_1$. In one or more embodiments, the declination angle (e.g., the offset angle) may be based on a position on a planet (e.g., Earth). For example, an angular difference (e.g., a declination angle) may exist between a magnetic pole (e.g., a magnetic north pole) and a geographic pole (e.g., a geographic north pole such as pole 6120) depending on a position on the planet (e.g., Earth). For instance, adding or subtracting (e.g., adding a negative number) the angular difference (e.g., the declination angle) to or from the first bearing based on a magnetic pole (e.g., a magnetic north pole) may be utilized in computing a bearing $\mu_1$ (e.g., $\mu_1$ as illustrated in FIG. 30B) that is referenced to a geographic pole (e.g., a geographic north pole such as pole 6120).

In one or more embodiments, a declination angle may vary over an amount of time transpiring. For example, a first declination angle corresponding to a position on a planet (e.g., Earth) on a first date may be different from a second declination angle corresponding to the position on the planet on a second date, different from the first date.

Referring now to FIG. 29, at 29040, a second bearing to an object may be determined. In one or more embodiments, user 5010 may align bearing device 5110 with the object. For example, user 5010, at a second position (e.g., position 9010), may align bearing device 5110 with object 3210. In one or more embodiments, bearing device 5110 may determine a second angle of the object, with respect to a magnetic pole (e.g., a magnetic north pole). In one example, the second angle may be utilized as the second bearing. In another example, the second bearing may be based on the second angle and an angle of declination. In one instance, the second bearing may be computed as a sum of the second angle and the angle of declination. In another instance, adding or subtracting (e.g., adding a negative number) the declination angle to or from the second bearing based on a magnetic pole (e.g., a magnetic north pole) may be utilized in computing a bearing $\mu_2$ that is referenced to a geographic pole (e.g., a geographic north pole such as pole 6120).

At 29050, a second position may be determined. For example, position device 15310 may determine the second position (e.g., position 9010). In one or more embodiments, the second position corresponds to the second bearing. In one example, the second bearing to the object and the second position may be determined simultaneously. In a second example, the second bearing to the object and the second position may be determined concurrently. For instance, at least one portion of determining the second bearing to the object and at least one portion of determining the second position may occur during an amount of time transpiring. In another example, the second bearing to the object and the second position may be determined serially such that an amount of time transpiring does not adversely affect an accuracy of determining the position of the object. For instance, determining the second position may be determined within a foot or two of determining the second bearing. In one example, a system that determines the position of the object may be moving. In another example, a system that determines the position of the object may be stationary.

Figure 31A:
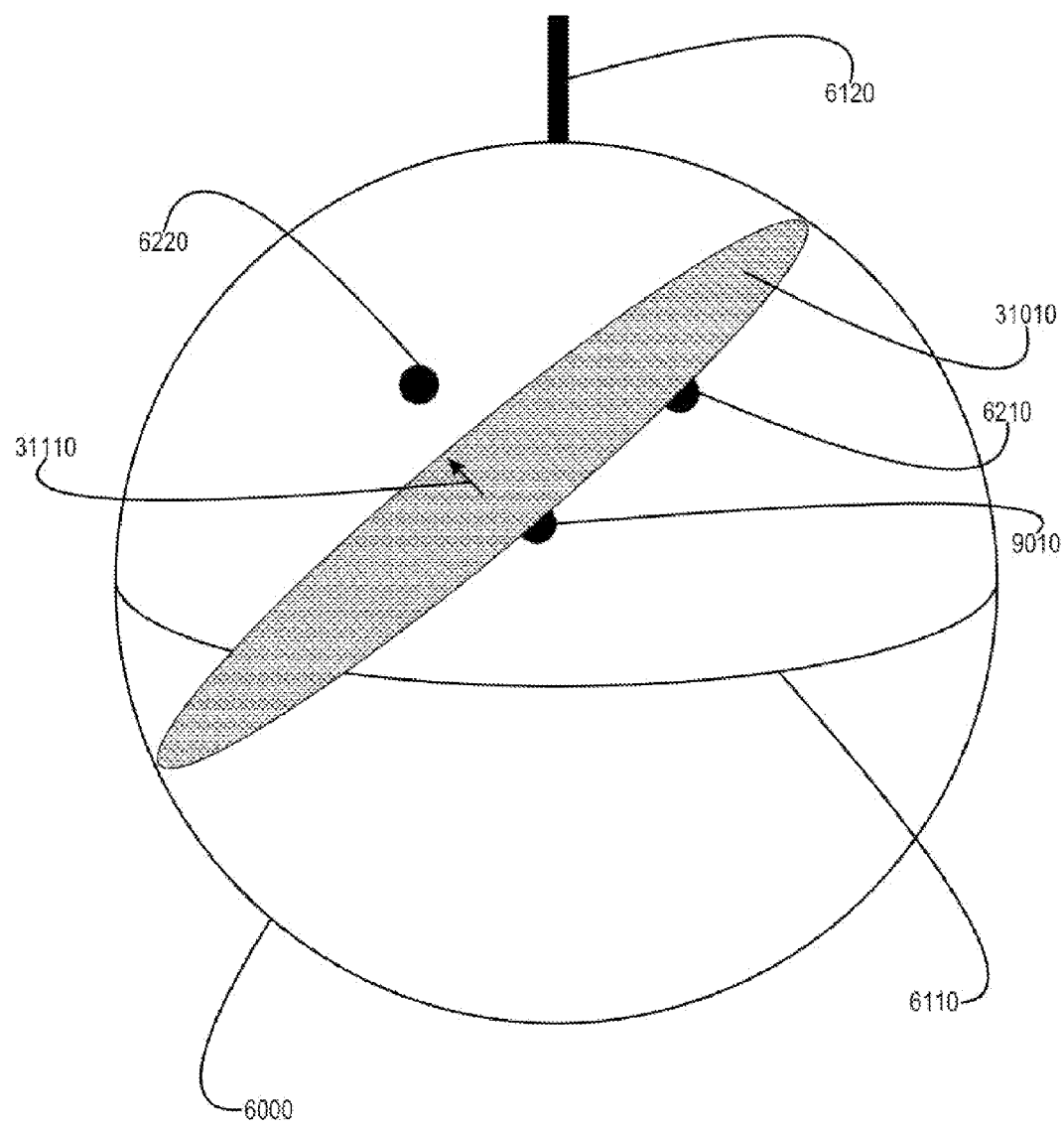
FIG. 31A provides an exemplary illustration of a second determined vector associated with a second plane, according to one or more embodiments.
Figure 31B:
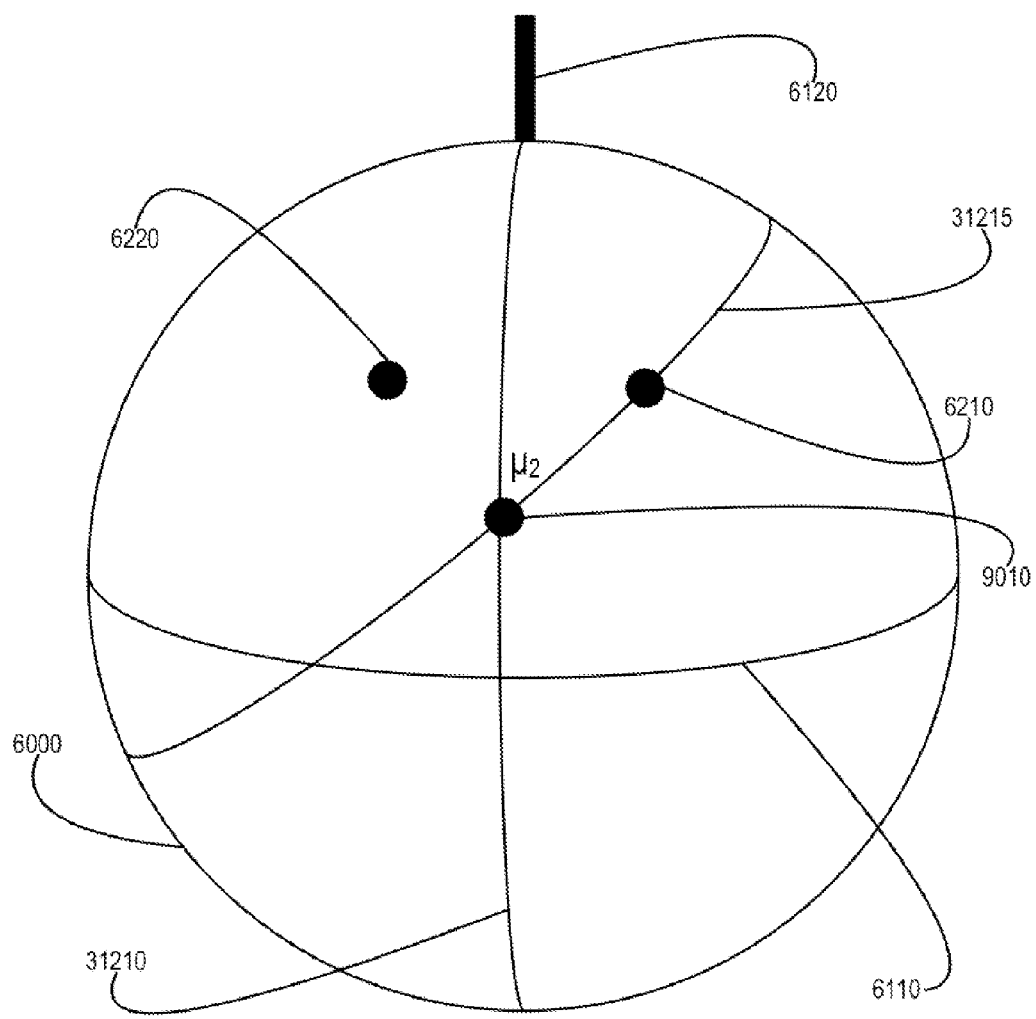
FIG. 31B provides an exemplary illustration of an intersection of a second plane with a surface of a sphere at a second angle with respect to a pole, according to one or more embodiments.

At 29060, a second vector that is normal to the origin, the object, and the second position may be determined. For example, a vector 31110, as illustrated in FIG. 31A, may be determined as the second vector. For instance, the origin, the object, and the second position may be a basis for a plane 31010, which is illustrated in FIG. 31A as an intersection with sphere 6000. In one or more embodiments, determining the second vector may include utilizing the second bearing. For example, plane 31010 may intersect surface of sphere 6000 at a great circle 31215, as illustrated in FIG. 31B. As further illustrated in FIG. 31B, great circle 31215 may be at an angle $\mu_2$ to pole 6120. In one or more embodiments, angle $\mu_2$ (e.g., $\mu_2$ as illustrated in FIG. 31B) may be the second bearing. In one or more embodiments, angle $\mu_2$ may be based on the second bearing. For example, an offset angle (e.g., a declination angle) may be added or subtracted to the second bearing in determining $\mu_2$.

Figure 32A:
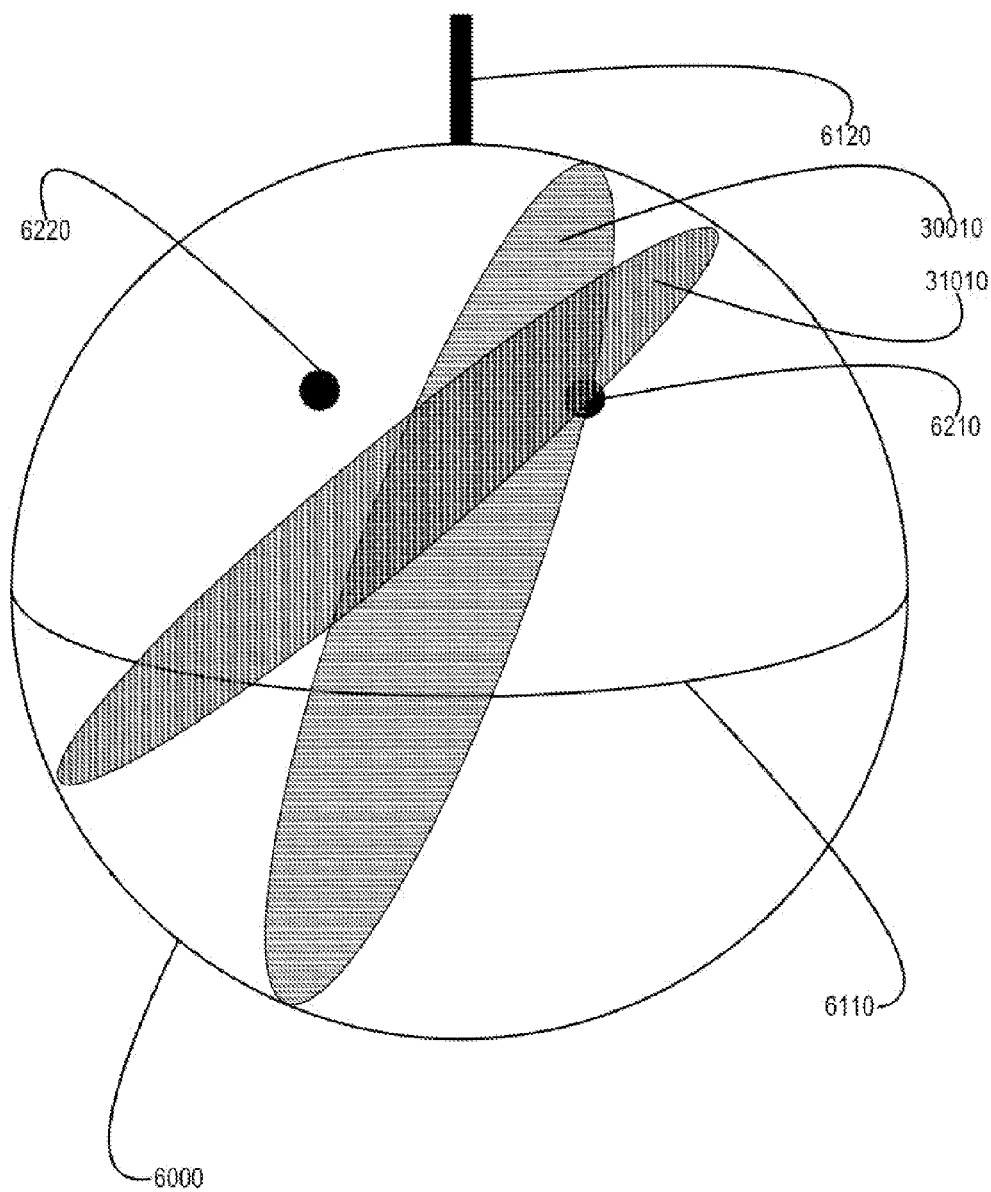
FIG. 32A provides an exemplary illustration of an intersection of a first plane and a second plane that indicates a position of a remote object, according to one or more embodiments.

Referring now to FIG. 29, at 29070, a third vector that is normal to the first vector and the second vector may be determined. In one or more embodiments, determining the third vector may include determining an intersection of planes 30010 and 31010. For example, FIG. 32A illustrates the intersection of planes 30010 and 31010. In one or more embodiments, determining the intersection of planes 30010 and 31010 may include determining a vector cross product of the first vector and the second vector. For example, determining the third vector may include computing a vector cross product of the first vector (e.g., vector 30110) and the second vector (e.g., vector 31110).

Figure 32B:
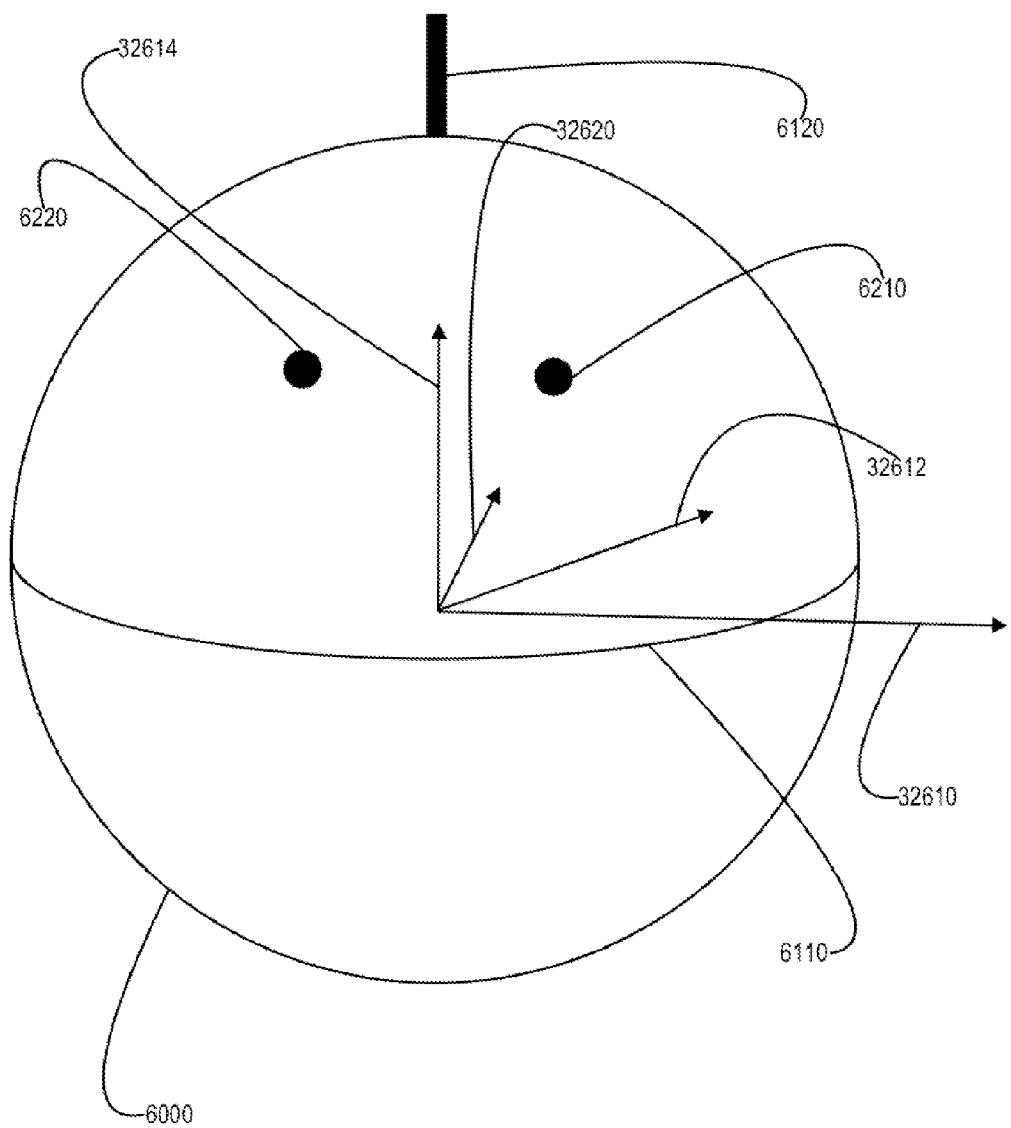
FIG. 32B provides an exemplary illustration of a third determined vector, according to one or more embodiments.
Figure 32C:
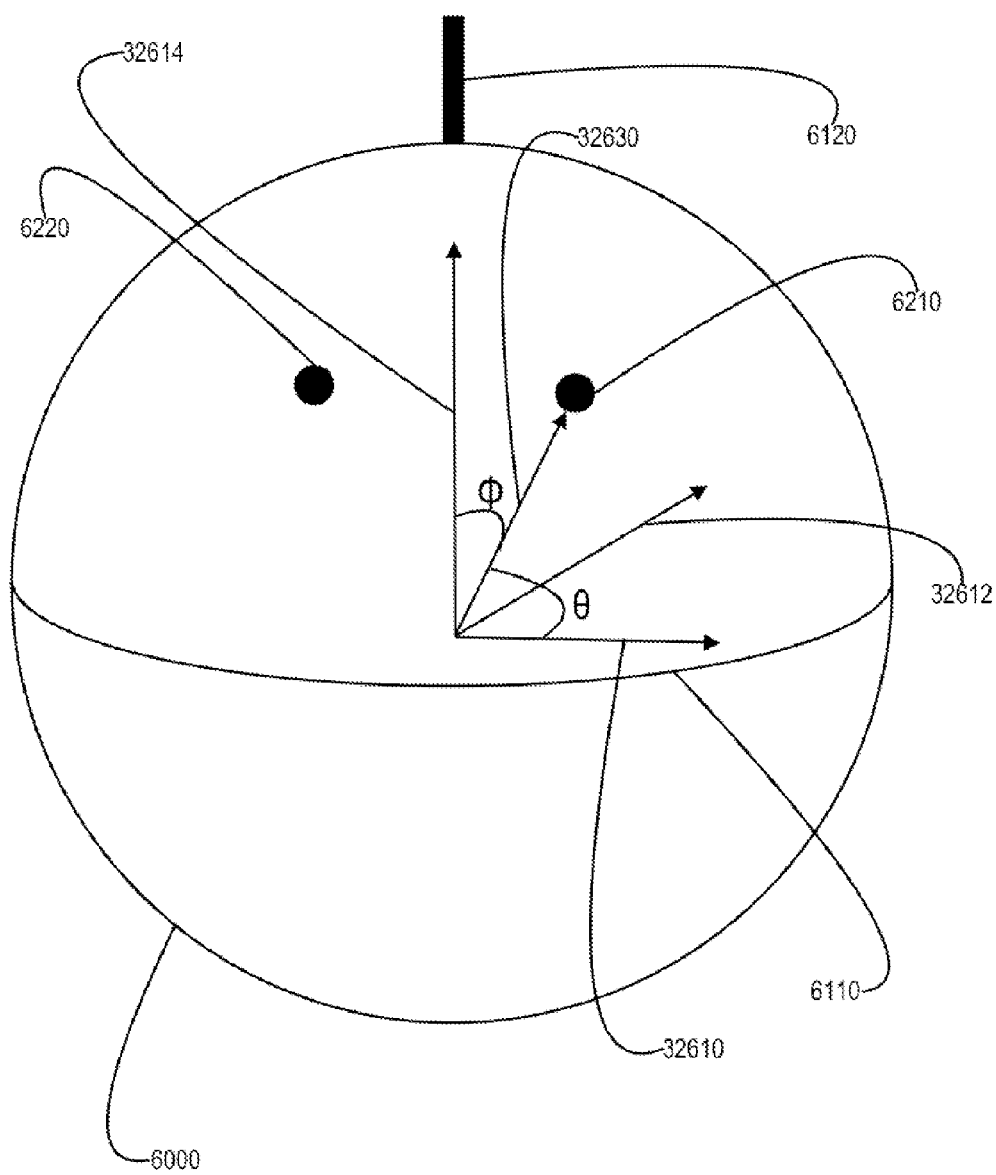
FIG. 32C provides an exemplary illustration of a third determined vector scaled via a scalar or radius, according to one or more embodiments.

At 29080, a position of the object may be determined. In one or more embodiments, determining the position of the object may include determining an intersection of plane 30010, plane 31010, and sphere 6000, as illustrated in FIG. 32A. For example, position 6210 may be determined utilizing the third vector (e.g., a vector 32620 as illustrated in FIG. 32B). For instance, position 6210 may be determined from an intersection of sphere 6000 and the third vector. In one or more embodiments, the third vector may be scaled to a radius of sphere 6000, a radius of Earth, or a radius of Earth plus or minus an altitude. For example, the position of the object (e.g., object 6210) may be determined by scaling the third vector to a radius of sphere 6000, a radius of Earth, or to a radius of Earth plus or minus an altitude. For instance, vector 32620 (e.g., the third vector) may be scaled to a radius of sphere 6000, as illustrated in FIG. 32C as a vector 32630. In one or more embodiments, a radius of sphere 6000 may be scaled to a radius of Earth or a radius of Earth plus or minus an altitude.

In one or more embodiments, the position of the object may be determined to be the third vector or at least a portion of the third vector. For example, the third vector may be a vector in a spherical coordinate system, and the position of the object may be determined to be or to include the angular portions of the third vector. For instance, as illustrated in FIG. 32C, the position of the object (e.g., object 6210) may be determined to be or to include a first angle, $\theta$, to a first reference direction (e.g., a positive x-axis or axis 32610), and a second angle, $\phi$, to a second reference direction (e.g., a positive z-axis or axis 32614). FIG. 32C also illustrates a positive y-axis or axis 32612.

In one or more embodiments, the method illustrated in FIG. 29 may be repeated in determining one or more positions of respective one or more objects. In one example, the method illustrated in FIG. 29 may be repeated to compute position 6220 of a second object (e.g., object 3220). In a second example, the method illustrated in FIG. 29 may be repeated to compute a position 35810 (illustrated in FIG. 35) of a third object (e.g., a windward mark, a point of interest, etc.). In a third example, the method illustrated in FIG. 29 may be repeated to compute a position 35820 (illustrated in FIG. 35) of a fourth object (e.g., a leeward mark, a building, a tower, a structure, etc.).

In a fourth example, the method illustrated in FIG. 29 may be utilized to compute position 6215 utilizing a first position of position 6015 and a second position of position 9015, as illustrated in FIGS. 6B and 9B, respectively. In another example, the method illustrated in FIG. 29 may be utilized to compute position 6217 utilizing a first position of position 6017 and a second position of position 9017, as illustrated in FIGS. 6C and 9C, respectively.

Figure 33:
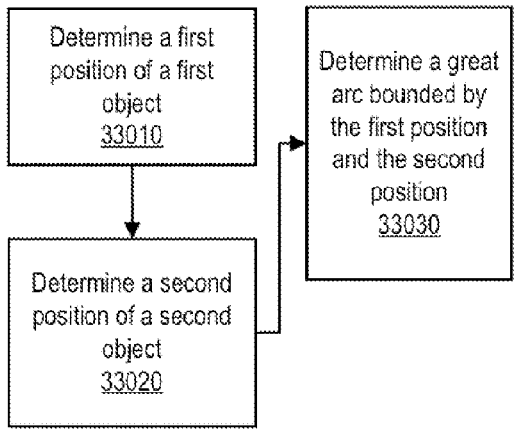
FIG. 33 provides an exemplary method of determining a great arc, according to one or more embodiments.
Figure 35:
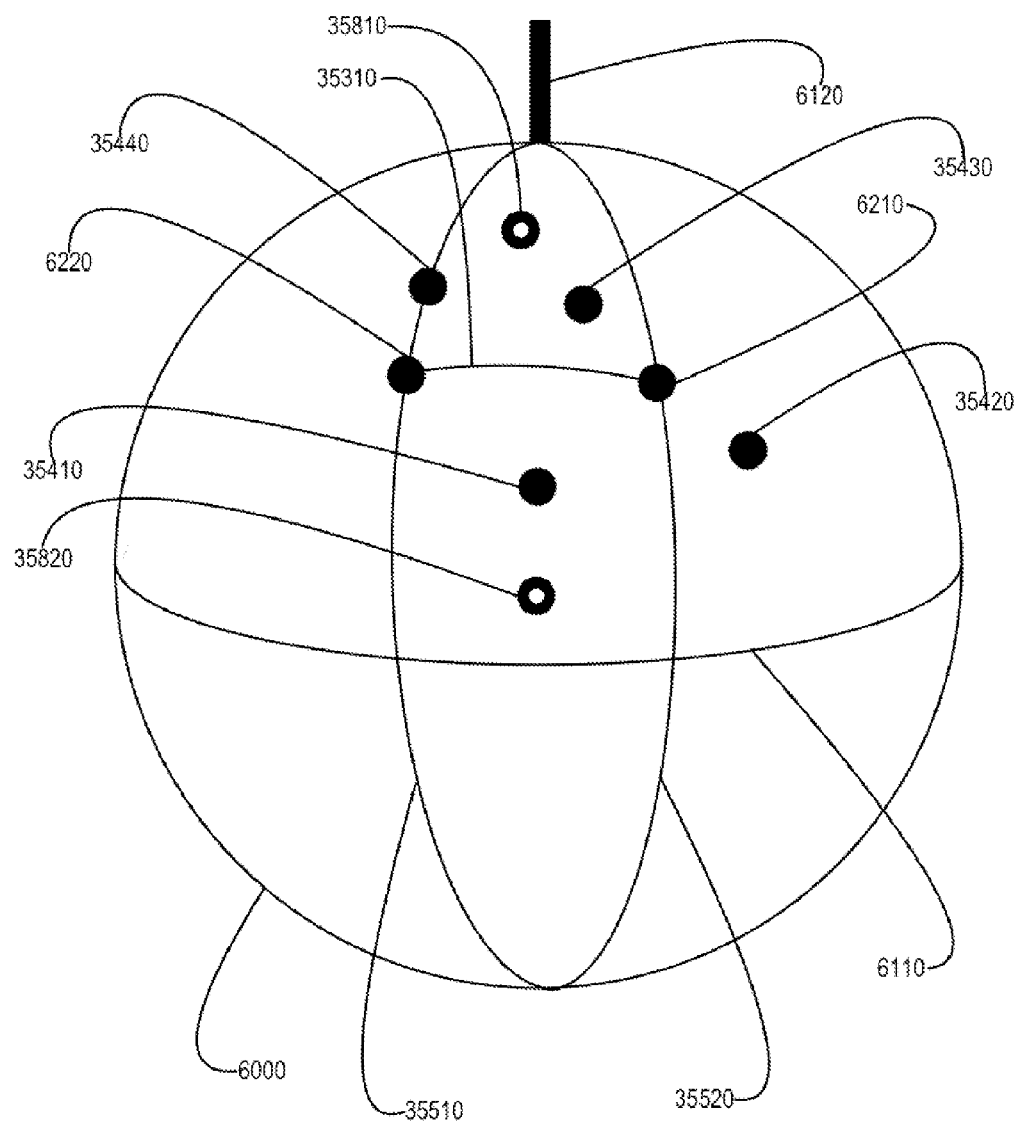
FIG. 35 provides an exemplary illustration of determined positions, according to one or more embodiments.

Turning now to FIG. 33, an exemplary method of determining a great arc is illustrated, according to one or more embodiments. At 33010, a first position of a first object may be determined. For example, as illustrated in FIG. 35, the first position may be or include position 6210. At 33020, a second position of a second object may be determined. For example, as illustrated in FIG. 35, the second position may be or include position 6220.

At 33030, a great arc bounded by the first position and the second position may be determined. For example, as illustrated in FIG. 35, a great arc 35310 bounded by position 6210 and position 6220 may be determined. In one or more embodiments, great arc 35310 may be or include a portion of a great circle that includes positions 6210 and 6220, where positions 6210 and 6220 may be boundaries of the portion of a great circle that includes positions 6210 and 6220.

Figure 34:
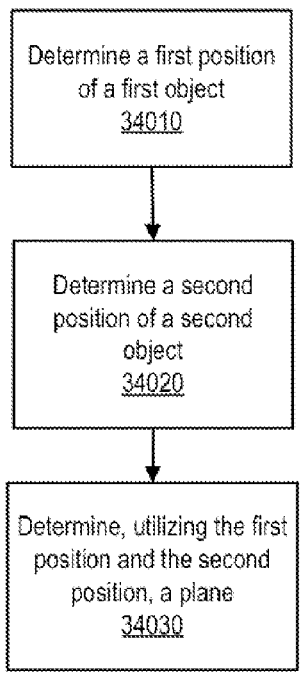
FIG. 34 provides an exemplary method of determining a plane, according to one or more embodiments.

Turning now to FIG. 34, an exemplary method of determining a plane is illustrated, according to one or more embodiments. In one or more embodiments, method elements 34010 and 34020 may be performed with respect to method elements 33010 and 33020, respectively. At 34030, a plane may be determined, utilizing the first position and the second position. For example, an origin (e.g., an origin of sphere 6000), the first position, and the second position may be or include a basis for a plane 36010, which is illustrated as an intersection with sphere 6000 in FIG. 36.

In one or more embodiments, determining the plane (e.g., plane 36010) may include computing a vector cross product of a first vector associated with the first position (e.g., position 6210) and a second vector associated with the second position (e.g., position 6220). For example, the vector cross product of the first vector associated with the first position and the second vector associated with the second position may be or include a vector 36110. For instance, vector 36110 may be normal to plane 36010.

In one or more embodiments, determining the plane (e.g., plane 36010) may include utilizing the first position (e.g., position 6210), the second position (e.g., position 6220), and an origin (e.g., the origin of sphere 6000). In one example, position 6210, position 6220, and the origin of sphere 6000 may form a basis for plane 36010. In a second example, plane 36010 may be determined such that plane 36010 includes position 6210, position 6220, and the origin of sphere 6000.

Figure 37:
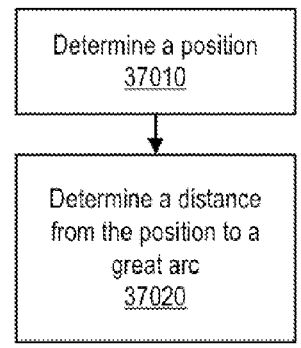
FIG. 37 provides an exemplary method of determining a distance, according to one or more embodiments.

Turning now to FIG. 37, an exemplary method of determining a distance is illustrated, according to one or more embodiments. At 37010, a position may be determined. For example, position device 15310 may determine the position (e.g., a position of positions 35410-35430 illustrated in FIG. 35). In one example, a system that determines the position of the object may be moving. For instance, position device 15310 may be moving. In another example, a system that determines the position of the object may be stationary. For instance, position device 15310 may be stationary. In one or more embodiments, being stationary may include not changing a position, within a coordinate system, within an amount of time transpiring. For example, being stationary may include not changing a position, within an ECEF coordinate system, within an amount of time transpiring.

At 37020, a distance from the position to a great arc may be determined. For example, a distance from a position of positions 35410-35430 to great arc 35310, as illustrated in FIG. 35, may be determined. In one or more embodiments, great arc 35310 may be or include starting line 3310 and/or a finish line.

Figure 38:
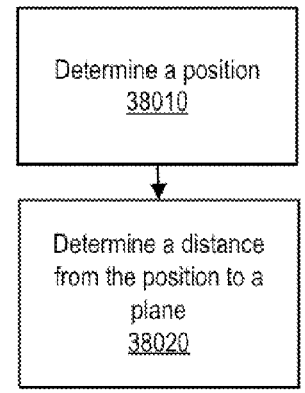
FIG. 38 provides an exemplary method of determining a distance to a plane, according to one or more embodiments.

Turning now to FIG. 38, an exemplary method of determining a distance to a plane is illustrated, according to one or more embodiments. At 38010, a position may be determined.

Figure 36:
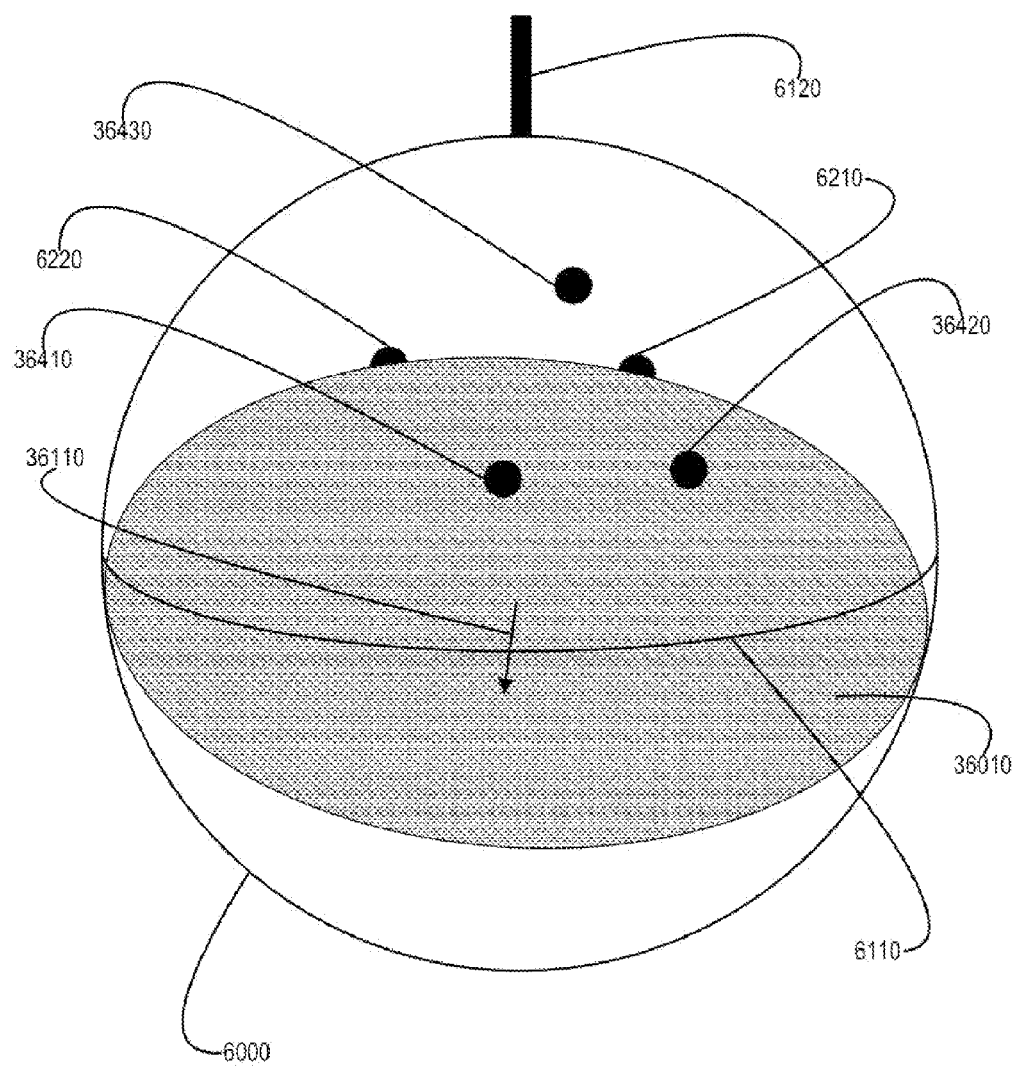
FIG. 36 provides an exemplary illustration of a plane that includes determined positions, according to one or more embodiments.

For example, position device 15310 may determine the position (e.g., a position of positions 36410-36430 illustrated in FIG. 36). In one example, a system that determines the position of the object may be moving. In another example, a system that determines the position of the object may be stationary.

At 38020, a distance from the position to a plane may be determined. For example, a distance from a position of positions 36410-36430 to plane 36010, as illustrated in FIG. 36, may be determined. In one or more embodiments, plane 36010 may include starting line 3310 and/or a finish line.

In one or more embodiments, a distance from the position to the plane may be determined by projecting a vector from an origin (e.g., the origin of sphere 6000) to the position (e.g., a position of positions 36410-36430) onto the plane (e.g., plane 36010). For example, projecting the vector onto the plane may include determining a vector dot product (e.g., an inner product) of the vector, from the origin to the position, and vector 36110 (e.g., a vector that may be utilized to describe plane 36110).

In one or more embodiments, vector 36110 may not be a unit vector, and projecting the vector onto the plane may include determining a magnitude of vector 36110. In one example, the vector dot product of the vector, from the origin to the position, and vector 36110 may be divided by the magnitude of vector 36110. In another example, the vector dot product of the vector, from the origin to the position, and vector 36110 may be multiplied by a reciprocal of the magnitude of vector 36110.

In one or more embodiments, the distance from the position to the plane may be sufficient to determine a distance from the position to starting line 3310, a finish line, and/or great arc 35310. For example, plane 36010 may include starting line 3310 (as illustrated in FIG. 3), the finish line, and/or great arc 35310 (as illustrated in FIG. 35). In one instance, a difference of the distance from the position (e.g., a position of positions 36410-36430) to plane 36010 and a measure of a great arc (of sphere 6000) from the position to plane 36010 may be negligible. For example, the difference that may be negligible may be less than or equal to a radius of uncertainty of position device 15310. In one or more embodiments, if difference is negligible, less computations may be performed, and/or a processor of low computing power processor (e.g., a processor that does not include a floating point unit) may be utilized in determining a distance from the position to starting line 3310, the finish line, and/or great arc 35310.

Turning now to FIG. 39A, an exemplary method of determining, utilizing a first bearing from a first position to an object at a second position, a first great circle intercept is illustrated, according to one or more embodiments. At 39010, a first bearing from a first position to an object may be determined. For example, the first bearing may be angle $\mu_1$. For instance, angle $\mu_1$ may be computing is a same or similar fashion as described above. For example, $\mu_1$ may be based on a declination angle.

At 39020, a first result of a tangent function of $\mu_1$ may be determined. For example, determining the first result of a tangent function of $\mu_1$ may include computing a tangent function of $\mu_1$ (e.g., $\tan(\mu_1)$). At 39030, a second result of $Position_{1\theta}$ subtracted from $$\frac{\pi}{2}$$

may be determined, where $Position_{1\theta}$ is the $\theta$ component of the first position expressed in a spherical coordinate system. For example, determining the second result of $Position_{1\theta}$ subtracted from $$\frac{\pi}{2}$$

may include computing a result of $$\frac{\pi}{2} - Position_{1\phi}.$$

At 39040, a third result of a sine function of the result determined at 39030 may be determined. For example, determining the third result of the sine function of the second result, determined at 39030, may include computing a result of the sine function of the second result, determined at 39030. For instance, $$\sin\left(\frac{\pi}{2} - Position_{1\phi}\right)$$

may be computed as the third result.

At 39050, a fourth result of the third result multiplied by the first result may be determined. For example, determining the fourth result may include computing the third result multiplied by the first result. For instance, the fourth result may be determined by computing $$\tan(\mu_1) \cdot \sin\left(\frac{\pi}{2} - Position_{1\phi}\right).$$

At 39060, a fifth result of an inverse tangent function of the fourth result may be determined. For example, determining the fifth result may include computing an inverse tangent function of the fourth result. For instance, the fifth result may be determined by computing $$\tan^{-1}\left(\tan(\mu_1) \cdot \sin\left(\frac{\pi}{2} - Position_{1\phi}\right)\right).$$

At 39070, a sixth result of the fifth result subtracted from $Position_{1\theta}$ may be determined, where $Position_{1\theta}$ is the $\theta$ component of the first position expressed in a spherical coordinate system. For example, determining the sixth result of the fifth result subtracted from $Position_{1\theta}$ may include computing $$Position_{1\theta} - \tan^{-1}\left(\tan(\mu_1) \cdot \sin\left(\frac{\pi}{2} - Position_{1\phi}\right)\right).$$

At 39090, a first angle of the great circle intercept may be established. For example, the first angle of the great circle intercept may be established as the sixth result. For instance, the first angle of the great circle intercept may be set to the sixth result (e.g., $GreatCircleIntercept_{1\theta} =$ $$Position_{1\theta} - \tan^{-1}\left(\tan(\mu_1) \cdot \sin\left(\frac{\pi}{2} - Position_{1\phi}\right)\right)).$$

At 39080, a magnitude of the great circle intercept may be established. In one example, the magnitude of the great circle intercept may be established as a radius of a sphere or a radius of Earth. For instance, the magnitude of the great circle intercept may be set to the radius of the sphere (e.g., sphere 6000) or the radius of Earth. In another example, the magnitude of the great circle intercept may be established as a unit value. For instance, the magnitude of the great circle intercept may be set to one.

In one or more embodiments, setting the magnitude of the great circle intercept to one (e.g., unity) may simplify (e.g., reduce) and/or eliminate one or more computations. For example, the magnitude of the great circle intercept may be utilized in one or more computations subsequent to determining and/or computing the magnitude of the great circle intercept, and at least one of the subsequent one or more computations may be simplified (e.g., reduced) and/or eliminated.

At 39090, a second angle of the great circle intercept may be established. For example, the second angle of the great circle intercept may be established as an angle of a plane, that includes the great circle, with respect to a positive z-axis or axis 6614, as illustrated in FIG. 6G. For instance, the great circle may include and/or be equator or great circle 6110, and the second angle of the great circle intercept may be established as and/or set to $$\frac{\pi}{2}.$$

Figures 39B, 47:
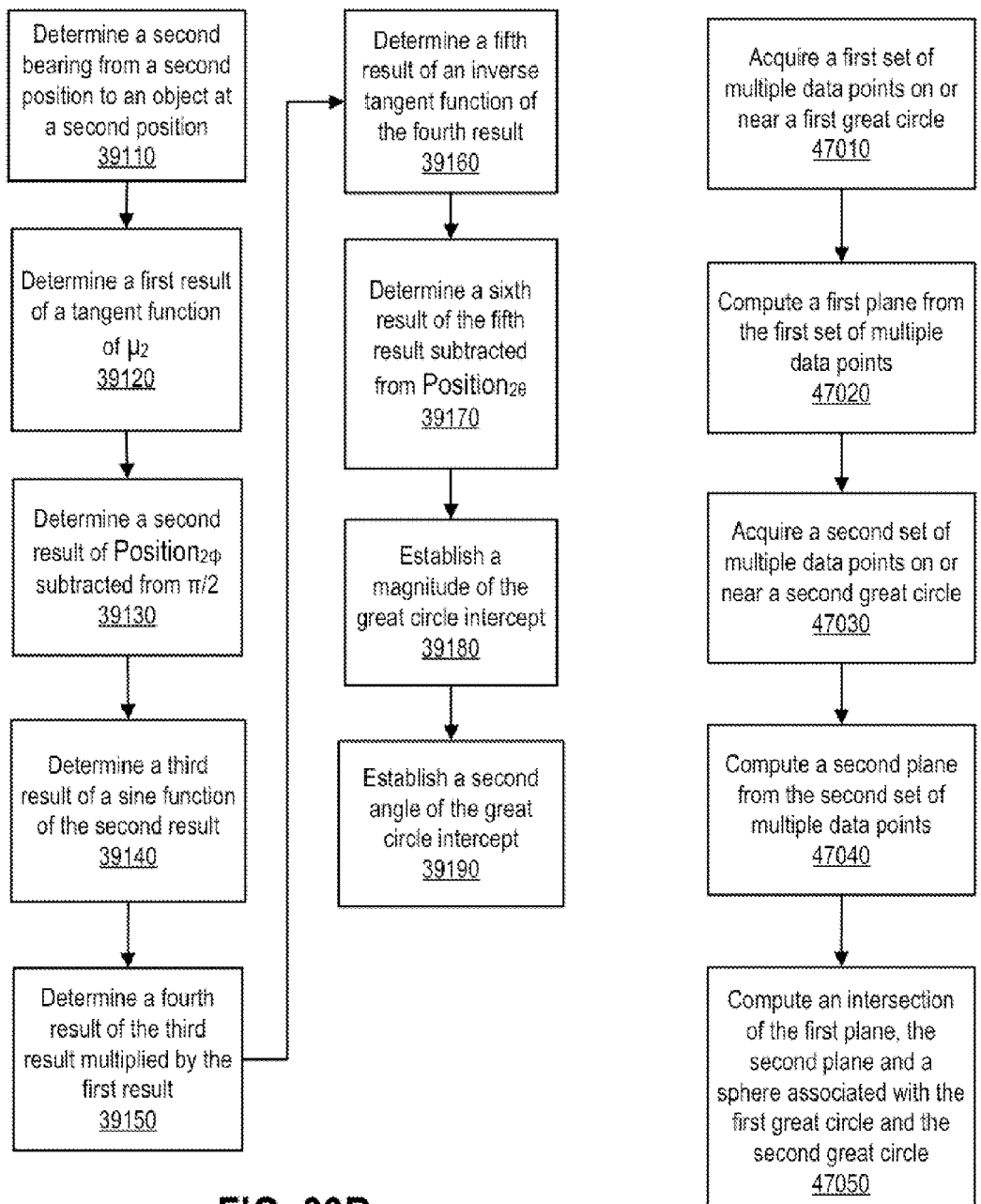
FIG. 39B provides an exemplary method of determining, utilizing a second bearing from a second position to an object at a second position, a second great circle intercept, according to one or more embodiments FIG. 39C provides an exemplary method of determining a vector that is normal to a first position, an origin, and a second position of a remote object, according to one or more embodiments.
FIG. 47 provides an exemplary method of determining a position may be determined from two planes determined via least squares, according to one or more embodiments.
Figure 40:
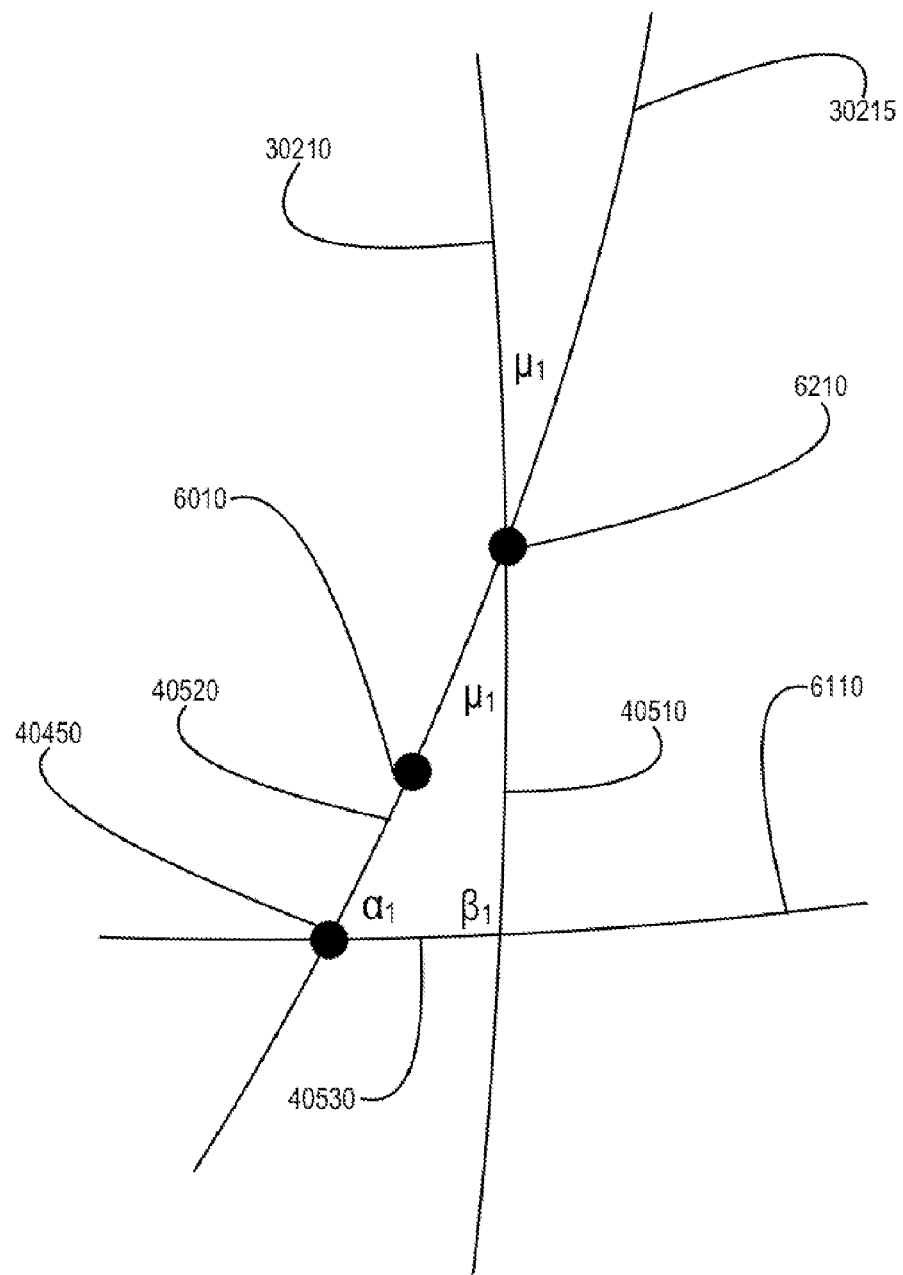
FIG. 40 provides an exemplary illustration that provides further details or a magnified view of a portion of FIG. 30B, according to one or more embodiments.

In one or more embodiments, the method illustrated in FIG. 39A may be associated with a spherical right triangle illustrated in FIG. 40 that provides further details or a magnified view of a portion of FIG. 30B. For example, the spherical right triangle may include sides 40510-40530 and may include angles $\alpha_1$, $\beta_1$, and $\mu_1$. For instance, angle $\beta_1$ may include a measure of 90 degrees or $$\frac{\pi}{2}$$

radians, angle $\mu_1$ may correspond with the description above, and $\alpha_1$ may be a third angle of the spherical right triangle. In one or more embodiments, the first position, as described above, may be or include position 6010, the position of the object may be or include position 6210, and the great circle intercept may be or include position 40450. For example, the great circle, as described above may be or include great circle or equator 6110, and the great circle intercept may be or include an equator intercept that is or includes position 40450. In one or more embodiments, great circle intercept 40450 and position 6010 may establish and/or lie on a great circle 30215, as illustrated in FIG. 40.

Turning now to FIG. 39B, an exemplary method of determining, utilizing a second bearing from a second position to an object at a second position, a second great circle intercept is illustrated, according to one or more embodiments. At 39110, a second bearing from a second position to an object may be determined. For example, the second bearing may be angle $\mu_2$. For instance, angle $\mu_2$ may be computing is a same or similar fashion as described herein. For example, a $\mu_2$ may be based on a declination angle.

At 39120, a first result of a tangent function of $\mu_2$ may be determined. For example, determining the first result of a tangent function of $\mu_2$ may include computing a tangent function of $\mu_2$ (e.g., $\tan(\mu_2)$).

At 39130, a second result of $Position_{2\theta}$ subtracted from $$\frac{\pi}{2}$$

may be determined, where $Position_{2\theta}$ is the $\theta$ component of the second position expressed in a spherical coordinate system. For example, determining the second result of $Position_{2\theta}$ subtracted from $$\frac{\pi}{2}$$

may include computing a result of $$\frac{\pi}{2} - Position_{2\phi}.$$

At 39140, a third result of a sine function of the result determined at 39130 may be determined. For example, determining the third result of the sine function of the second result, determined at 39130, may include computing a result of the sine function of the second result, determined at 39130. For instance, $$\sin\left(\frac{\pi}{2} - Position_{2\phi}\right)$$

may be computed as the third result.

At 39150, a fourth result of the third result multiplied by the first result may be determined. For example, determining the fourth result may include computing the third result multiplied by the first result. For instance, the fourth result may be determined by computing $$\tan(\mu_2) \cdot \sin\left(\frac{\pi}{2} - Position_{2\phi}\right).$$

At 39160, a fifth result of an inverse tangent function of the fourth result may be determined. For example, determining the fifth result may include computing an inverse tangent function of the fourth result. For instance, the fifth result may be determined by computing $$\tan^{-1}\left(\tan(\mu_2) \cdot \sin\left(\frac{\pi}{2} - Position_{2\phi}\right)\right).$$

At 39170, a sixth result of the fifth result subtracted from $Position_{2\theta}$ may be determined, where $Position_{2\theta}$ is the $\theta$ component of the first position expressed in a spherical coordinate system. For example, determining the sixth result of the fifth result subtracted from Position$_{2\theta}$ may include computing $$Position_{2\theta} - \tan^{-1}\left(\tan(\mu_2) \cdot \sin\left(\frac{\pi}{2} - Position_{2\phi}\right)\right).$$

At 39190, a first angle of the great circle intercept may be established. For example, the first angle of the great circle intercept may be established as the sixth result. For instance, the first angle of the great circle intercept may be set to the sixth result $$\left(e.g., GreatCircleIntercept_{2\theta} = \right.$$
$$\left. Position_{2\theta} - \tan^{-1}\left(\tan(\mu_2) \cdot \sin\left(\frac{\pi}{2} - Position_{2\phi}\right)\right)\right).$$

At 39180, a magnitude of the great circle intercept may be established. In one example, the magnitude of the great circle intercept may be established as a radius of a sphere or a radius of Earth. For instance, the magnitude of the great circle intercept may be set to the radius of the sphere (e.g., sphere 6000) or the radius of Earth. In another example, the magnitude of the great circle intercept may be established as a unit value. For instance, the magnitude of the great circle intercept may be set to one.

In one or more embodiments, setting the magnitude of the great circle intercept to one may simplify (e.g., reduce) and/or eliminate one or more computations. For example, the magnitude of the great circle intercept may be utilized in one or more computations subsequent to determining and/or computing the magnitude of the great circle intercept, and at least one of the subsequent one or more computations may be simplified (e.g., reduced) and/or eliminated.

At 39190, a second angle of the great circle intercept may be established. For example, the second angle of the great circle intercept may be established as an angle of a plane, that includes the great circle, with respect to a positive z-axis or axis 6614, as illustrated in FIG. 6G. For instance, the great circle may include and/or be equator or great circle 6110, and the second angle of the great circle intercept may be established as and/or set to $$\frac{\pi}{2}.$$

Figure 41:
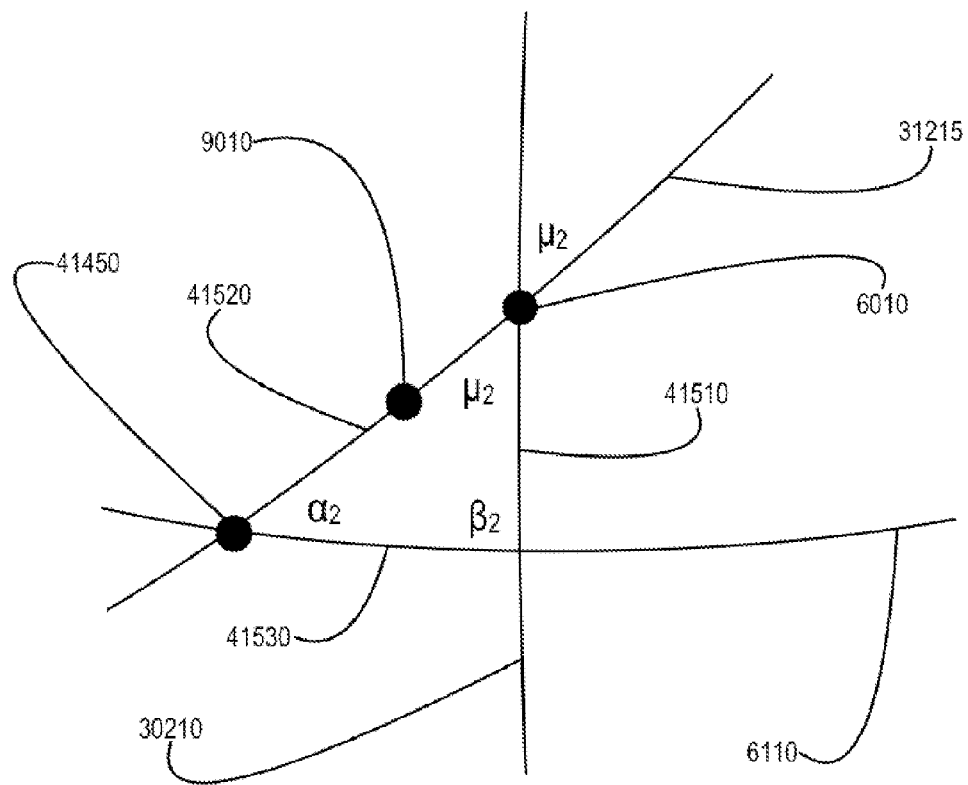
FIG. 41 provides an exemplary illustration that provides further details or a magnified view of a portion of FIG. 31B, according to one or more embodiments.

In one or more embodiments, the method illustrated in FIG. 39B may be associated with a spherical right triangle illustrated in FIG. 41 that provides further details or a magnified view of a portion of FIG. 31B. For example, the spherical right triangle may include sides 41510-41530 and may include angles $\alpha_2$, $\beta_2$, and $\mu_2$. For instance, angle $\beta_2$ may include a measure of 90 degrees or $$\frac{\pi}{2}$$

radians, angle $\mu_2$ may correspond with the description above, and $\alpha_2$ may be a third angle of the spherical right triangle. In one or more embodiments, the second position, as described above, may be or include position 9010, the position of the object may be or include position 6210, and the great circle intercept may be or include position 41450. For example, the great circle, as described above may be or include great circle or equator 6110, and the great circle intercept may be or include an equator intercept that is or includes position 41450. In one or more embodiments, great circle intercept 41450 and position 9010 may establish and/or lie on a great circle 31215, as illustrated in FIG. 41.

Turning now to FIG. 39C, an exemplary method of determining a vector that is normal to a first position, an origin, and a second position of a remote object is illustrated, according to one or more embodiments. At 39210, a great circle intercept may be determined utilizing a pole of a sphere and a first position. In one or more embodiments, the great circle intercept may include an intersection of a first great circle, that includes the pole and the first position, and an equator of the sphere (e.g., a second great circle).

At 39220, a first vector normal to the origin, the pole, and the great circle intercept may be determined. In one example, determining the first vector may include computing a vector cross product of a vector from the origin to the first position and a vector from the origin to the pole. In a second example, determining the first vector may include computing a vector cross product of a vector from the origin to the equator intercept and a vector from the origin to the first position. In another example, determining the first vector may include computing a vector cross product of a vector from the origin to the equator intercept and a vector from the origin to the pole.

At 39230, an axis of rotation may be determined utilizing the origin and the first position. For example, determining axis of rotation may include computing a vector from the origin to the first position. At 39240, a second vector may be determined via a rotation, by a bearing angle to the remote object, of the first vector about the axis of rotation. In one or more embodiments, the methods illustrated in FIGS. 42 and 44 may be utilized to compute the second vector via a rotation, by the bearing angle to the remote object, of the first vector about the axis of rotation. In one or more embodiments, the method illustrated in FIG. 39C may be utilized in a rotation of a plane about an axis or a vector.

Figures 42, 43:
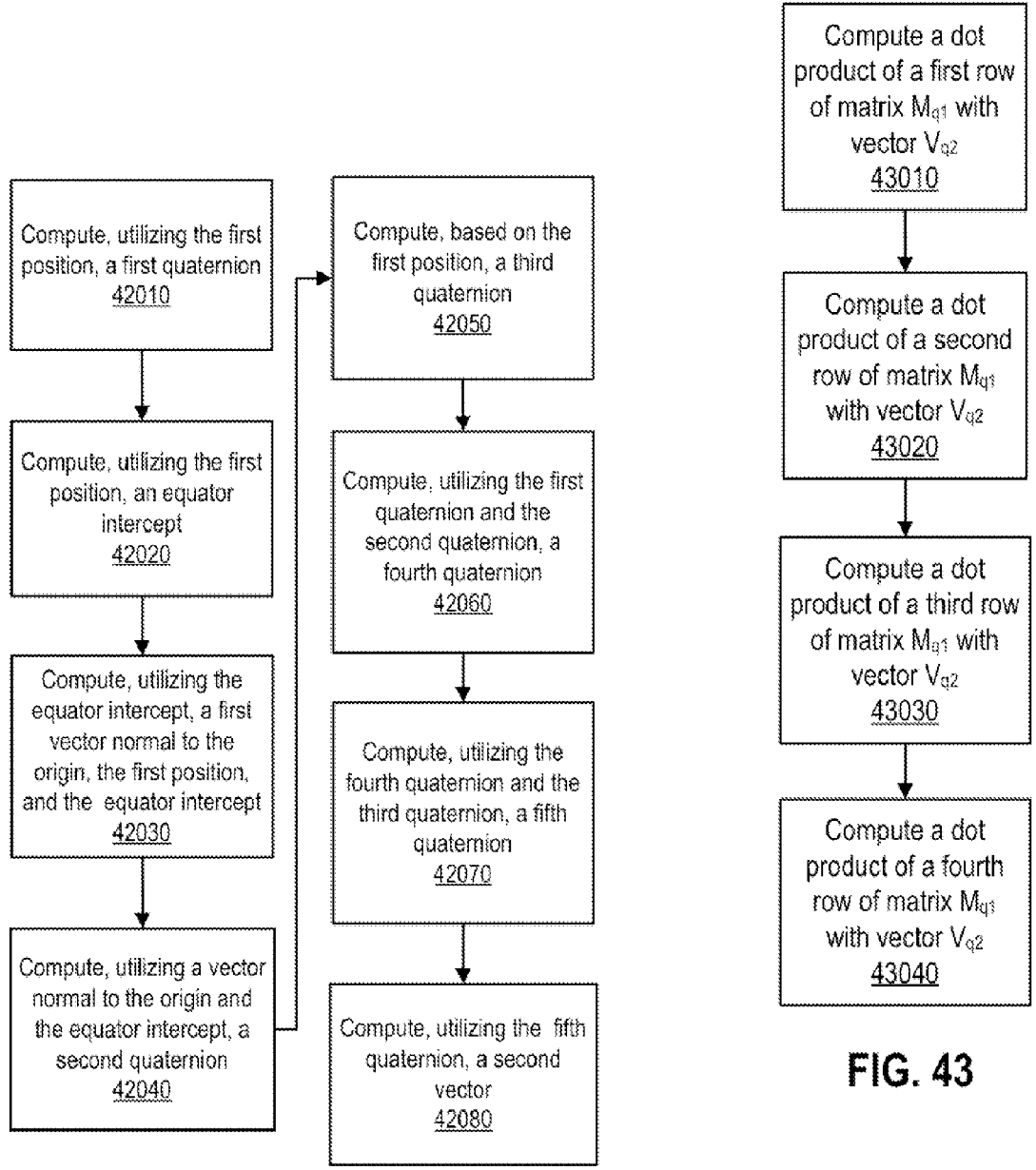
FIG. 42 provides an exemplary method of determining, utilizing a bearing from a first position to an object at a second position, a plane that includes the first position, an origin, and the second position, according to one or more embodiments.
FIG. 43 provides an exemplary method of computing a product of two quaternions via matrix multiplication, according to one or more embodiments.

Turning now to FIG. 42, an exemplary method of determining, utilizing a bearing from a first position to an object at a second position, a plane that includes the first position, an origin, and the second position is illustrated, according to one or more embodiments. At 42010, a first quaternion may be computed, utilizing the first position (e.g., position 6010). In one or more embodiments, a quaternion may include a form and/or representation such as q=s+xi+yj+zk that may obey rules such as $i^2=j^2=k^2=ijk=-1$, ij=k, jk=i, ki=j, ji=-k, kj=-i, and ik=-j, where s, x, y, and z may be numbers (e.g., real numbers). In one example, quaternions may be or include a division ring. In another example, quaternions may be or include hypercomplex numbers.

In one or more embodiments, a quaternion q may include a form and/or representation such as q=[s, $\vec{a}$ ], where S∈ℝ and $\vec{a}$ ∈ℝ$^3$. For example, q=s+xi+yj+zk=[s, $\vec{a}$ ]=s+$a_x$i+$a_y$j+$a_z$k. In one or more embodiments, a first quaternion may be computed, utilizing the first position, such that $$q_1 = \left[\cos\left(\frac{\theta}{2}\right), \sin\left(\frac{\theta}{2}\right)\vec{p}_1\right],$$

where $\theta$ may be the bearing from the first position to the object at the second position and $\vec{p}_1$ is a vector associated with the first position. In one or more embodiments, $\vec{p}_1$ may be normalized and/or scaled such that $|\vec{p}_1|=1$.

In one or more embodiments, $\theta$ may be or include the bearing from the first position to the object at the second position adjusted by an angle of declination (e.g., a number). For example, $\theta$ may be or include the bearing from the first position to the object at the second position such that the angle of declination is added to or subtracted from the bearing from the first position to the object at the second position. In one instance, $\theta=\mu_1$. In another instance, $\theta=\mu_2$.

At 42020, an equator intercept may be computed, utilizing the first position. In one or more embodiments, the first position may be expressed and/or represented in a spherical coordinate system such that the first position is associated with and/or includes (Position$_{1\rho}$, Position$_{1\theta}$, Position$_{1\phi}$), and the equator intercept may be computed via setting Position$_{1\theta}$ to $$\frac{\pi}{2}$$

such that the equator intercept is $$\left(Position_{1\rho}, Position_{1\theta}, \frac{\pi}{2}\right).$$

At 42030, a first vector normal to the origin, the first position, and the equator intercept may be computed, utilizing the equator intercept. In one example, computing the first vector normal to the first position and the equator intercept may include computing a vector cross product of a first vector associated with the first position and a second vector associated with the equator intercept. In another example, computing the first vector normal to the first position and the equator intercept may include adding or subtracting $$\frac{\pi}{2}$$

radians to or from the theta-component of the equator intercept. In one instance, the first vector normal to the first position and the equator intercept may be $$\left(Position_{1\rho}, Position_{1\theta} + \frac{\pi}{2}, \frac{\pi}{2}\right).$$

In another instance, the first vector normal to the first position and the equator intercept may be $$\left(Position_{1\rho}, Position_{1\theta} - \frac{\pi}{2}, \frac{\pi}{2}\right).$$

In one or more embodiments, the first vector normal to the first position and the equator intercept may include and/or be associated with a plane formed by the origin, the first position, and the equator intercept. In one or more embodiments, the first vector normal to the first position and the equator intercept may include and/or be associated a vector that is normal to the first position, an origin, and a pole (e.g., a geographic pole, pole 6120, pole 6130, etc.). For example, the first vector normal to the first position and the equator intercept may computed via a vector cross product of a vector associated with the first position and the pole.

At 42040, a second quaternion may be computed, utilizing the vector normal to the origin, the first position, and at least one of the pole and the equator intercept. In one or more embodiments, the second quaternion may be computed, utilizing the vector normal to the origin, the first position, and the equator intercept, such that $q_2=[0,\vec{v}]$, where $\vec{v}$ represents the vector normal to the origin the first position, and the equator intercept. In one example, $\vec{v}$ may be a unit vector such that $|\vec{v}|=1$. For instance, $\vec{v}$ may be normalized and/or scaled such that $|\vec{v}|=1$.

At 42050, a third quaternion may be computed based on the first position. In one or more embodiments, the third quaternion may be computed, based on the first position, such that $$q_3 = \left[\cos\left(\frac{\theta}{2}\right), -\sin\left(\frac{\theta}{2}\right)\vec{p}_1\right],$$

where $\theta$ may be the bearing from the first position to the object at the second position and $\vec{p}_1$ is a vector associated with the first position. For example, $\theta$ may be or include the bearing from the first position to the object at the second position such that the angle of declination is added to or subtracted from the bearing from the first position to the object at the second position. In one instance, $\theta=\mu_1$. In another instance, $\theta=\mu_2$. In one or more embodiments, computing the third quaternion, based on the first position, may include computing an inverse of the first quaternion. For example, $q_3=q_1^{-1}$, where $$q_1^{-1} = \frac{q_1^*}{|q_1|^2},$$

where $q_1^*$ is a conjugate of $q_1$, and where $|q_1|$ is a magnitude of $q_1$. For instance, computing $|q_1|$ may include computing $\sqrt{s_1^2+a_{1X}^2+a_{1Y}^2+a_{1Z}^2}$.

In one or more embodiments, the first quaternion may be a unit normal quaternion (i.e., $|q_1|=1$), and the conjugate of the first quaternion may be the inverse of the first quaternion. For example, $q_1^*=q_1^{-1}$, and $q_3=q_1^*$ (e.g., $q_3$ may be a conjugate of $q_1$).

At 42060, a fourth quaternion may be computed, utilizing the first quaternion and the second quaternion. In one or more embodiments, the fourth quaternion may be determined via quaternion multiplication. For example, $q_4=q_1q_2=[s_1,\vec{a}_1][s_2,\vec{a}_2]$, where $[s_1,\vec{a}_1][s_2,\vec{a}_2]=[s_1s_2-\vec{a}_1\cdot\vec{a}_2, s_1\vec{a}_2+s_2\vec{a}_1+\vec{a}_1\times\vec{a}_2]$.

At 42070, a fifth quaternion may be computed, utilizing the fourth quaternion and the third quaternion. In one or more embodiments, the fifth quaternion may be determined via quaternion multiplication. For example, $q_5=q_4q_3=[s_4,\vec{a}_4][s_3,\vec{a}_3]=[s_4s_3-\vec{a}_4\cdot\vec{a}_3, s_4\vec{a}_3+s_3\vec{a}_4+\vec{a}_4\times\vec{a}_3]$, where $\vec{a}_4\cdot\vec{a}_3$ is an inner product of vectors $\vec{a}_4$ and $\vec{a}_3$, and where $\vec{a}_4\times\vec{a}_3$ is a vector cross product of vectors $\vec{a}_4$ and $\vec{a}_3$. In one or more embodiments, method elements 42060 and 42070 describe multiplying three quaternions such as $q_1q_2q_3=(q_1q_2)q_3$. In one or more embodiments, quaternion multiplication may include an associative property such as $q_1q_2q_3=(q_1q_2)q_3=q_1(q_2q_3)$, and the method described with reference to FIG. 42 may be modified in accordance with the associative property of quaternion multiplication.

At 42080, a second vector may be determined, utilizing the fifth quaternion. In one or more embodiments, the fifth quaternion may be a "pure" quaternion such that $q_5=[0, \bar{a}_5]$, and the second vector may be or include $\bar{a}_5$. In one or more embodiments, the second vector may be associated with a plane. For example, the second vector may be associated with plane 30010 illustrated in FIG. 30A. For instance, the second vector may be or include vector 30110 illustrated in FIG. 30A.

In one or more embodiments, the method illustrated in FIG. 42 may be utilized in a computation of a rotated vector from a first vector rotated about a second vector or an axis via computing a quaternion rotation $qpq^{-1}$, where q and p are quaternions. For example, computing a quaternion rotation may include computing $qpq^{-1}$.

In one instance, $$q = \left[\cos\left(\frac{\theta}{2}\right), \sin\left(\frac{\theta}{2}\right)\bar{v}_1\right]$$

and $\bar{v}_1$ is a first vector or the axis (e.g., a normalized vector of a vector from an origin to the first position), where θ may be or include the bearing from the first position to the object at the second position. In a second instance, $p=[0, \bar{v}_2]$, where $\bar{v}_2$ is a normalized vector that is normal to (e.g., perpendicular to) the position, the origin, and the equator intercept and/or a pole. In another instance, $$q^{-1} = \frac{q^*}{|q|^2}.$$

In one or more embodiments, a computation of $qpq^{-1}$ produces a "pure" quaternion such as $qpq^{-1}=[0, \bar{v}_{rotated}]$.

Figure 30C:
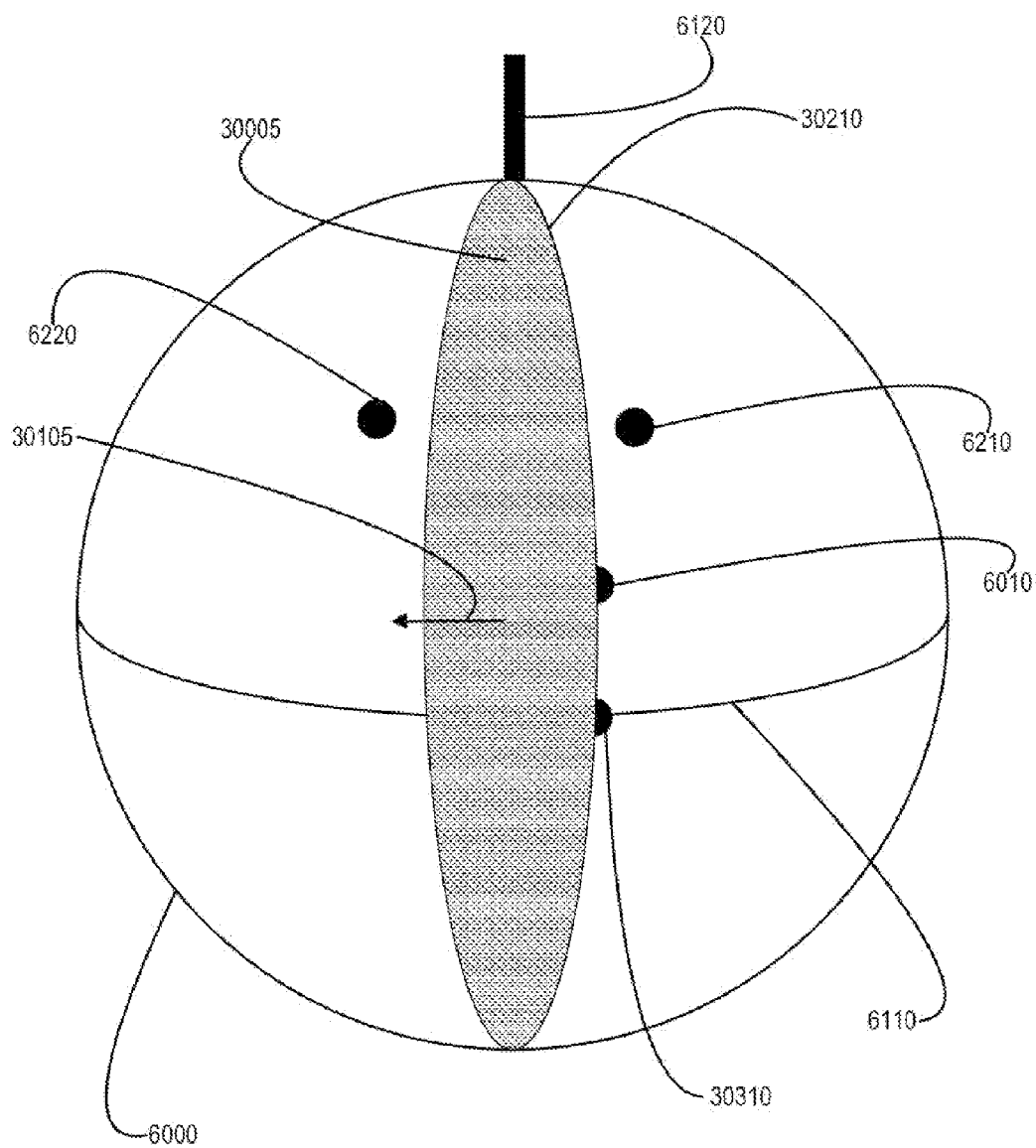
FIG. 30C provides an exemplary illustration of a first plane that includes an origin of a sphere, a first position and a first equator intercept, according to one or more embodiments.

In one or more embodiments, method described with reference to FIG. 42 may provide a functionality that rotates a plane that includes the origin, the first position, and at least on of the equator intercept and a pole (e.g., pole 6120, pole 6130, etc.) about an axis that is associated with, parallel to, and/or includes the first position by the bearing from the first position to the object at the second position, adjusted by an angle of declination (e.g., a number) if the angle of declination is non-zero. In one example, a first plane that includes the origin, a first position (e.g., position 6010 of FIG. 30B), and at least one of an equator intercept and a pole (e.g., pole 6120, pole 6130, etc.) may be rotated about an axis that is associated with, parallel to, and/or includes the first position by the bearing (e.g., $\mu_1$) from the first position to the object at the second position. For instance, as illustrated in FIG. 30C, the first plane may include the origin of sphere 6000, position 6010, and at least one of an equator intercept 30310 and a pole (e.g., pole 6120, pole 6130, etc.), and may be rotated by angle $\mu_1$ about an axis from the origin to position 6010 to compute plane 30010, illustrated in FIG. 30A, which includes the origin, the first position, and the second position (e.g., the position of the remote object). In one or more embodiments, the axis from the origin to position 6010 may be represented by a unit vector.

Figure 31C:
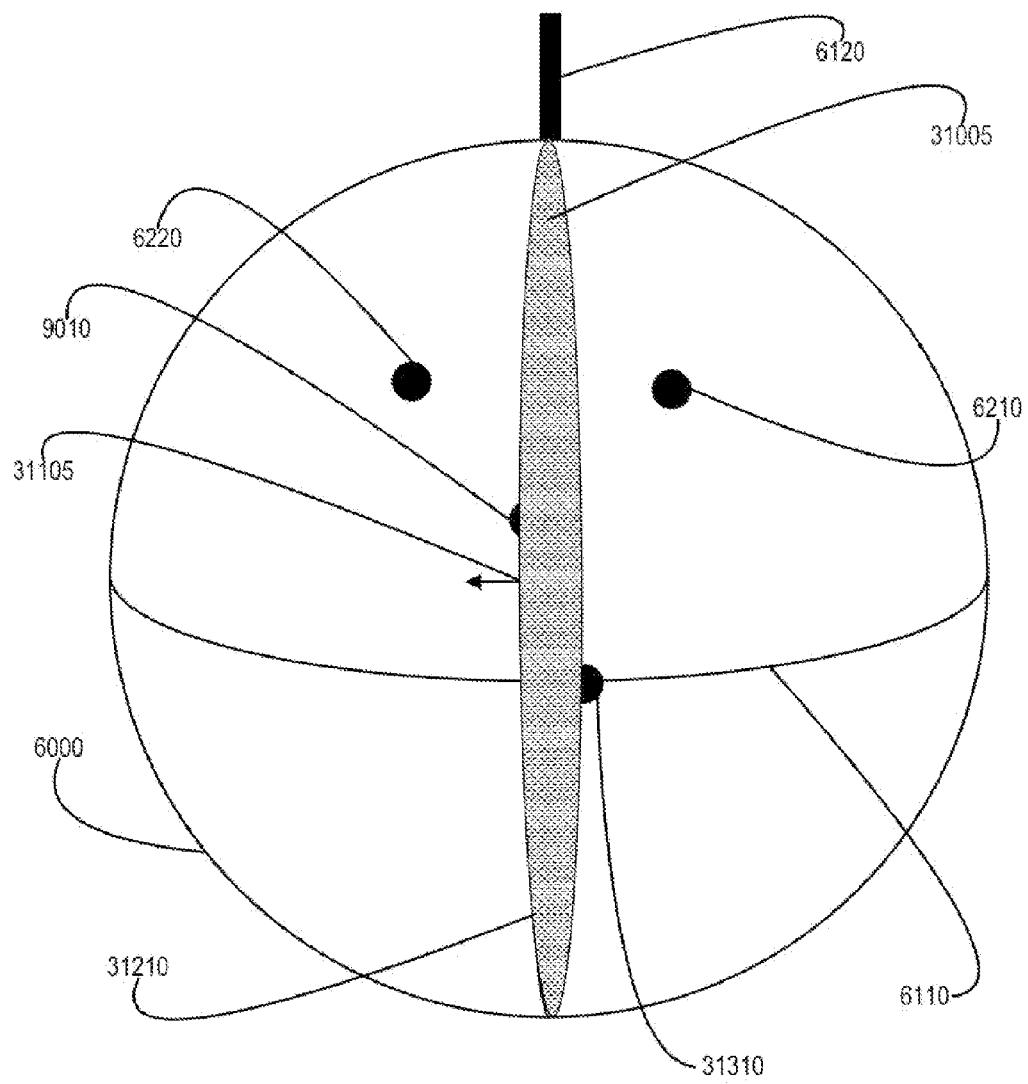
FIG. 31C provides an exemplary illustration of a second plane that includes an origin of a sphere, a second position and a second equator intercept, according to one or more embodiments.

In another example, a second plane that includes the origin, a first position (e.g., position 9010 of FIG. 31B), and at least one of an equator intercept and a pole (e.g., pole 6120, pole 6130, etc.) may be rotated about an axis that is associated with and/or includes the first position by the bearing (e.g., $\mu_2$) from the first position to the object at the second position. For instance, as illustrated in FIG. 31C, the second plane may include the origin of sphere 6000, position 9010, and at least one of an equator intercept 31310 and a pole (e.g., pole 6120, pole 6130, etc.), and may be rotated by angle $\mu_2$ about an axis from the origin to position 9010 to compute plane 31010, illustrated in FIG. 31A, which includes the origin, the first position, and the second position (e.g., the position of the remote object).

In one or more embodiments, a plane may be rotated, by an angle, about an axis or a vector. For example, the method illustrated in FIG. 42 may be utilized in a rotation, by a bearing, of a plane about an axis or a vector.

In one instance, plane 30005 (illustrated in FIG. 30C) that includes the origin, position 6010, and at least one of an equator intercept and a pole (e.g., pole 6120, pole 6130, etc.) may be represented by and/or associated with vector 30105 which may be rotated about a vector from the origin to position 6010 (or a vector from the origin to position 6010 divided by a non-zero scalar such as a magnitude of the vector from the origin to position 6010) to compute vector 30110 (illustrated in FIG. 30A) that represents and/or is associated with plane 30010. In another instance, plane 31005 (illustrated in FIG. 31C) that includes the origin, position 9010, and at least one of the equator intercept and a pole (e.g., pole 6120, pole 6130, etc.) may be represented by and/or associated with vector 31105 which may be rotated about a vector from the origin to position 9010 (or a vector from the origin to position 9010 divided by a non-zero scalar) to compute vector 31110 (illustrated in FIG. 31A) that represents and/or is associated with plane 31010.

Turning now to FIG. 43, an exemplary method of computing a product of two quaternions is illustrated, according to one or more embodiments. In one or more embodiments, a quaternion product of $q_1q_2$, where $q_1=[s_1, \bar{a}_1]$ and $q_2=[s_2, \bar{a}_2]$, may be computed utilizing multiple dot products (e.g., inner products). For example, $q_1q_2=[s_1, \bar{a}_1][s_2, \bar{a}_2]=[s_1s_2-\bar{a}_1\cdot\bar{a}_2, s_1\bar{a}_2+s_2\bar{a}_1+\bar{a}_1\times\bar{a}_2]$ which may be expressed as $$\begin{pmatrix} s_1 & -a_{1X} & -a_{1Y} & -a_{1Z} \\ a_{1X} & s_1 & -a_{1Z} & a_{1Y} \\ a_{1Y} & a_{1Z} & s_1 & -a_{1X} \\ a_{1Z} & -a_{1Y} & a_{1X} & s_1 \end{pmatrix} \begin{pmatrix} s_2 \\ a_{2X} \\ a_{2Y} \\ a_{2Z} \end{pmatrix} = M_{q1}V_{q2} = V_{q3}.$$

At 43010, a dot product (e.g., an inner product) of a first row of $M_{q1}$ and vector $V_{q2}$ may be computed. For example, $(s_1,-a_{1X},-a_{1Y},-a_{1Z})\cdot(s_2,a_{2X},a_{2Y},a_{2Z})$ may be computed as a first element of $V_{q3}$. At 43020, a dot product (e.g., an inner product) of a second row of $M_{q1}$ and vector $V_{q2}$ may be computed. For example, $(a_{1X},s_1,-a_{1Z},-a_{1Y})\cdot(s_2,a_{2X},a_{2Y},a_{2Z})$ may be computed as a second element of $V_{q3}$. At 43030, a dot product (e.g., an inner product) of a third row of $M_{q1}$ and vector $V_{q2}$ may be computed. For example, $(a_{1Y},a_{1Z},s_1,-a_{1X})\cdot(s_2,a_{2X},a_{2Y},a_{2Z})$ may be computed as a third element of $V_{q3}$. At 43040, a dot product (e.g., an inner product) of a fourth row of $M_{q1}$ and vector $V_{q2}$ may be computed. For example, $(a_{1Z},-a_{1Y},a_{1X},s_1)\cdot(s_2,a_{2X},a_{2Y},a_{2Z})$ may be computed as a fourth element of $V_{q3}$. In one or more embodiments, the method illustrated in FIG. 43 computes $$V_{q3} = \begin{pmatrix} (s_1, -a_{1X}, -a_{1Y}, -a_{1Z}) \cdot (s_2, a_{2X}, a_{2Y}, a_{2Z}) \\ (a_{1X}, s_1, -a_{1Z}, -a_{1Y}) \cdot (s_2, a_{2X}, a_{2Y}, a_{2Z}) \\ (a_{1Y}, a_{1Z}, s_1, -a_{1X}) \cdot (s_2, a_{2X}, a_{2Y}, a_{2Z}) \\ (a_{1Z}, -a_{1Y}, a_{1X}, s_1) \cdot (s_2, a_{2X}, a_{2Y}, a_{2Z}) \end{pmatrix}.$$

Figure 44:
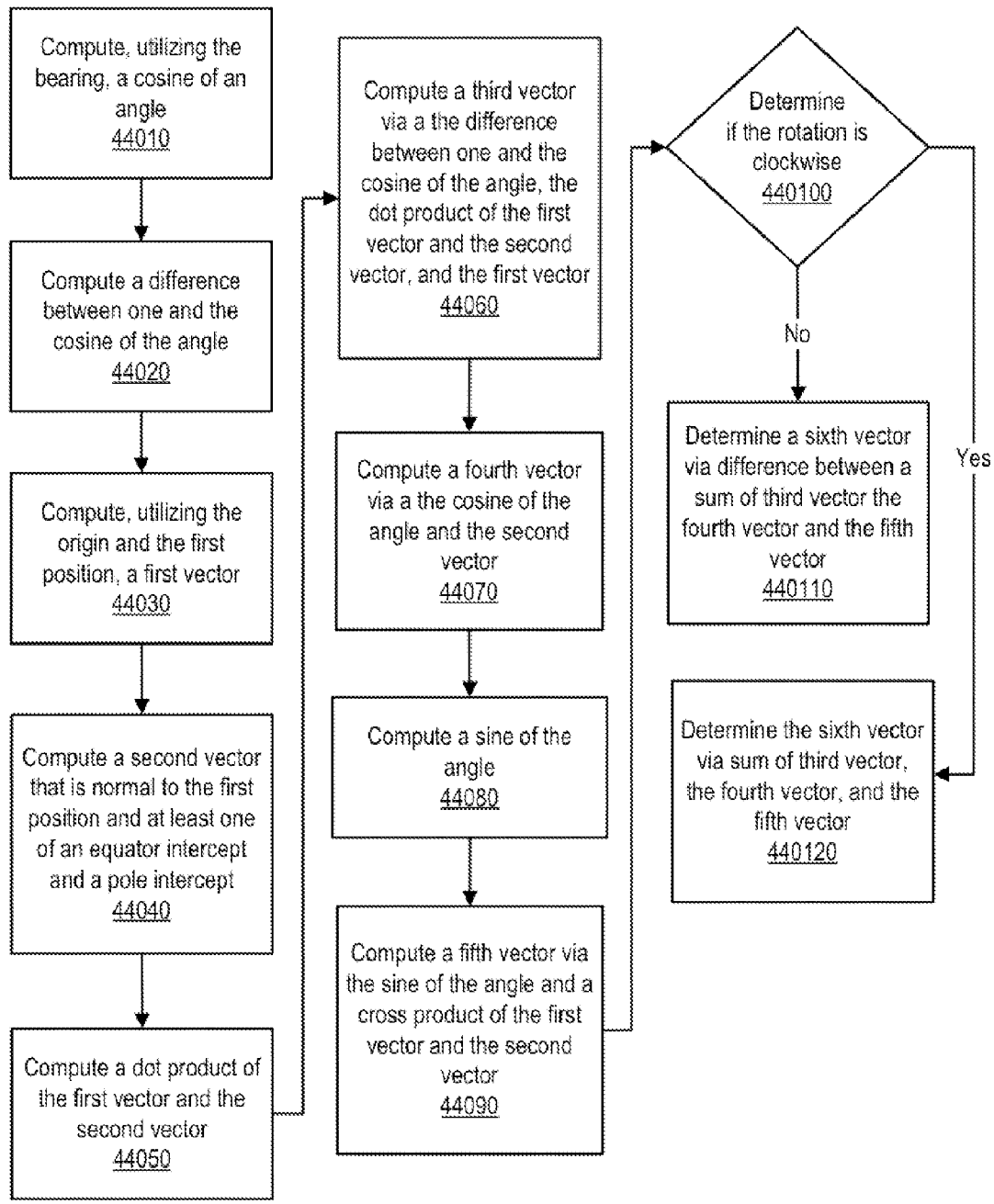
FIG. 44 provides an exemplary method of computing, utilizing a bearing from a first position to an object at a second position, a plane that includes the first position, an origin, and the second position, according to one or more embodiments.

Turning now to FIG. 44, an exemplary method of computing, utilizing a bearing from a first position to an object at a second position, a plane that includes the first position, an origin, and the second position is illustrated, according to one or more embodiments. At 44010, a cosine of an angle (e.g., θ) may be determined, utilizing the bearing from a first position an object at a second position. In one or more embodiments, the angle may be or include the bearing from the first position to the object at the second position adjusted by an angle of declination (e.g., a number).

At 44020, a difference between one and the cosine of the angle may be computed. At 44030, a first vector may be computed, utilizing an origin and the first position. For example, computing the first vector may include determining a vector from the origin to the first position. At 44040, a second vector that is normal to the first vector and at least one of a pole (e.g., pole 6120, pole 6130, etc.) and an equator intercept may be computed. In one example, the method illustrated in FIG. 28A may be utilized to compute the second vector. In another example, the method illustrated in FIG. 28B may be utilized to compute the second vector.

At 44050, a dot product (e.g., an inner product) of the first vector and the second vector may be computed. At 44060, a third vector may be computed via the difference between one and the cosine of the angle (e.g., as computed at 44020), the dot product of the first vector and the second vector (e.g., as computed at 44040), and the first vector. In one or more embodiments, a product of the difference between one and the cosine of the angle and the dot product of the first vector and the second vector may be computed via multiplying the difference between one and the cosine of the angle and the dot product of the first vector and the second vector, and the third vector may be computed via multiplying the first vector and the product of the difference between one and the cosine of the angle and the dot product of the first vector and the second vector.

At 44070, a fourth vector may be computed via the second vector and the cosine of the angle. For example, computing the fourth vector, via the second vector and the cosine of the angle, may include computing a product of the second vector and the cosine of the angle via multiplying the cosine of the angle to produce the fourth vector.

At 44080, a sine of the angle may be determined. For example, determining the sine of the angle may include computing the sine of the angle. At 44090, a fifth vector may be determined via the sine of the angle and a cross product of the first vector and the second vector. For example, determining the fifth vector, via the sine of the angle and the cross product of the first vector and the second vector may include computing the cross product of the first vector and the second vector and computing a product of the sine of the angle and the cross product of the first vector and the second vector via multiplying the angle and the cross product of the first vector and the second vector.

At 44100, it may be determined if the rotation is clockwise. In one or more embodiments, the rotation may be with respect to the first vector as an axis of rotation. If the rotation is not clockwise (e.g., counterclockwise), a sixth vector may be determined, at 44110, via computing a sum of the third vector and the fourth vector and computing a different between the sum and the fifth vector. If the rotation is clockwise, a sixth vector may be determined, at 44120, via computing a sum of the third vector, the fourth vector, and the fifth vector.

In one or more embodiments, a plane may be rotated, by an angle, about an axis or a vector. For example, the method illustrated in FIG. 44 may be utilized in a rotation, by a bearing, of a plane about an axis or a vector. In one instance, plane 30005, illustrated in FIG. 30C, that includes the origin, position 6010, and at least one of the equator intercept and a pole (e.g., pole 6120) may be represented by and/or associated with vector 30105 which may be rotated about a vector from the origin to position 6010 (or a vector from the origin to position 6010 divided by a non-zero scalar) to compute vector 30110, illustrated in FIG. 30A, that represents and/or is associated with plane 30010.

In another instance, plane 31005, illustrated in FIG. 31C, that includes the origin, position 9010, and at least one of the equator intercept and a pole (e.g., pole 6120) may be represented by and/or associated with vector 31105 which may be rotated about a vector from the origin to position 9010 (or a vector from the origin to position 9010 divided by a non-zero scalar) to compute vector 31110, illustrated in FIG. 31A, that represents and/or is associated with plane 31010.

In one or more embodiments, the method illustrated in FIG. 44 may be utilized in a computation of a rotated vector from a first vector rotated about a second vector or an axis. For example, the method illustrated in FIG. 44 may be utilized in an implementation of a rotated vector from a first vector rotated about a second vector or an axis. For example, the method illustrated in FIG. 44 may be utilized in an implementation of $\vec{v}_{rotated} = \vec{v}_1 \cos(\theta) + (\vec{v}_2 \times \vec{v}_1)\sin(\theta) + \vec{v}_2(\vec{v}_2 \cdot \vec{v}_1)(1-\cos(\theta))$, where $\vec{v}_1$ is the first vector, $\vec{v}_2$ is the second vector or the axis, and θ is the bearing to the remote object. In one instance, $\theta = \mu_1$ at position 6010, as illustrated in FIG. 30B, which may be utilized to compute vector 30110 as illustrated in FIG. 30A. In another instance, $\theta = \mu_2$ at position 9010, as illustrated in FIG. 31B, which may be utilized to compute vector 31110 as illustrated in FIG. 31A.

Turning now to FIG. 45, an exemplary method of determining, utilizing a bearing from a first position to an object at a second position, a plane that includes the first position, the second position, and an origin is illustrated, according to one or more embodiments. At 45010, a cosine of an angle (e.g., θ) may be determined, utilizing the bearing from the first position to the object at the second position. For example, determining the cosine of the angle may include computing the cosine of the angle. In one or more embodiments, the angle may be or include the bearing from the first position to the object at the second position adjusted by an angle of declination (e.g., a number). For example, the angle may be or include the bearing from the first position to the object at the second position such that the angle of declination is added to or subtracted from the bearing from the first position to the object at the second position. In one instance, $\theta = \mu_1$. In another instance, $\theta = \mu_2$.

At 45020, a difference between one and the cosine of the angle may be determined. For example, determining the difference between one and the cosine of the angle may include computing the difference between one and the cosine of the angle. At 45030, a first matrix may be determined. In one or more embodiments, determining the plane that includes the first position and the second position may include rotating, by the bearing, a first vector about a second vector or an axis associated with the second vector. For example, $\vec{v}_1$ (the first vector) may be rotated, by θ, about $\vec{v}_2$ (the second vector). For instance, $\vec{v}_2$ may be associated with a plane that includes the first position, and the origin and/or may be utilized to describe and/or reference a plane that includes the first position and the origin. In one or more embodiments, the first matrix ($M_1$) may be populated with components of the second vector. For example, $$M_1 = \begin{pmatrix} v_{2X}^2 & v_{2X}v_{2Y} & v_{2X}v_{2Z} \\ v_{2X}v_{2Y} & v_{2Y}^2 & v_{2Y}v_{2Z} \\ v_{2X}v_{2Z} & v_{2Y}v_{2Z} & v_{2Z}^2 \end{pmatrix}.$$

At 45040, a second matrix ($M_2$) may be determined. For example, determining the second matrix may include computing a multiplicative product of the result of method element 45020 and the first matrix. For example, $$M_2 = (1 - \cos(\theta))M_1 = (1 - \cos(\theta)) \begin{pmatrix} v_{2X}^2 & v_{2X}v_{2Y} & v_{2X}v_{2Z} \\ v_{2X}v_{2Y} & v_{2Y}^2 & v_{2Y}v_{2Z} \\ v_{2X}v_{2Z} & v_{2Y}v_{2Z} & v_{2Z}^2 \end{pmatrix}.$$

At 45050, a third matrix may be determined. In one or more embodiments, the third matrix ($M_3$) may be populated with components of the cosine of the bearing. For example, $$M_3 = \begin{pmatrix} \cos(\theta) & 0 & 0 \\ 0 & \cos(\theta) & 0 \\ 0 & 0 & \cos(\theta) \end{pmatrix}.$$

At 45060, a fourth matrix may be determined. In one or more embodiments, the fourth matrix ($M_4$) may be populated with components of the second vector. For example, $$M_4 = \begin{pmatrix} 0 & -v_{2Z} & v_{2Y} \\ v_{2Z} & 0 & -v_{2X} \\ -v_{2Y} & v_{2X} & 0 \end{pmatrix}.$$

At 45070, a sine of an angle (e.g., $\theta$) may be determined, utilizing the bearing from the first position to the object at the second position. For example, determining the sine of the angle may include computing the sine of the angle. In one or more embodiments, the angle may be or include the bearing from the first position to the object at the second position adjusted by an angle of declination (e.g., a number). For example, the angle may be or include the bearing from the first position to the object at the second position such that the angle of declination is added to or subtracted from the bearing from the first position to the object at the second position. In one instance, $\theta = \mu_1$. In another instance, $\theta = \mu_2$.

At 45080, a fifth matrix may be determined. For example, determining the fifth matrix ($M_5$) may include computing a multiplicative product of the result of method element 45070 and the fourth matrix. For example, $$M_5 = \sin(\theta)M_4 = \sin(\theta) \begin{pmatrix} 0 & -v_{2Z} & v_{2Y} \\ v_{2Z} & 0 & -v_{2X} \\ -v_{2Y} & v_{2X} & 0 \end{pmatrix}.$$

At 45090, a sixth matrix may be determined. For example, determining the sixth matrix ($M_6$) may include computing a matrix sum of the second matrix, the third matrix, and the fifth matrix. For example, $M_6 = M_2 + M_3 + M_5$. At 45100, a third vector may be determined. For example, determining the third vector may include computing a product of the sixth matrix and the first vector. For instance, $\vec{v}_3 = M_6 \vec{v}_1$. In one or more embodiments, $M_6$ may be a rotation matrix that rotates a vector, $\vec{v}_1$, about the first position (or a vector associated with the first position such as $\vec{v}_2$) by $\theta$. In one example, $\theta = \mu_1$. In another example, $\theta = \mu_2$.

In one or more embodiments, $\vec{v}_3$ may describe and/or be associated with the plane that includes the first position, the second position, and the origin and/or may be utilized to describe and/or reference the plane that includes the first position, the second position, and the origin. In one or more embodiments, a plane may be rotated, by an angle, about an axis or a vector. For example, the method illustrated in FIG. 45 may be utilized in a rotation, by a bearing, of a plane about an axis or a vector.

In one instance, plane 30005, illustrated in FIG. 30C, that includes the origin, position 6010, and at least one of the equator intercept and a pole (e.g., pole 6120) may be represented by and/or associated with vector 30105 (e.g., $\vec{v}_1$) which may be rotated about a vector (e.g., $\vec{v}_2$) from the origin to position 6010 (or a vector from the origin to position 6010 divided by a non-zero scalar) to compute vector 30110 (e.g., $\vec{v}_3$), illustrated in FIG. 30A, that represents and/or is associated with plane 30010. In another instance, plane 31005, illustrated in FIG. 31C, that includes the origin, position 9010, and at least one of the equator intercept and a pole (e.g., pole 6120) may be represented by and/or associated with vector 31105 (e.g., $\vec{v}_1$) which may be rotated about a vector (e.g., $\vec{v}_2$) from the origin to position 9010 (or a vector from the origin to position 9010 divided by a non-zero scalar) to compute vector 31110 (e.g., $\vec{v}_3$), illustrated in FIG. 31A, that represents and/or is associated with plane 31010.

Turning now to FIG. 46, an exemplary method of determining a position relative to one or more great circles is illustrated, according to one or more embodiments. At 46010, a first plane may be determined utilizing a first position and a second position. For example as illustrated in FIG. 35, a first vector from the origin of sphere 6000 to position 6210 (e.g., the first position) may be computed, a second vector from the origin of sphere 6000 to position 6220 (e.g., the second position) may be computed, and a third vector may be computed from a vector cross product of the second vector and the first vector. For instance, the third vector may be associated with and/or may be utilized to describe the first plane. In one or more embodiments, the first plane may include great arc 35310.

At 46020, a second plane may be determined utilizing a first position and a first equator intercept. For example, a fourth vector from the origin of sphere 6000 to the first equator intercept may be computed, and a fifth vector may be computed from a vector cross product of the first vector and the fourth vector. For instance, the fifth vector may be associated with and/or may be utilized to describe the second plane. In one or more embodiments, the second plane may include a great circle 35520.

At 46030, a third plane may be determined utilizing a second position and a second equator intercept. For example, a sixth vector from the origin of sphere 6000 to the second equator intercept may be computed, and a seventh vector may be computed from a vector cross product of the sixth vector and the second vector. For instance, the seventh vector may be associated with and/or may be utilized to describe the third plane. In one or more embodiments, the third plane may include a great circle 35510.

At 46040, a side of a great circle may be determined from a user position and a vector associated with and/or utilized to describe a plane that includes the great circle. In one example, the user position may be or include a position 35410, and an eighth vector may be computed from the origin of sphere 6000 to position 35410. For instance, a dot product (e.g., an inner product) of the eighth vector and the vector associated with and/or utilized to describe the plane that includes the great circle. If the dot product of the eighth vector and the vector associated with and/or utilized to describe the plane that includes the great circle is a positive number, position 35410 is to a first side of the great circle. If the dot product of the eighth vector and the vector associated with and/or utilized to describe the plane that includes the great circle is a negative number, position 35410 is to a second side of the great circle. If the dot product of the eighth vector and the vector associated with and/or utilized to describe the plane that includes the great circle is zero, position 35410 is on the great circle.

In one or more embodiments, method element 46040 may be repeated with one or more of great circles and/or respective one or more vectors associated with and/or utilized to describe respective one or more planes that include respective great circles and/or one or more user positions (e.g., one or more positions 35420-35440). For example, determining a user position with respect to one or more sides of great circles may determine a position relative to a start line and/or a starting area. For instance, great arc 35310 may be or include a start line (e.g., start line 3310 of FIG. 3), and pole 6120 may be on a course side of the start line.

In one example, a computation of a dot product of the eighth vector (e.g., associated with position 35410) and the third vector may produce a negative number which may indicate that position 35410 is not on the course side of the start line. In a second example, a ninth vector may be computed from the origin of sphere 6000 to position 35420, and a computation of a dot product of the ninth vector (e.g., associated with position 35420) and the third vector may produce a negative number which may indicate that position 35420 is not on the course side of the start line. In a third example, a tenth vector may be computed from the origin of sphere 6000 to position 35430, and a computation of a dot product of the tenth vector (e.g., associated with position 35430) and the third vector may produce a positive number which may indicate that position 35430 is on the course side of the start line.

In another example, a computation of a dot product of the ninth vector (e.g., associated with position 35420) and the fifth vector may produce a positive number which may indicate that position 35420 is east (e.g., if pole 6120 is a north pole) of great circle 35520. For instance, if position 35420 is east of great circle 35520, a shortest distance to the start line may include a distance to position 6210.

Turning now to FIG. 47, an exemplary method of determining a position may be determined from two planes determined via least squares is illustrated, according to one or more embodiments. At 47010, multiple data points, of a first set of data points, on or proximate to a first great circle may be acquired. For example, the first set of data points may be acquired via a position device traveling on or proximate to great circle 35520 (illustrated in FIG. 35). At 47020, a first plane may be computed utilizing the first set of data points. In one or more embodiments, a least squares method, process, and/or system may be utilized in computing the first plane from the first set of data points.

At 47030, multiple data points, of a second set of data points, on or proximate to a second great circle may be acquired. For example, the second set of data points may be acquired via a position device traveling on or proximate to a great circle that includes great arc 35310 (illustrated in FIG. 35). At 47020, a second plane may be computed utilizing the second set of data points. In one or more embodiments, a least squares method, process, and/or system may be utilized in computing the second plane from the second set of data points.

At 47040, an intersection of the first plane, the second plane, and a sphere associated with the first great circle and the second great circle may be computed. For example, the first plane may be associated with and/or described be a first vector, and the second plane may be associated with and/or described be a second vector. In one or more embodiments, computing the intersection of the first plane, the second plane, and the sphere associated with the first great circle and the second great circle may include computing a cross product of the first vector and the second vector and may include computing an intersection of the cross product of the first vector and the second vector with the sphere. For example, computing the intersection of the first plane, the second plane, and the sphere associated with the first great circle and the second great circle may produce position 6210.

Figure 48:
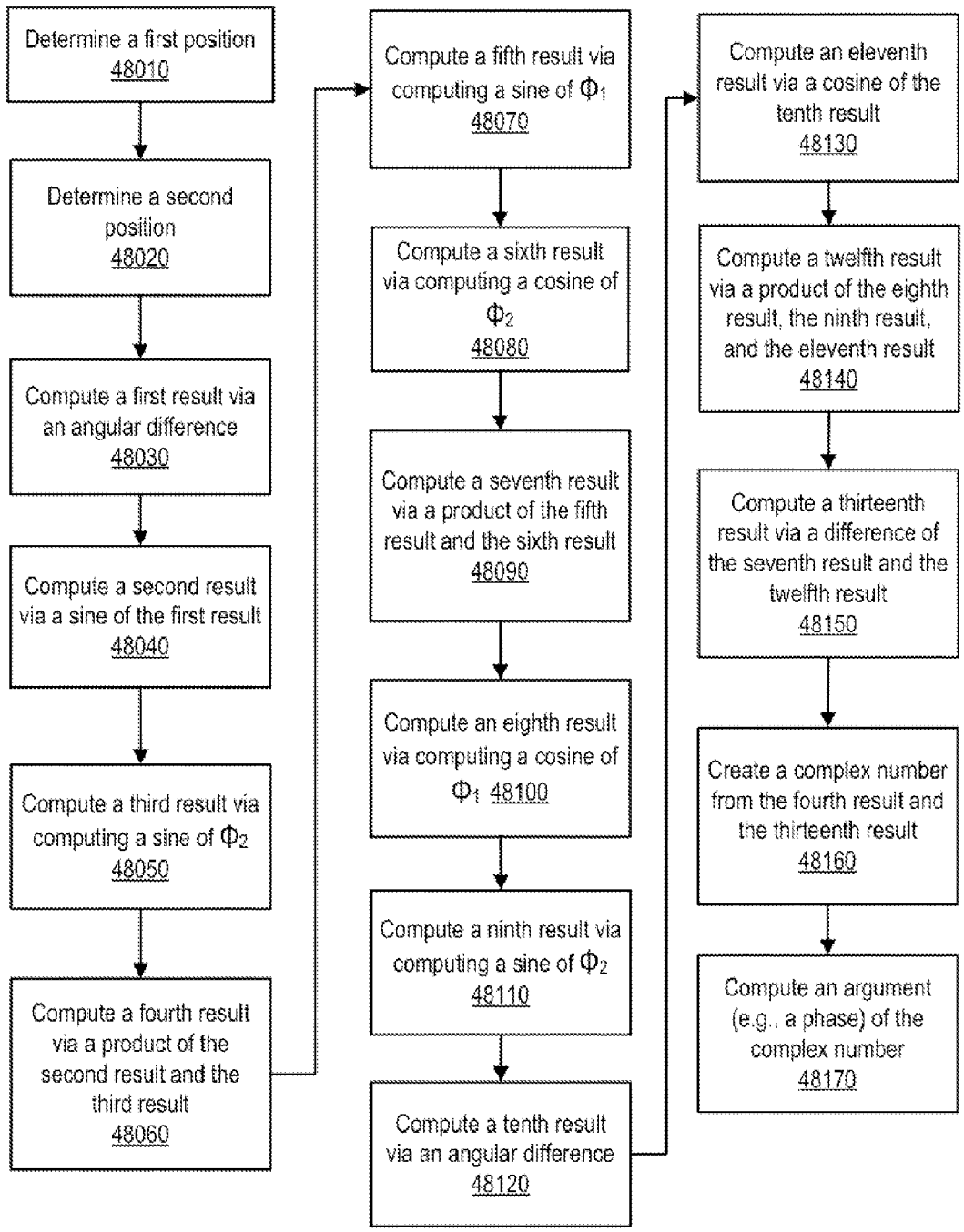
FIG. 48 provides an exemplary method of determining a bearing to a remote object, according to one or more embodiments.

Turning now to FIG. 48, an exemplary method of determining a bearing to a remote object is illustrated, according to one or more embodiments. At 48010, a first position may be determined. In one example, determining the first position may include receiving first position information from a position device. In another example, determining the first position may include a position device computing the first position.

At 48020, a second position may be determined. In one example, determining the second position may include receiving second position information from a position device. In another example, determining the second position may include a position device computing the second position.

Figure 49:
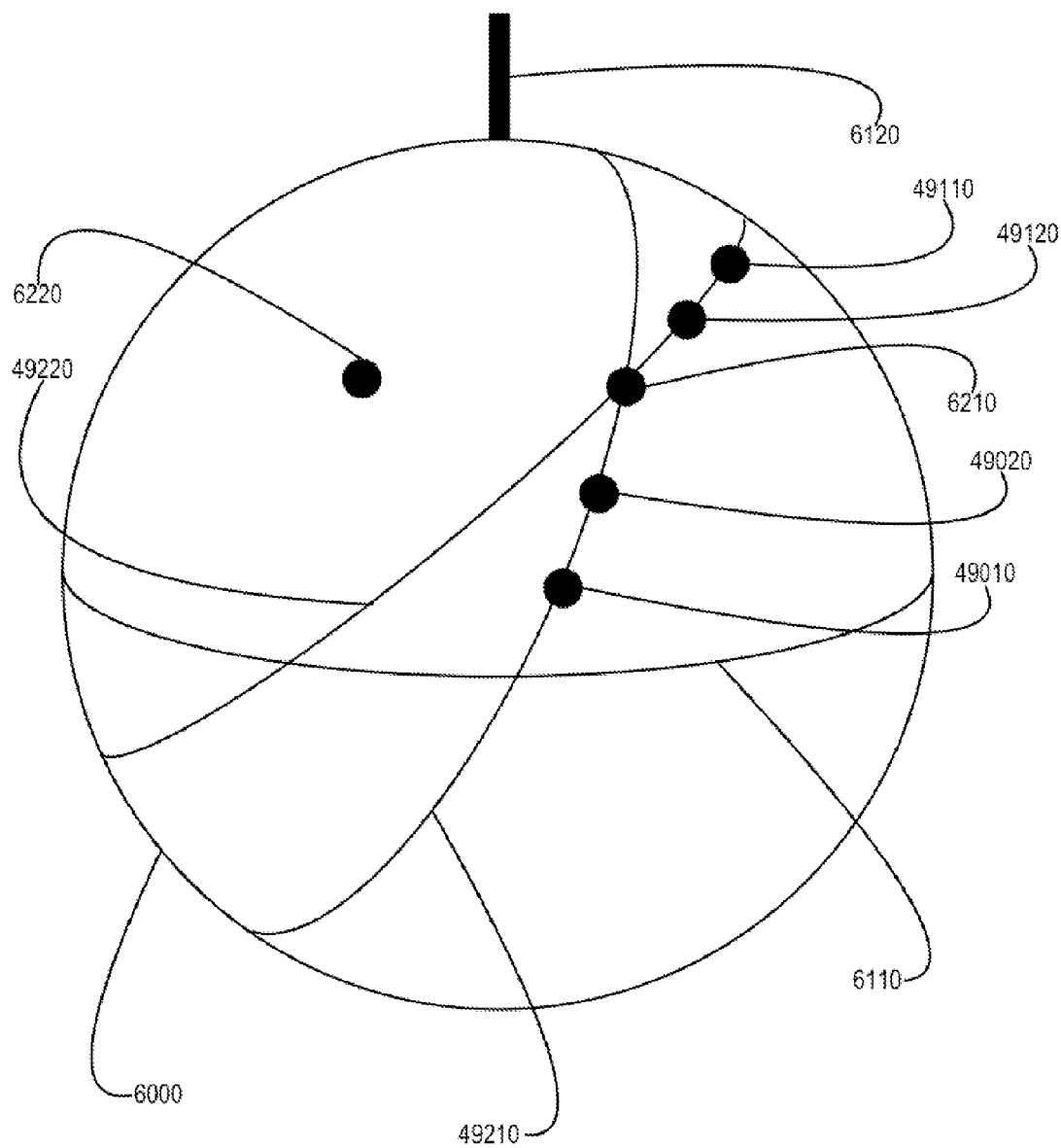
FIG. 49 provides an exemplary illustration of positions lying on great circles of a sphere, according to one or more embodiments.

In one or more embodiments, a first position, a second position, and a position of a remote object may lie on a great circle. In one example, as illustrated in FIG. 49, a first position 49010, a second position 49020, and position 6210 of a remote object may lie on a great circle 49210. In another example, a first position 49110, a second position 49120, and position 6210 of the remote object may lie on a great circle 49220. In one or more embodiments, the first position and the second position may be interchanged, and a bearing may be adjusted by one hundred and eighty degrees or $\pi$ radians.

In one or more embodiments, the first position and the second position may be represented via spherical coordinates. At 48030, a first result may be computed via an angular difference. For example, the first position may be represented via $(\rho_1, \theta_1, \phi_1)$, the second position may be represented via $(\rho_2, \theta_2, \phi_2)$, and the angular difference may be $\theta_2 - \theta_1$. At 48040, a second result may be computed via a sine of the first result. For example, computing the second result may include computing $\sin(\theta_2 - \theta_1)$. At 48050, a third result may be computed via computing a sine of $\phi_2$. For instance, computing the third result may include computing $\sin(\phi_2)$. At 48060, a fourth result may be computed via a product of the second result and the fourth result. For example, the fourth result may include computing $\sin(\theta_2 - \theta_1) \cdot \sin(\phi_2)$.

At 48070, a fifth result may be computed via computing a sine of $\phi_1$. For example, computing the fifth result may include computing $\sin(\phi_1)$. At 48080, a sixth result may be computed via computing a cosine of $\phi_2$. For example, computing the sixth result may include computing $\cos(\phi_2)$. At 48090, a seventh result may be computed via a product of the fifth result and the sixth result. For example, the seventh result may include computing $\sin(\phi_1)\cdot\cos(\phi_2)$.

At 48100, an eighth result may be computed via computing a cosine of $\phi_1$. For example, computing the eighth result may include computing $\cos(\phi_1)$. At 48110, a ninth result may be computed via computing a sine of $\phi_2$. For example, computing the ninth result may include computing $\sin(\phi_2)$. At 48120, a tenth result may be computed via computing an angular difference. For example, computing the angular difference may be computed via computing $\theta_2-\theta_1$. In one or more embodiments, computing a result may duplicate computing resources, and another computation that may duplicate a previous computation may retrieve a previous result from a memory as computing the result. For example, computing the tenth result may include retrieving the first result from a memory. At 48130, an eleventh result may be computed via computing a cosine of the angular difference. For example, computing the eleventh result may include computing $\cos(\theta_2-\theta_1)$.

At 48140, a twelfth result may be computed via a product of the eighth result, the ninth result, and the eleventh result. For example, computing the twelfth result may include computing $\cos(\phi_1)\cdot\sin(\phi_2)\cos(\theta_2-\theta_1)$. At 48150, a thirteenth result may be computed via a difference of the seventh result and the twelfth result. For example, the thirteenth result may include computing $\sin(\phi_1)\cdot\cos(\phi_2)-\cos(\phi_1)\cdot\sin(\phi_2)\cos(\theta_2-\theta_1)$.

At 48160, a complex number may be created from the fourth result and the thirteenth result. For example, $z=x+iy$, where x is the thirteenth result, $i=\sqrt{-1}$, and y is the fourth result. At 48170, an argument (e.g., a phase) of the complex number may be computed. For example, arg(z) may be computed. For instance, arg(z) may be a phase of x+iy. In one or more embodiments, the phase (e.g., arg(z)) is the bearing to the remote object. In one or more embodiments, the phase of x+iy may be less than zero, and the phase may be adjusted via computing an addition of three hundred and sixty degrees or $2\pi$ radians to the phase. In one example, the bearing to the object may be arg(z)+360, if the phase is less than zero. In another example, the bearing to the object may be arg(z)+$2\pi$, if the phase is less than zero.

In one or more embodiments, the method illustrated in FIG. 48 may be utilized in determining a position of a remote object. For example, a first bearing determined via the method illustrated in FIG. 48 (utilizing positions 49010 and 49020) may be utilized with either position 49010 or position 49020 and a second bearing determined via the method illustrated in FIG. 48 (utilizing positions 49110 and 49120) may be utilized with either position 49110 or position 49120 to determine position 6210.

In one or more embodiments, the method illustrated in FIG. 48 may be utilized in configuring and/or calibrating a digital compass. For example, a digital compass reading may be acquired at a first position of a system, traversing a portion of a great circle, and at, or after, a second position of the great circle a bearing may be computed and may be compared with the digital compass reading and/or utilized to configure and/or calibrate the digital compass and/or utilized as an offset for further digital compass readings.

Figure 50:
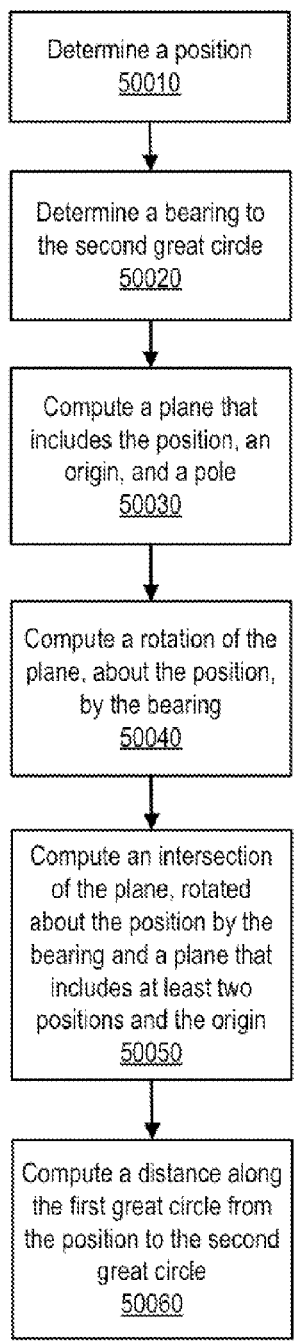
FIG. 50 provides an exemplary method of determining, utilizing a bearing, a distance along a first great circle from a position to a second great circle, according to one or more embodiments.

Turning now to FIG. 50, an exemplary method of determining, utilizing a bearing, a distance along a first great circle from a position to a second great circle is illustrated, according to one or more embodiments. At 50010, a position may be determined. In one example, the position may be received from a position device. In another example, the position may be computed via a position device. At 50020, a bearing to the second great circle may be determined. In one example, the bearing may be received from a bearing device. In a second example, the bearing may be computed via a bearing device. In a third example, the bearing may be received from a heading device. In another example, the bearing may be computed via a heading device. In one or more embodiments, a heading of a vehicle and/or vessel may be utilized as the bearing determined at 50020.

At 50030, a plane that includes the position, an origin, and a pole (e.g., a geographic pole, pole 6120, pole 6130, etc.) may be computed. In one or more embodiments, computing the plane that includes the position, the origin, and the pole may utilize one or more portions of one or more methods, processes, and/or systems described herein. At 50040, a rotation of the plane, about the position, by the bearing may be computed. In one or more embodiments, computing the rotation of the plane, about the position, by the bearing may utilize one or more portions of one or more methods, processes, and/or systems described herein.

In one or more embodiments, the second great circle may be described via at least two positions. For example, the second great circle may be described via positions 6210 and 6220. For instance, the second great circle may be described as an intersection of a surface of a sphere (e.g., sphere 6000) and a plane that includes the at least two positions and an origin of the sphere. In one or more embodiments, the plane that includes the at least two positions may be described by and/or associated with a vector that is a cross product of two vectors respectively associated with the at least two positions.

At 50050, an intersection of the plane, rotated about the position by the bearing, and the plane that includes the at least two positions and the origin may be computed. For example, a first vector may be associated with the rotated plane, about the position, by the bearing, and a second vector may be associated with the plane that includes the at least two positions and the origin. For instance, the intersection of the rotated plane, about the position, by the bearing and the plane that includes the at least two positions and the origin may be computed via computing a cross product of the first vector and the second vector. In one or more embodiments, the cross product of the first vector and the second vector may produce a third vector that may be scaled via a radius (e.g., a radius of a planet) and/or an altitude.

At 50060, a distance along the first great circle from the position to the second great circle may be computed utilizing the position and the third vector. In one or more embodiments, the third vector may be associated with a position on the second great circle. For example, the distance along the first great circle from the position to the second great circle may be computed utilizing the position and the position on the second great circle.

In one or more embodiments, the position may be associated with a fourth vector, and the distance along the first great circle from the position to the second great circle may be computed via computing a multiplicative product of a radius (e.g., a radius of a planet) and/or an altitude and an arccosine of an inner product (e.g., a dot product) of the third vector and the fourth vector. For example, the distance along the first great circle from the position to the second great circle may be computed via computing $R\cdot\cos^{-1}(\vec{v}_3\cdot\vec{v}_4)$, where R is a radius (e.g., a radius of a planet) and/or an altitude. For instance, the third vector and the fourth vector may be unit vectors. In one or more embodiments, the third vector and the fourth vector may be converted from a spherical coordinate system to a Cartesian coordinate system to compute the distance along the first great circle from the position to the second great circle.

In one or more embodiments, the method illustrated in FIG. 50 may be utilized a number of times within an amount of time transpiring. For example, the method illustrated in FIG. 50 may be utilized a number of times during a start sequence of a sailboat race. For instance, as time transpires (e.g., a countdown to a start of a sailboat race), the method illustrated in FIG. 50 may be utilized a number of times to compute a distance to a starting line (e.g., great circle portion 35310 as illustrated in FIG. 35) as the time transpires.

In one or more embodiments, a position of an antenna of a position device may be taken into account when computing a distant to an object and/or a starting line. For example, the position of the antenna of the position device may be at the back or stern of a vessel, and a length of the vessel may be subtracted from the distant to the object and/or the starting line.

In one or more embodiments, a velocity of a vehicle and/or a vessel may be determined, the method illustrated in FIG. 50 may be utilized to determine a distance from a position of the vehicle and/or the vessel, and an amount of time for the vehicle and/or the vessel to intersect and/or intercept a portion of a great circle (e.g., a starting line) may be computed. In one instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) before an amount of time transpires (e.g., before a countdown finishes). In a second instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) after an amount of time transpires (e.g., after a countdown finishes). In another instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) at an amount of time transpiring (e.g., when a countdown finishes).

In one or more embodiments, a vehicle and/or a vessel may change one or more positions, headings, and/or velocities during an amount of time transpiring. For example, a sailboat may change one or more positions, headings, and/or velocities during a countdown to a start of a sailboat race. Accordingly, it may be necessary to utilize a computing device to perform multiple computations, described herein, to achieve an outcome that would be favorable to a crew of the sailboat, according to one or more embodiments. For example, a member of the crew of the sailboat may not have time to perform repeated calculations during a last thirty seconds of a start sequence of a sailboat race.

Figure 51:
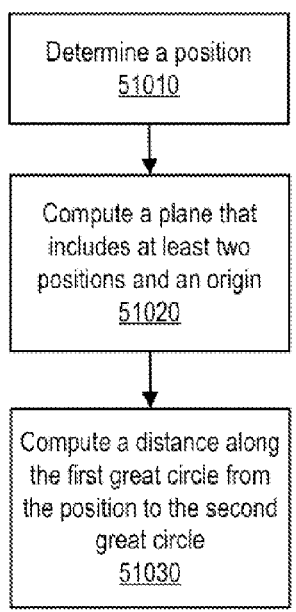
FIG. 51 provides an exemplary method of determining a distance along a first great circle from a position to a second great circle, according to one or more embodiments FIG. 52A provides an exemplary illustration of a vehicle and one or more cameras, according to one or more embodiments.

Turning now to FIG. 51, an exemplary method of determining a distance along a first great circle from a position to a second great circle is illustrated, according to one or more embodiments. At 51010, a position may be determined. In one example, the position may be received from a position device. In another example, the position may be computed via a position device.

At 51020, a plane that includes at least two positions and an origin may be computed. In one or more embodiments, the second great circle may be described via at least two positions. For example, the second great circle may be described via positions 6210 and 6220. For instance, the second great circle may be described as an intersection of a surface of a sphere (e.g., sphere 6000) and a plane that includes the at least two positions and an origin of the sphere. In one or more embodiments, computing the plane that includes at least two positions include computing a cross product of two vectors respectively associated with the at least two positions. For example, a vector associated with the cross product, of two vectors respectively associated with the at least two positions, may be utilized to describe the computed plane.

At 51030, a distance along a first great circle from the position to a second great circle may be computed utilizing the position and the vector that may be utilized to describe the plane. For example, a first vector may be associated with the position, and a second vector may be the vector utilized to describe the plane. For instance, the distance along the first great circle from the position to the second great circle may be computed via computing $R \cdot \cos^{-1}(\vec{v}_1 \cdot \vec{v}_2)$, where R is a radius (e.g., a radius of a planet) and/or an altitude. In one or more embodiments, the first vector and the second vector may be unit vectors. In one or more embodiments, this computation may be utilized to compute a shortest distance, on a surface of a sphere (e.g., along the first great circle), from the position to a great circle (e.g., the second great circle). For example, this computation may be utilized to compute a shortest distance from a position to a starting line, such as arc 35310 as illustrated FIG. 35. For instance, this computation may be utilized to compute a shortest distance from one or more of positions 35430, 35810, 35440, 35410, and 35820, among others to a starting line, such as arc 35310 as illustrated FIG. 35.

In one or more embodiments, the method illustrated in FIG. 51 may be utilized a number of times within an amount of time transpiring. For example, the method illustrated in FIG. 51 may be utilized a number of times during a start sequence of a sailboat race. For instance, as time transpires (e.g., a countdown to a start of a sailboat race), the method illustrated in FIG. 51 may be utilized a number of times to compute a distance to a starting line (e.g., great circle portion 35310 as illustrated in FIG. 35) as the time transpires.

In one or more embodiments, a velocity of a vehicle and/or a vessel may be determined, the method illustrated in FIG. 51 may be utilized to determine a distance from a position of the vehicle and/or the vessel, and an amount of time for the vehicle and/or the vessel to intersect and/or intercept a portion of a great circle (e.g., a starting line) may be computed. In one instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) before an amount of time transpires (e.g., before a countdown finishes). In a second instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) after an amount of time transpires (e.g., after a countdown finishes). In another instance, computing an amount of time for the vehicle and/or the vessel to intersect and/or intercept a portion of a great circle (e.g., a starting line) may be utilized in computing if the vehicle and/or the vessel shall intersect and/or intercept the portion of the great circle (e.g., the starting line) at an amount of time transpiring (e.g., when a countdown finishes).

In one or more embodiments, a vehicle and/or a vessel may change one or more positions, headings, and/or velocities during an amount of time transpiring. For example, a sailboat may change one or more positions, headings, and/or velocities during a countdown to a start of a sailboat race. Accordingly, it may be necessary to utilize a computing device to perform multiple computations, described herein, to achieve an outcome that would be favorable to a crew of the sailboat, according to one or more embodiments. For example, a member of the crew of the sailboat may not have time to perform repeated calculations during a last thirty seconds of a start sequence of a sailboat race.

Figure 52A:
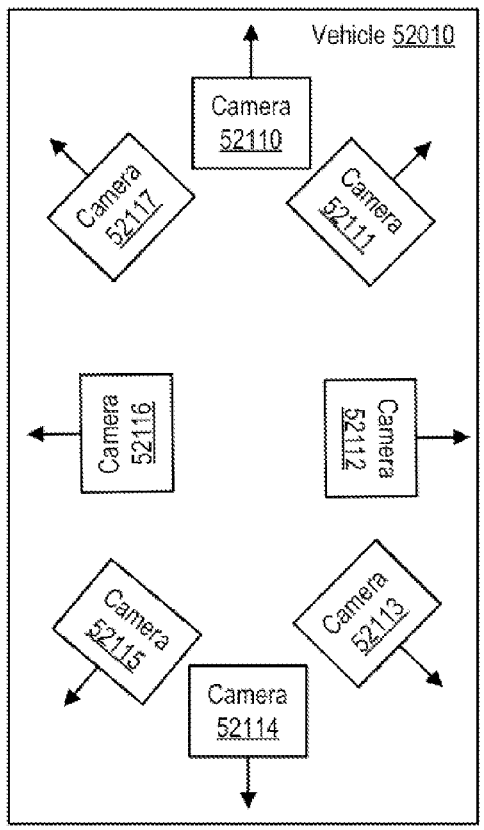
FIG. 52B provides an exemplary illustration of a mobile device and a camera, according to one or more embodiments.
Figure 52B:
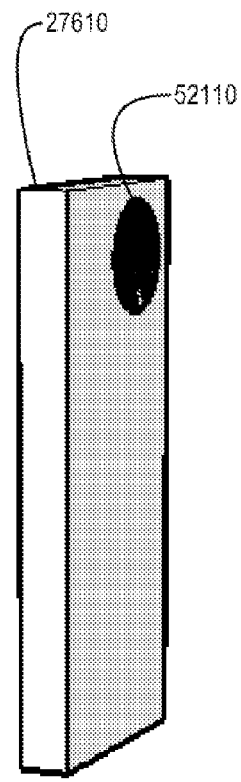

Turning now to FIGS. 52A and 52B, one or more cameras are illustrated, according to one or more embodiments. As illustrated in FIG. 52A, a vehicle 52010 may be associated with one or more cameras 52110-52117. In one or more embodiments, one or more cameras 52110-52117 may be mounted within and/or on vehicle 52010. As shown, arrows from cameras 52110-52117 may indicate a center of view of a respective camera. As illustrated in FIG. 52B, device 27610 may include and/or be coupled to camera 52110. In one or more embodiments, a camera (e.g., a camera of cameras 52110-52117) may include one or more image sensors that transforms light (e.g., light reflected off one or more objects) into one or more machine-readable (e.g., computer-readable) signals.

Figure 53:
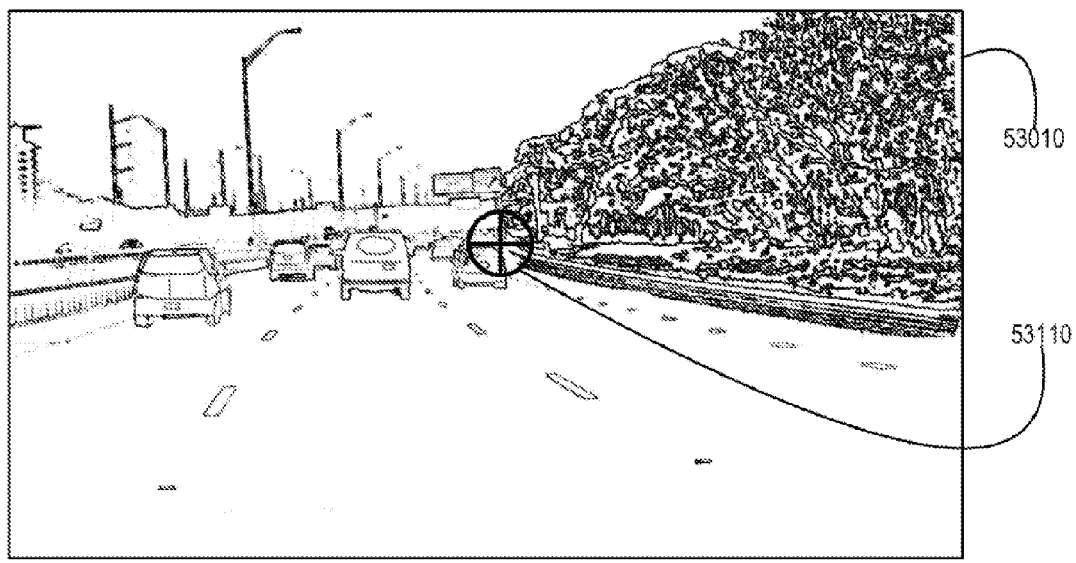
FIG. 53 provides an exemplary image of a remote object acquired via a camera at a first position, according to one or more embodiments.

In one example, as shown in FIG. 53, an image 53010 may be acquired via camera 52110, and a first position may be determined where vehicle 52010 or camera 52110 was when image 53010 was acquired. In one or more embodiments, one or more of cameras 52110-52117 may acquire still images. In one or more embodiments, one or more of cameras 52110-52117 may acquire motion pictures and/or videos. In one or more embodiments, one or more still images may be acquired from a video and/or a motion picture.

As shown in FIG. 53, a sight 53110 may be utilized to determine a first bearing to a remote object (e.g., an exit ramp shown in FIG. 53). In one or more embodiments, user input may be received that may align a sight 53110 with the remote object. In one or more embodiments, one or more methods and/or processes may be utilized to determine a position of the remote object via an image. For example, one or more methods and/or processes associated with computer vision may be utilized to determine the remote object via the image. For instance, sight 53110 may not be present when one or more methods and/or processes associated with computer vision may be utilized to determine the remote object via the image. In one or more embodiments, a first offset may be computed from a position of the remote object within image 53010, and a heading of vehicle 52010 and the first offset may be utilized to determine the first bearing.

Figure 54:
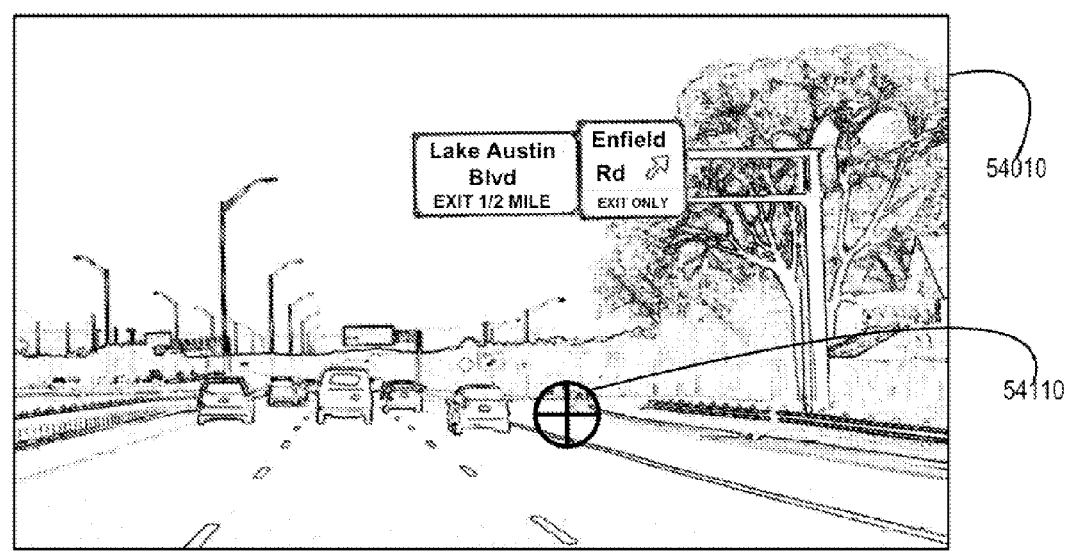
FIG. 54 provides an exemplary image of a remote object acquired via a camera at a second position, according to one or more embodiments.

In another example, as shown in FIG. 54, an image 54010 may be acquired via camera 52110, and a second position may be determined where vehicle 52010 or camera 52110 was when image 54010 was acquired. As shown in FIG. 54, a sight 54110 may be utilized to determine a second bearing to the remote object (e.g., the exit ramp shown in FIG. 54). In one or more embodiments, user input may be received that may align a sight 54110 with the remote object. In one or more embodiments, one or more methods and/or processes may be utilized to a position of determine the remote object via an image. For example, one or more methods and/or processes associated with computer vision may be utilized to determine the remote object via the image. For instance, sight 54110 may not be present when one or more methods and/or processes associated with computer vision may be utilized to determine the remote object via the image. In one or more embodiments, a second offset may be computed from a position of the remote object within image 54010, and a heading of vehicle 52010 and the first offset may be utilized to determine the second bearing. In one or more embodiments, the first position (e.g., of camera 52110 or vehicle 52010), the first bearing to the remote object as determined via image 53010, the second position (e.g., of camera 52110 or vehicle 52010), and the second bearing to the remote object as determined via image 54010 may be utilized in computing a position of the remote object.

Figure 55:
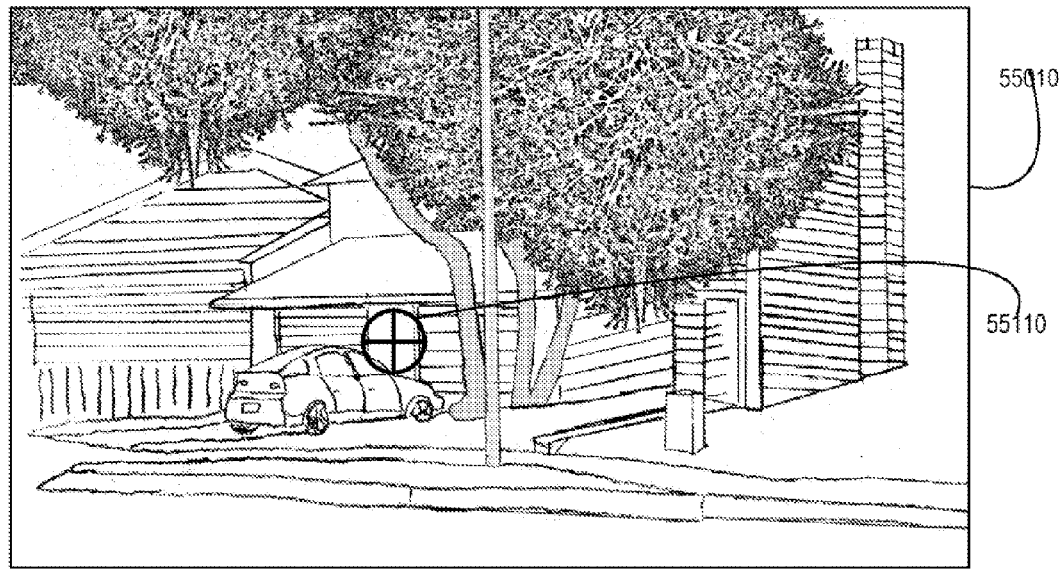
FIG. 55 provides an exemplary image of a remote object acquired via a camera at a first position, according to one or more embodiments.

In one or more embodiments, two or more of cameras 52110-52117 may be utilized in determining a position of a remote object. In one example, as shown in FIG. 55, an image 55010 may be acquired via camera 52111, and a first position may be determined where vehicle 52010 or camera 52111 was when image 55010 was acquired. As shown in FIG. 55, a sight 55110 may be utilized to determine a first bearing to a remote object (e.g., a house or a garage of a house shown in FIG. 55). In one or more embodiments, user input may be received that may align a sight 55110 with the remote object. In one or more embodiments, one or more methods and/or processes may be utilized to determine a position of the remote object via an image. For example, one or more methods and/or processes associated with computer vision may be utilized to determine the remote object via the image. For instance, sight 55110 may not be present when one or more methods and/or processes associated with computer vision may be utilized to determine the remote object via the image. In one or more embodiments, a first offset may be computed from a position of the remote object within image 55010, and a heading of vehicle 52010 and the first offset may be utilized to determine the first bearing.

Figure 56:
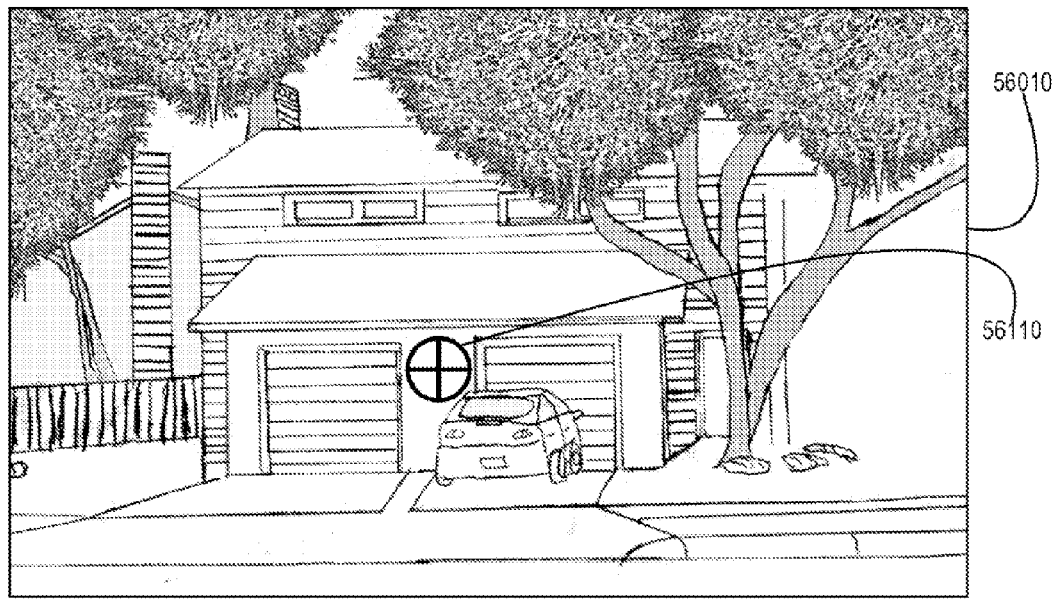
FIG. 56 provides an exemplary image of a remote object acquired via a camera at a second position, according to one or more embodiments.

In a second example, as shown in FIG. 56, an image 56010 may be acquired via camera 52112, and a second position may be determined where vehicle 52010 or camera 52112 was when image 56010 was acquired. As shown in FIG. 56, a sight 56110 may be utilized to determine a second bearing to a remote object (e.g., the house or the garage of the house shown in FIG. 56). In one or more embodiments, user input may be received that may align a sight 56110 with the remote object. In one or more embodiments, one or more methods and/or processes may be utilized to determine a position of the remote object via an image. For example, one or more methods and/or processes associated with computer vision may be utilized to determine the remote object via the image. For instance, sight 56110 may not be present when one or more methods and/or processes associated with computer vision may be utilized to determine the remote object via the image. In one or more embodiments, a second offset may be computed from a position of the remote object within image 56010, and a heading of vehicle 52010 and the second offset may be utilized to determine the second bearing.

Figure 57:
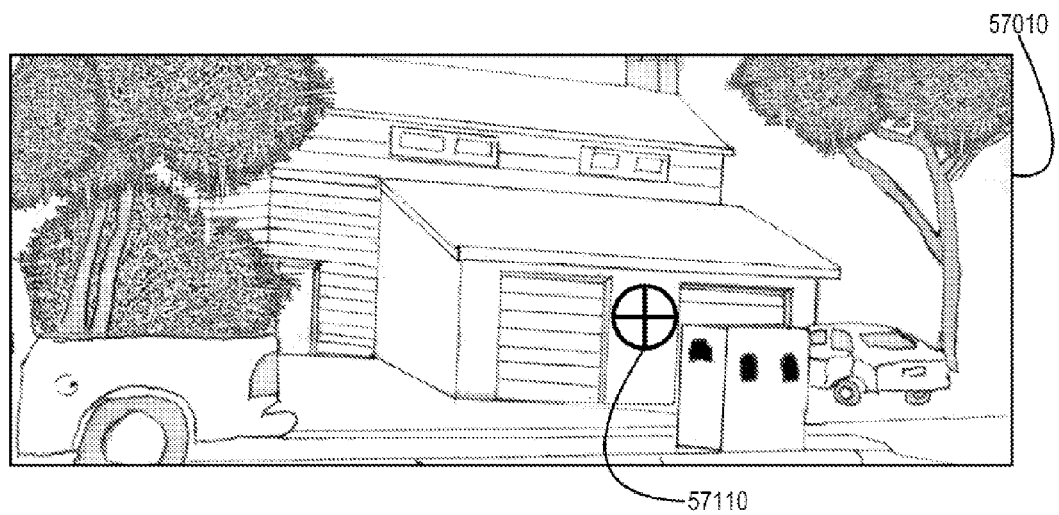
FIG. 57 provides an exemplary image of a remote object acquired via a camera at a third position, according to one or more embodiments.

In another example, as shown in FIG. 57, an image 57010 may be acquired via camera 52113, and a third position may be determined where vehicle 52010 or camera 52112 was when image 57010 was acquired. As shown in FIG. 57, a sight 57110 may be utilized to determine a second bearing to a remote object (e.g., the house or the garage of the house shown in FIG. 57). In one or more embodiments, user input may be received that may align a sight 57110 with the remote object. In one or more embodiments, one or more methods and/or processes may be utilized to determine a position of the remote object via an image. For example, one or more methods and/or processes associated with computer vision may be utilized to determine the remote object via the image. For instance, sight 57110 may not be present when one or more methods and/or processes associated with computer vision may be utilized to determine the remote object via the image. In one or more embodiments, a third offset may be computed from a position of the remote object within image 57010, and a heading of vehicle 52010 and the third offset may be utilized to determine the third bearing.

In one or more embodiments, a first data set may include the first position (e.g., of camera 52111 or vehicle 52010), and the first bearing to the remote object as determined via image 55010; a second data set may include the second position (e.g., of camera 52112 or vehicle 52010), and the second bearing to the remote object as determined via image 56010; and a third data set may include the third position (e.g., of camera 52113 or vehicle 52010), and the third bearing to the remote object as determined via image 57010. In one or more embodiments, at least two of the first data set, the second data set, and the third data set may be utilized to compute the position of the remote object.

Turning now to FIG. 58, an exemplary method of computing, utilizing one or more image sensors, a position of a remote object from two positions is illustrated, according to one or more embodiments. At 58010, a first position may be determined. At 58020, a first heading may be determined. In one example, the first heading may include a first heading of a vehicle. In another example, the first heading may include a first heading of a vessel. In one or more embodiments, a heading device or a bearing device may be utilized in determining a heading. For example, a heading may include a direction (e.g., an angular difference), with respect to a pole (e.g., a geographic north pole, a geographic south pole, a magnetic north pole, a magnetic south pole, pole 6120, pole 6130, etc.). For instance, the heading may include a direction (e.g., an angular difference), with respect to a pole, that a vehicle or vessel is traveling.

At 58030, a first image may be acquired. In one or more embodiments, the first image may be acquired via an image sensor. In one example, the image sensor may include a camera (e.g., a camera of cameras 52110-52117). In another example, a camera (e.g., a camera of cameras 52110-52117) may include the image sensor. In one or more embodiments, an image sensor may transform light (e.g., light reflected off objects) into a machine-readable (e.g., computer-readable) signals and/or data.

At 58040, a position of the remote object within the first image may be determined. In one or more embodiments, the first image may be displayed to a user, and determining the position of the remote object within the first image may include receiving user input, where the user input indicates the position of the remote object within the first image. In one or more embodiments, determining the position of the remote object within the first image utilizing user input may include computing a position within the first image that may be expressed in pixels. In one or more embodiments, determining the position of the remote object within the first image may include computing the position of the remote object within the first image via a computer imaging process (e.g., a computer vision process). For example, a computer vision imaging process may be utilized in determining the position of the remote object within the first image. In one or more embodiments, determining the position of the remote object within the first image utilizing a computer imaging process may include computing a position within the first image that may be expressed in pixels.

At 58050, a first bearing to the remote object may be computed. In one or more embodiments, computing the first bearing to the remote object may include utilizing the first heading and the position of the remote object within the first image. In one or more embodiments, computing the first bearing to the remote object may include utilizing the first heading, the position of the remote object within the first image, and an offset. In one example, the offset may include a declination angle. In another example, the offset may include a mounting angle of the image sensor. For instance, offsets may include zero degrees, forty-five degrees, ninety degrees, one hundred and thirty-five degrees, one hundred and eighty degrees, two hundred and twenty-five degrees, two hundred and seventy degrees, and three hundred and fifteen degrees for cameras 52110-52117, respectively.

In one or more embodiments, utilizing the position of the remote object within the first image may include utilizing a function of pixels to angles and/or a mapping of pixels to angles. In one example, the function of pixels to angles and/or the mapping of pixels to angle may include one hundred pixels, in a horizontal or x-axis direction, to the right of center of the first image may provide an angle of positive ten degrees. In another example, the function of pixels to angles and/or the mapping of pixels to angles may include one hundred pixels, in a horizontal or x-axis direction, to the left of center of the first image may provide an angle of negative ten degrees.

At 58060, a second position may be determined. At 58070, a second heading may be determined. In one example, the second heading may include a second heading of a vehicle. In another example, the first heading may include a second heading of a vessel. At 58080, a second image may be acquired. In one or more embodiments, the second image may be acquired via an image sensor. In one example, the image sensor may include a camera (e.g., a camera of cameras 52110-52117). In another example, a camera (e.g., a camera of cameras 52110-52117) may include the image sensor. In one or more embodiments, an image sensor may transform light (e.g., light reflected off objects) into a machine-readable (e.g., computer-readable) signals and/or data.

At 58090, a position of the remote object within the second image may be determined. In one or more embodiments, the second image may be displayed to a user, and determining the position of the remote object within the second image may include receiving user input, where the user input indicates the position of the remote object within the second image. In one or more embodiments, determining the position of the remote object within the second image utilizing user input may include computing a position within the second image that may be expressed in pixels. In one or more embodiments, determining the position of the remote object within the second image may include computing the position of the remote object within the second image via a computer imaging process (e.g., a computer vision process). For example, a computer vision imaging process may be utilized in determining the position of the remote object within the second image. In one or more embodiments, determining the position of the remote object within the second image utilizing a computer imaging process may include computing a position within the second image that may be expressed in pixels.

At 58100, a second bearing to the remote object may be computed. In one or more embodiments, computing the second bearing to the remote object may include utilizing the second heading and the position of the remote object within the second image. In one or more embodiments, computing the second bearing to the remote object may include utilizing the second heading, the position of the remote object within the second image, and an offset. In one example, the offset may include a declination angle. In another example, the offset may include a mounting angle of the image sensor. For instance, offsets may include zero degrees, forty-five degrees, ninety degrees, one hundred and thirty-five degrees, one hundred and eighty degrees, two hundred and twenty-five degrees, two hundred and seventy degrees, and three hundred and fifteen degrees for cameras 52110-52117, respectively.

In one or more embodiments, utilizing the position of the remote object within the second image may include utilizing a function of pixels to angles and/or a mapping of pixels to angles. In one example, the function of pixels to angles and/or the mapping of pixels to angles may include fifty-seven pixels, in a horizontal or x-axis direction, to the right of center of the second image may provide an angle of positive eight degrees. In another example, the function of pixels to angles and/or the mapping of pixels to angles may include fifty-two, in a horizontal or x-axis direction, to the left of center of the first image may provide an angle of negative eight degrees.

At 58110, a position of the remote object may be computed based on the first position, the first bearing, the second position, and the second bearing. In one or more embodiments, computing the position of the remote object, at 58100, may include utilizing one or more methods, processes, and/or systems described herein.

Turning now to FIG. 59, an exemplary method of determining a position of a remote object via utilizing multiple devices at multiple positions is illustrated, according to one or more embodiments. At 59010, a first position may be determined via a first device. In one or more embodiments, the first device may be operated by a first user. At 59020, a first bearing, at the first position, to a remote object may be determined via a second device. At 59030, a second position, different from the first position, may be determined via a third device. In one or more embodiments, the third device may be operated by a second user. For example, the second user may be differ from the first user. At 59040, a second bearing, at the second position, to the remote object may be determined via a fourth device.

At 59050, position information and bearing information may be provided to a fifth device. In one or more embodiments, the first device may provide the first position and the first bearing to the fifth device. In one or more embodiments, the third device may provide the second position and the second bearing to the fifth device. In one or more embodiments, the position information and the bearing information may be provided to the fifth device in one or more of a wired and wireless fashion. In one example, the position information and the bearing information may be provided to the fifth device via one or more of WiFi signals, cellular telecommunications signals, satellite telecommunications signals, Bluetooth communication signals, and a wireless network, among others. In a second example, the position information and the bearing information may be provided to the fifth device via one or more of a wired network, a wired telecommunications network, coaxial cable, twisted pair cable, and fiber optic cable, among others. In one or more embodiments, the position information and the bearing information may be provided to the fifth device via a network 64110, as described with reference to FIG. 64.

At 59060, the position information and the bearing information may be received via the fifth device. In one or more embodiments, the fifth device may receive the position information from the first device. In one or more embodiments, the fifth device may receive the position information from the third device. In one or more embodiments, the first device may be or include the second device. In one or more embodiments, the third device may be or include the fourth device. In one or more embodiments, the fifth device may be or include one or more of the first device, the second device, the third device, and the fourth device. At 59070, a position of the remote object may be computed, via the fifth device, via the first position, the first bearing, the second position, and the second bearing.

Figure 60:
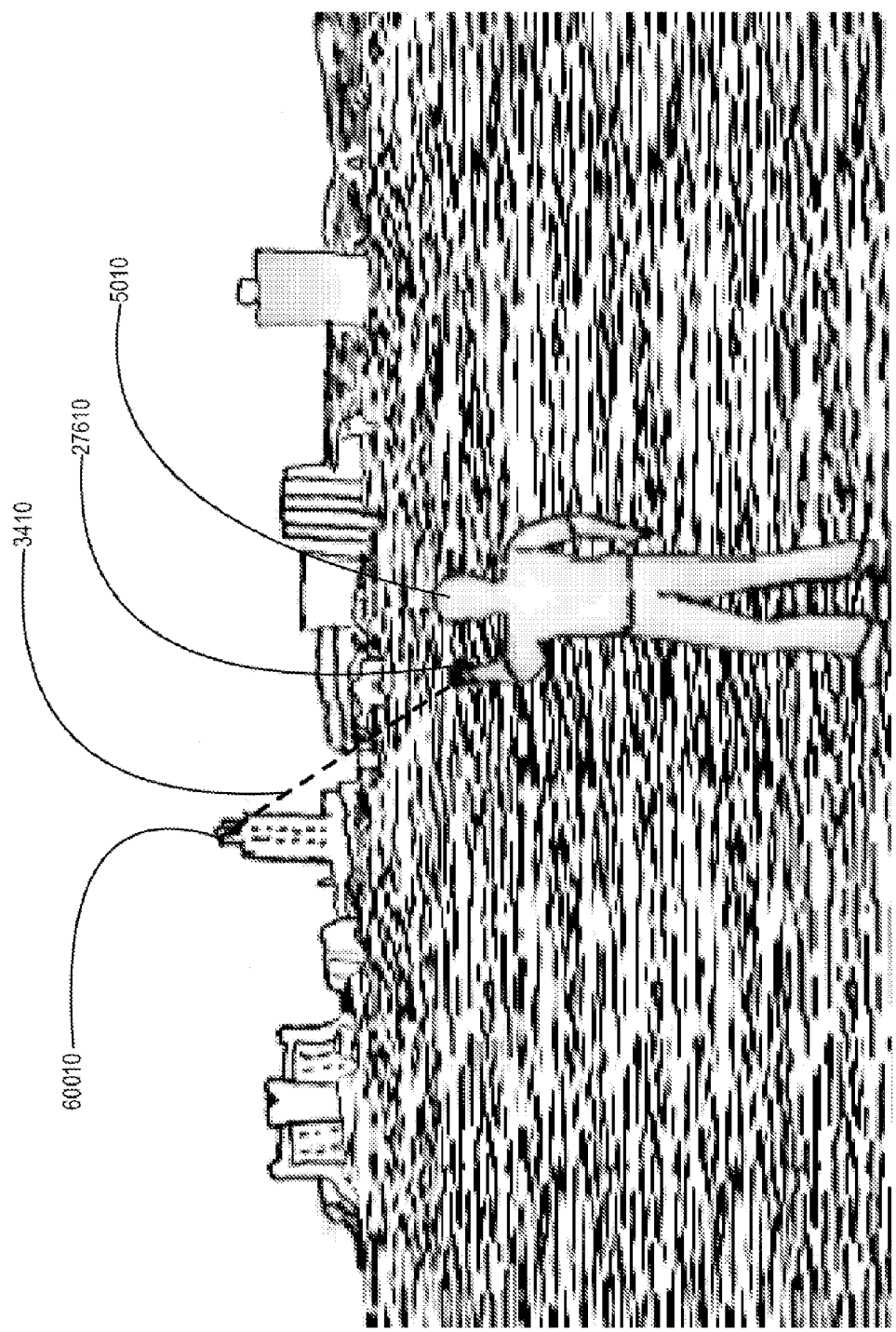
FIG. 60 provides an exemplary illustration of a user, at a first position, sighting a remote object via a mobile device at a first position, according to one or more embodiments.
Figure 61:
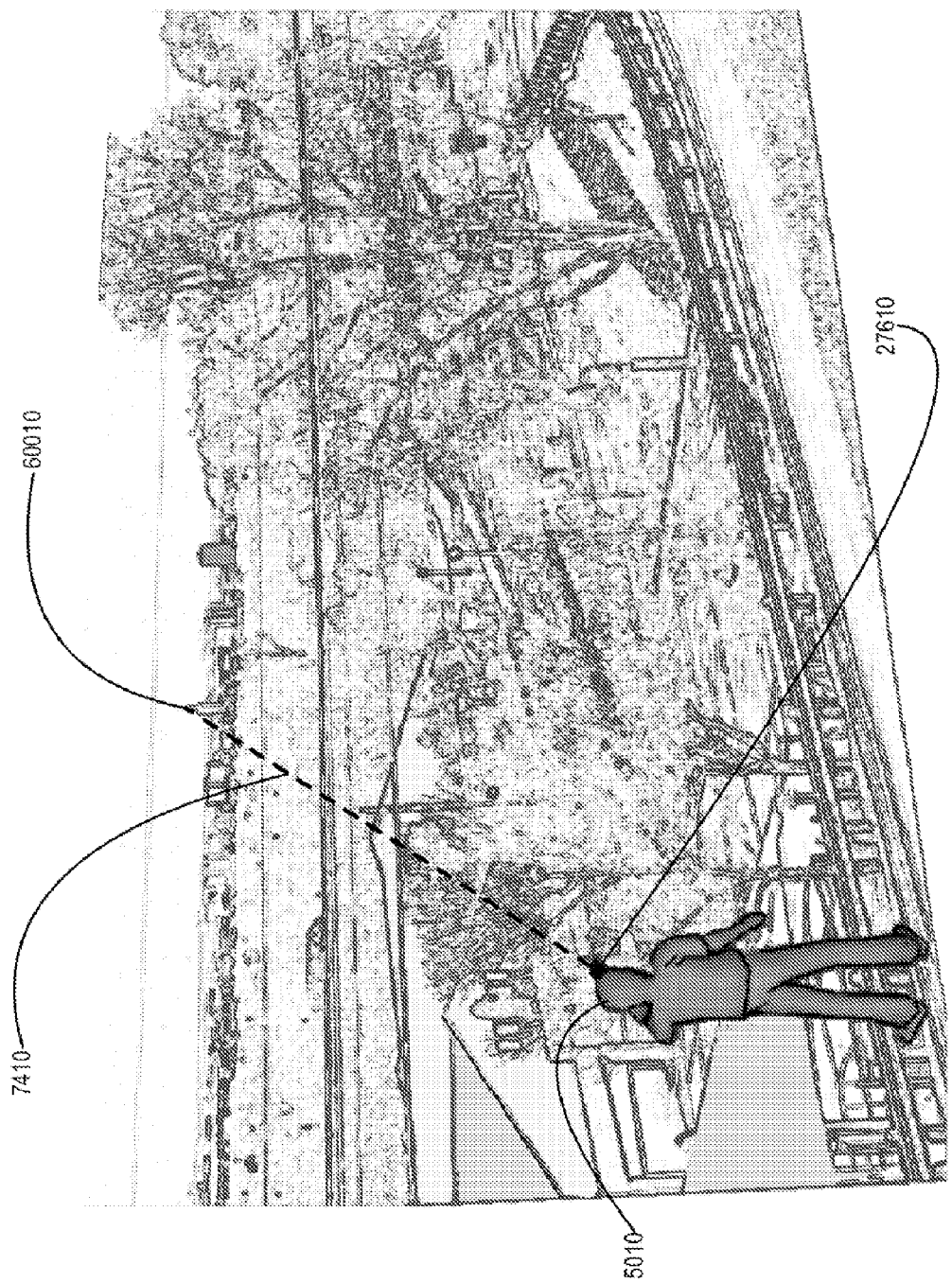
FIG. 61 provides an exemplary illustration of a user, at a second position, sighting a remote object via a mobile device, according to one or more embodiments.

Turning now to exemplary FIGS. 60 and 61, a user sighting a remote object via device 27610 is illustrated, according to one or more embodiments. As shown in FIG. 60, user 5010, at a first position, may orient device 27610 to establish a sight line 3410 to a remote object 60010. As illustrated in FIG. 61, user 5010, at a second position (different from the first position), may orient device 27610 to establish a sight line 7410 to remote object 60010. In one or more embodiments, user 5010 and device 27610 may be moving at a first speed at the first position and may be moving at a second speed at the second position. In one example, the second speed may be different from the first speed. In another example, the second speed may be the first speed.

Figure 65:
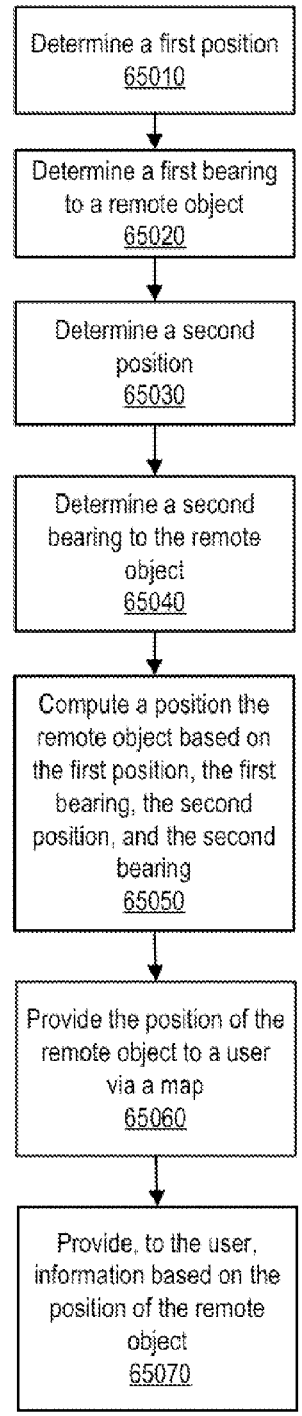
FIG. 65 provides an exemplary method of determining a position of a remote object and providing the position to a user via the map, according to one or more embodiments.

Turning now to FIG. 65, an exemplary method of determining a position of a remote object and providing the position to a user via the map is illustrated, according to one or more embodiments. At 65010, a first position may be determined. For example, a first position of device 27610, as illustrated in FIG. 60, may be determined via device 27610. At 65020, a first bearing to a remote object (e.g., object 60010 as shown in FIG. 60) may be determined. For example, device 27610 may determine the first bearing to the remote object. For instance, the bearing to the remote object may be associated with sight line 3410.

At 65030, a second position may be determined. For example, a second position of device 27610, as illustrated in FIG. 61, may be determined via device 27610. At 65040, a second bearing to the remote object (e.g., object 60010 as shown in FIG. 61) may be determined. For example, device 27610 may determine the second bearing to the remote object. For instance, the bearing to the remote object may be associated with sight line 7410. At 65050, a position of the remote object may be computed via the first position, the first bearing, the second position, and the second bearing. For example, device 27610 may compute the position of the remote object via the first position, the first bearing, the second position, and the second bearing.

Figure 62A:
FIG. 62A provides an exemplary illustration of providing a position of a remote object via a map, according to one or more embodiments.
Figure 62B:
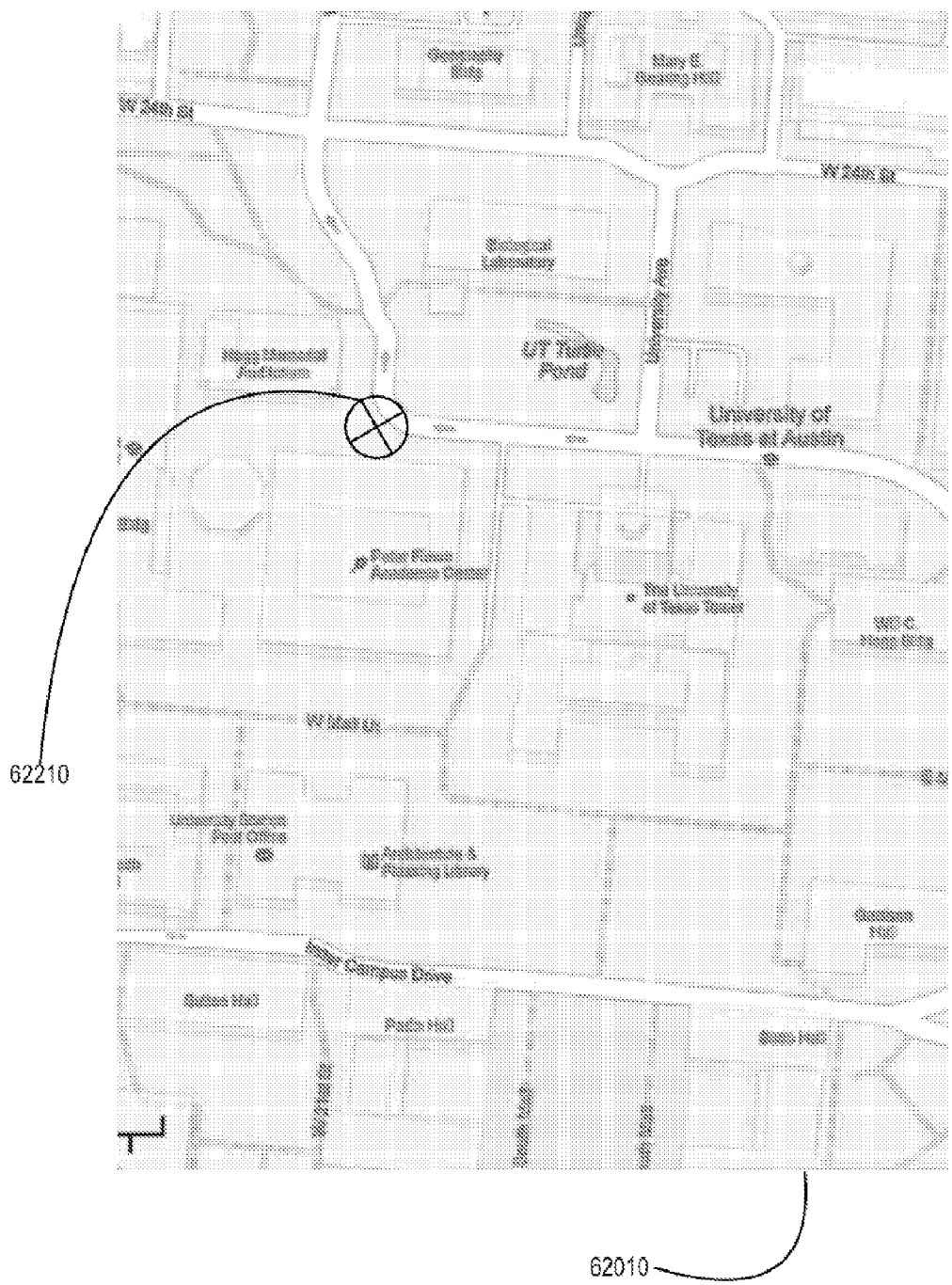
FIG. 62B provides an exemplary illustration of providing an estimated position of a remote object via a map, according to one or more embodiments.

At 65060, the position of the remote object may be provided to the user via a map. For example, device 27610 may provide the position of the remote object to the user via a map 62010, as illustrated in FIG. 62A. For instance, the position of the remote object (e.g., The University of Texas Tower) may be provided to the user via an icon 62110 via map 62010, as shown in FIG. 62A. In one or more embodiments, the position of the remote object may be an estimated position. In one example, the first position and the second position may be associated with, respectively, a first radius of uncertainty and a second radius of uncertainty. In another example, a digital compass may be associated with a resolution of one degree and/or with an uncertainty of plus or minus one half of a degree. For instance, the position (e.g., the estimated position) of the remote object may be provided to the user via an icon 62210 via map 62010, as shown in FIG. 62B. In one or more embodiments, an error of an estimated position may increase as the distance from the first or second positions to the remote object increases. For example, the estimated position of the remote object, as shown in FIG. 62B via icon 62210, may be due to the distance from the first or second positions to the remote object was several miles.

Figure 63:
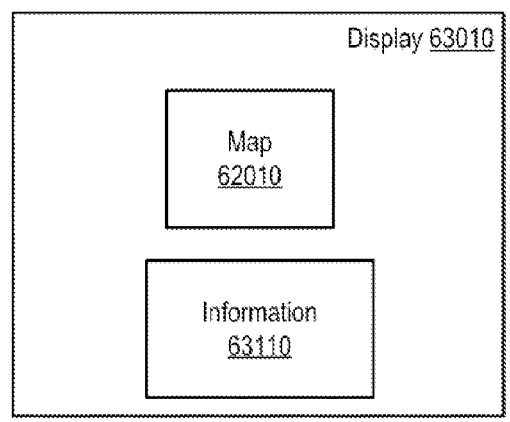
FIG. 63 provides an exemplary illustration of providing a map and information based on a position of a remote object via a display, according to one or more embodiments.

In one or more embodiments, the map may be provided to the user via a display. For example, map 62010 may be provided to the user via display 63010, as illustrated in FIG. 63. For instance, display 63010 (as shown in FIG. 63) may be or include display 27710 (of FIG. 27C) of device 27610.

At 65070 (of FIG. 65), information based on the position of the remote object may be provided to the user. For example, information 63110 may be provided to the user via display 63010, as illustrated in FIG. 63.

In one or more embodiments, device 27610 may include a mapping database that may be utilized to provide the position of the remote object to the user. In one or more embodiments, device 27610 may include an information database that may be utilized to provide, to the user, the information based on the position of the remote object. In one example, the information based on the position of the remote object may include information associated with one or more of a restaurant, a museum, a store, a goods provider, a service provider, a street, a café, a coffee shop, a bar, a hotel, an airport, a place to rent a vehicle (e.g., a car, a van, a bike, a sailboat, etc.), a convenient store, a library, a department store, a clothing store, a boutique, a concert, and a concert hall, among others. In a second example, the information based on the position of the remote object may include turn-by-turn directions to the position of the remote object. In another example, the information based on the position of the remote object may include advertising and/or promotion information associated with one or more of a restaurant, a museum, a store, a goods provider, a service provider, a street, a café, a coffee shop, a bar, a hotel, an airport, a place to rent a vehicle (e.g., a car, a van, a bike, a motor cycle, a motor scooter, a canoe, a sailboat, a motorboat, etc.), a convenient store, a library, a department store, a clothing store, a boutique, a concert, and a concert hall, among others. In one or more embodiments, information 63110 may include one or more of text, a graphic, a picture, a sound, sounds, a song, a motion picture, a video, and a message, among others.

Figure 64:
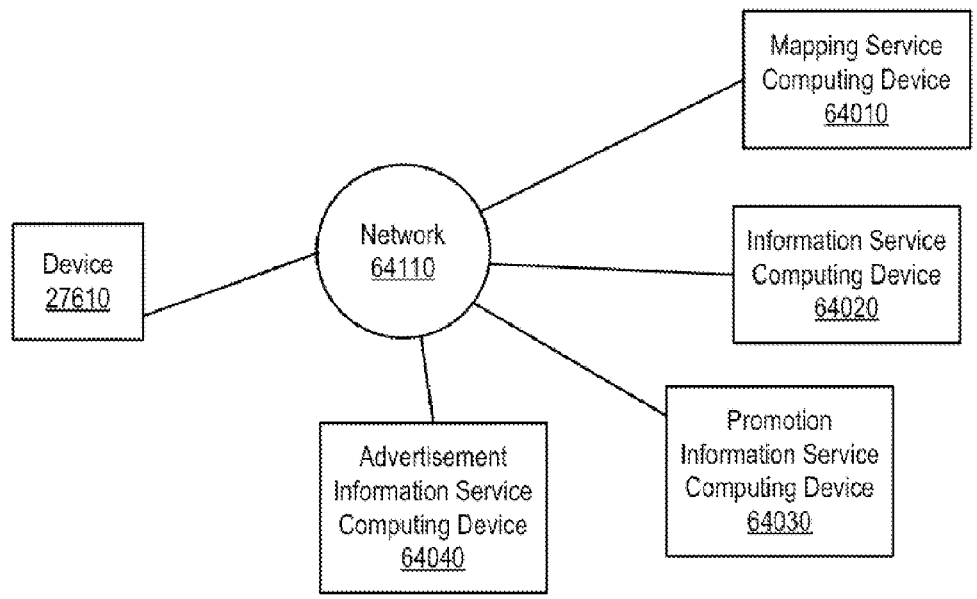
FIG. 64 provides an exemplary illustration of configuration of a mobile device and one or more service computing devices coupled to a network, according to one or more embodiments.

In one or more embodiments, the position of the remote object may be provided to one or more of a mapping service computing device, an information service computing device, an advertising service computing device, and a promotion service computing device, among others. For example, device 27610 may be coupled to a network 64110, as illustrated in FIG. 64, and may provide the position of the remote object to one or more of a mapping service computing device 64010, an information service computing device 64020, a promotion service computing device 64030, and an advertising service computing device 64040, among others, via network 64110. For instance, one or more of mapping service computing device 64010, information service computing device 64020, promotion service computing device 64030, and advertising service computing device 64040 may be coupled to network 64110.

In one or more embodiments, network 64110 may be or include a communications network. In one example, network 64110 may be or include multiple networks and/or may be coupled to one or more other networks. In one or more embodiments, network 64110 may be, include, or form part of a wide area network. For example, the wide area network may include one or more of a private wide area network, a corporate wide area network, and a public wide area network, among others. For instance, the public wide area network may be, include, or form part of an Internet. In one or more embodiments, network 64110 may be, include, or form part of a wireless network. In one or more embodiments, network 64110 may be, include, or form part of a wired (e.g., via cables including metal, cables including optical fibers, etc.) network.

In one or more embodiments, network 64110 may be or include a telecommunications network and/or a telephone network. In one example, network 64110 may be or include a wired telephone network. In a second example, network 64110 may be or include a wireless telephone network (e.g., a satellite telephone network, a cellular telephone network, etc.). In a third example, network 64110 may be or include a public switched telephone network. In a fourth example, network 64110 may be or include a packet switched telephone network. In another example, network 64110 may be or include a wired telephone network.

In one or more embodiments, device 27610 may receive one or more of mapping information via mapping service computing device 64010, information via information service computing device 64020, promotion information via promotion service computing device 64030, and advertising information via advertising service computing device 64040. For example, one or more of the mapping information, the information, the promotion information, the advertising information may be provided to the user via information 63110 via display 63010, as illustrated in FIG. 63.

Figure 66:
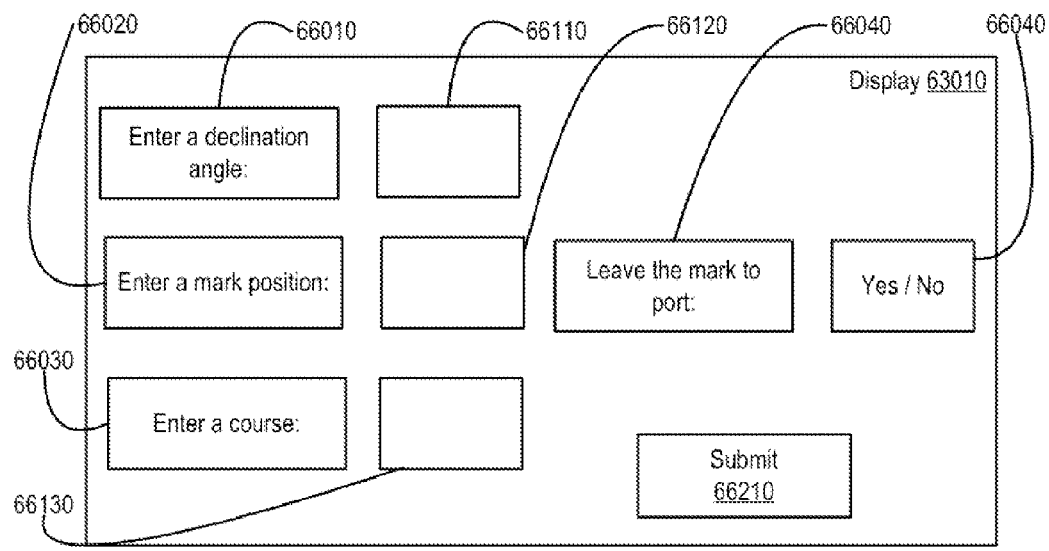
FIG. 66 provides an exemplary illustration of a display that displays information, according to one or more embodiments.

Turning now to FIG. 66, an exemplary display that displays information is illustrated, according to one or more embodiments. As illustrated, display 63010 may display information via information display areas 66010-66040. As shown, display 63010 may display input areas 66110-66140, where a user may input information. In one or more embodiments, the user may actuate submit button or icon 66210, when information is to be transferred. In one example, the information may be transferred to a storage and/or a memory. In another example, the information may be transferred to a computing device. For instance, the information may be transferred to device 10010.

In one or more embodiments, the information may be transferred to web server 13034 of device 10010. For example, display 63010 may display information via information display areas 66010-66040 and/or input areas 66110-66140 in accordance with a web page from web server 13034. In one or more embodiments, the information may be transferred to APP 13031 of device 10010. For example, display 63010 may display information via information display areas 66010-66040 and/or input areas 66110-66140 in accordance with APP 13031.

In one or more embodiments, wireless interface 13100 of device 10010 may include, be, or form part of a wireless access point (e.g., a WiFi access point). For example, device 27610 may include display 63010, and device 27610 may communicate with device 10010 via the wireless access point.

In one or more embodiments, a system and/or a device may be moving at a first speed at a first position and may be moving at a second speed at a second position when utilizing one or more methods and/or processes described herein. In one example, the second speed may be different from the first speed. In another example, the second speed may be the first speed.

In one or more embodiments, the term "memory" may mean a "memory device", a "memory medium", and/or "tangible computer readable storage medium". In one example, one or more of a "memory device", a "memory medium", and a "tangible computer readable storage medium" may include volatile storage such as random access memory (RAM), DRAM, Rambus RAM, SRAM, EDO RAM, etc. In another example, one or more of a "memory device", a "memory medium", and a "tangible computer readable storage medium" may include nonvolatile storage such as an EEPROM, an EPROM, flash memory, FRAM (ferroelectric random access memory), a DVD-ROM, a CD-ROM, a floppy disk, a magnetic tape, NVRAM, a magnetic media (e.g., a hard drive), optical storage, etc. In one or more embodiments, a memory medium may include one or more volatile storages and/or one or more nonvolatile storages.

In one or more embodiments, a system may include one or more devices. In one or more embodiments, a system may include one or more components of a device. In one or more embodiments, a device may include one or more microcontrollers and/or applications processors. In one or more embodiments, a device may be or include an electronic device, and/or a system may be or include an electronic system. In one or more embodiments, a computer, a computing device, and/or a computer system may be broadly characterized to include any device that includes a processing unit or processor that executes instructions from a memory. For example, a processor (e.g., a central processing unit or CPU) may execute instructions from a memory that stores the instructions which may include one or more software programs in accordance with one or more of processes, methods, and/or flowcharts described herein. In one instance, the processing unit and the memory, that stores the instructions which may include one or more software programs in accordance with one or more of processes, methods, and/or flowcharts described herein, may form one or more means for one or more functionalities described with references to one or more of processes, methods, and/or flowcharts described herein. In another instance, at least one of an ASIC and a FPGA may be configured in accordance with one or more of processes, methods, and/or flowcharts described herein, may form one or more means for one or more functionalities described with references to one or more of processes, methods, and/or flowcharts described herein.

In one or more embodiments, one or more of the method elements described herein and/or one or more portions of an implementation of an exemplary method element may be repeated, may be performed in varying orders, may be performed concurrently with one or more of the other method elements and/or one or more portions of an implementation of an exemplary method element, or may be omitted, according to one or more embodiments. For example, one or more methods may be repeated in computing multiple rotations, via multiple angles, about multiple positions.

In one or more embodiments, "determining" may be "computing". For example, a system and/or a device may perform "determining" via "computing". For instance, "computing" may include a processing unit executing instructions from a memory. In one or more embodiments, a position may mean position information and/or location information. For example, a position may mean position information and/or location information with reference to a coordinate system.

In one or more embodiments, concurrently may mean simultaneously. In one or more embodiments, concurrently may mean apparently simultaneously according to some metric. For example, two tasks (e.g., two processes, two threads, etc.) may be context switched such that such that they appear to be simultaneous to a human. In one instance, a first task of the two tasks may include a first method element and/or a first portion of a first method element. In a second instance, a second task of the two tasks may include a second method element and/or a first portion of a second method element. In another instance, a second task of the two tasks may include the first method element and/or a second portion of the first method element. Further, one or more of the system elements described herein may be omitted and additional system elements may be added as desired, according to one or more embodiments. Moreover, supplementary, additional, and/or duplicated method elements may be instantiated and/or performed as desired, according to one or more embodiments.

One or more modifications and/or alternatives of the embodiments described herein may be apparent to those skilled in the art in view of this description. Hence, descriptions of the embodiments, described herein, are to be taken and/or construed as illustrative and/or exemplary only and are for the purpose of teaching those skilled in the art the general manner of carrying out the embodiments describer herein. In one or more embodiments, one or more materials and/or elements may be swapped or substituted for those illustrated and described herein. In one or more embodiments, one or more parts, methods, and/or processes may be reversed, and/or certain one or more features of the described one or more embodiments may be utilized independently, as would be apparent to one skilled in the art after having the benefit of this description.

In one or more embodiments, a measure or a metric may include units of a coordinate system. In one example, the coordinate system may include a spherical coordinate system. For instance, first units of the coordinate system may include radians for measures of phi and theta, and second units of the coordinate system may include inches, feet, miles, kilometers, meters, centimeters, millimeters, nautical miles, nautical minutes, nautical seconds, etc. for rho. In another example, the coordinate system may include a Cartesian coordinate system. For instance, units of the Cartesian coordinate system may include inches, feet, miles, kilometers, meters, centimeters, millimeters, nautical miles, nautical minutes, nautical seconds, etc. In one or more embodiments, utilizing a pole (e.g., a geographic pole, a pole of a sphere, a pole of an ellipsoid, a pole of a geoid, etc.) may be associated with a vector. For example, the vector may be, include, and/or utilized as (0,0,1) or (0,0,−1) as express via a Cartesian coordinate system. For instance, including a pole in a computation may include utilizing the vector (e.g., (0,0,1) or (0,0,−1) as express via a Cartesian coordinate system) as the pole.

In one or more embodiments, a function may be implemented and/or approximated via a Taylor series. In one example, one or more trigonometric functions (e.g., sine, cosine, tangent, arcsine, arccosine, arctangent, etc.) may be implemented, estimated, and/or approximated via Taylor series. In another example, a square root function may be implemented and/or approximated via a Taylor series. In one or more embodiments, a sine function and/or a cosine function may be computed via a Cordic method and/or process. For example, a processing unit (e.g., a microcontroller, an ASIC, a FPGA, an application processor, etc.) may not include a floating point unit, and the processing unit that may not include a floating point unit may compute a sine function and/or a cosine function may be computed via a Cordic method and/or process.

In one or more embodiments, each of the terms "comprise" and "include" is open-ended. For instance, each of these terms does not foreclose additional structure, elements, and/or steps. In one or more embodiments, the term "based on" is utilized to describe one or more factors that affect a determination. This term may not foreclose additional factors that may affect a determination and/or a computation. In one instance, a determination and/or a computation may be solely based on those factors, or in another instance, a determination and/or a computation may be based, at least in part, on those factors.

In one or more embodiments, "configured to" may be utilized to describe that a device, a circuit, a system that stores instructions executable via a processing unit, or other component may perform one or more tasks. In one or more embodiments, a device, a circuit, a system that stores instructions executable via a processing unit, or other component may be said to be configured to perform a task when the device, the circuit, the system that stores instructions executable via the processing unit, or the other component is not currently in operation.

In one or more embodiments, enumerations (e.g., first, second, third, etc.) may be utilized, herein, to identify two or more elements, where the enumerations do not apply and/or necessitate an ordering (e.g., spatial, temporal, logical, stepwise, etc.). In one example, enumerations may be utilized, herein, to differentiate two or more elements. For instance, a first element and a second element may be utilized to describe different elements. In another example, enumerations may be utilized, herein, to identify same elements. For instance, a first element and a second element may be utilized to describe a same element. In one or more embodiments, terms are used in this disclosure in a singular fashion shall be deemed to include the plural when applicable, and when used herein in the plural to include the singular when applicable.

I claim:

1. A system, comprising:
a position device;
a processor coupled to the position device; and
a memory device coupled to the processor, wherein the memory device stores instructions that are executable by the processor;
wherein the position device:
receives multiple location signals, via at least one antenna coupled to the position device;
determines a first position and a second position, different from the first position, via computing the first position, based on a first location of the at least one antenna and the multiple location signals, and computing the second position, based on a second location of the at least one antenna and the multiple location signals, wherein the second location of the at least one antenna is different from the first location of the at least one antenna; and
provides the first position and the second position to the processor; and
wherein, as the processor executes the instructions, the processor:
receives the first position and the second position from the position device;
determines, at the first position, a first bearing to a remote object at a remote object position, different from the first position and different from the second position, via an electronic bearing device that computes the first bearing, wherein the processor is configured to be coupled to the electronic bearing device;
determines, at the second position, a second bearing, different from the first bearing, to the remote object at the remote object position via the electronic bearing device that computes the second bearing;
computes a first rotation, by the first bearing, of a first vector associated with the first position;
computes a second rotation, by the second bearing, of a second vector associated with the second position;
computes the remote object position based on the first rotation, by the first bearing, of the first vector and the second rotation, by the second bearing, of the second vector; and
provides, via a display, information based on the remote object position.

2. The system of claim 1,
wherein when the processor computes the remote object position based on the first rotation, by the first bearing, of the first vector and the second rotation, by the second bearing, of the second vector, the processor computes an intersection of a first plane and a second plane, different from the first plane;
wherein the first plane includes the first position and the remote object position;
wherein the second plane includes the second position and the remote object position; and
wherein the intersection of the first plane and the second plane indicates the remote object position.

3. The system of claim 1, wherein the processor further:
computes, utilizing the first position, a first plane, wherein the first plane is normal to the first vector and the first plane initially includes the first position, a geographic pole, and an origin; and
computes, utilizing the second position, a second plane, wherein the second plane is normal to the second vector and the second plane initially includes the second position, the geographic pole, and the origin;
wherein when the processor computes the first rotation, by the first bearing, of the first vector associated with the first position, the processor computes a rotation of the first plane about the first position by the first bearing such that the first plane no longer includes the geographic pole and includes the first position, the origin, and the remote object position;
wherein when the processor computes the second rotation, by the second bearing, of the second vector associated with the second position, the processor computes a rotation of the second plane about the second position by the second bearing such that the second plane no longer includes the geographic pole and includes the second position, the origin, and the remote object position; and
wherein when the processor computes the remote object position based on the first rotation, by the first bearing, of the first vector and the second rotation, by the second bearing, of the second vector, the processor computes an intersection of the first plane and the second plane.

4. The system of claim 1,
wherein when the processor computes the first rotation, by the first bearing, of the first vector associated with the first position the processor:
computes a first quaternion, utilizing the first position and the first bearing;
computes a second quaternion, utilizing the first vector;
computes an inverse of the first quaternion as a third quaternion; and
computes a first quaternion multiplication of the first quaternion, the second quaternion, and the third quaternion; and
wherein when the processor computes the second rotation, by the second bearing, of the second vector associated with the second position includes:
computes a fourth quaternion, utilizing the second position and the second bearing;
computes a fifth quaternion, utilizing the second vector;
computes an inverse of the fourth quaternion as a sixth quaternion; and
computes a second quaternion multiplication of the fourth quaternion, the fifth quaternion, and the sixth quaternion.

5. The system of claim 1,
wherein the first rotation, by the first bearing, of the first vector is associated with a third vector;
wherein the second rotation, by the second bearing, of the second vector is associated with a fourth vector;
wherein when the processor computes the remote object position based on the first rotation, by the first bearing, of the first vector and the second rotation, by the second bearing, of the second vector, the processor computes a cross product of the third vector and the fourth vector, wherein the cross product indicates the remote object position.

6. The system of claim 5, wherein the processor further:
computes, utilizing the first position, the first vector normal to the first position, an origin, and a geographic pole; and
computes, utilizing the second position, the second vector normal to the second position, the origin, and the geographic pole;
wherein when the processor computes the first rotation, by the first bearing, of the first vector associated with the first position, the processor computes a first transform of the first vector into the third vector, wherein the processor computes the first rotation of the first vector about the first position by the first bearing; and
wherein when the processor computes the second rotation, by the second bearing, of the second vector associated with the second position, the processor computes a second transform of the second vector into the fourth vector, wherein the processor computes the second rotation of the second vector about the second position by the second bearing.

7. The system of claim 1, further comprising:
the electronic bearing device;
wherein the electronic bearing device is coupled to the processor;
wherein the electronic bearing device computes the first bearing via a first transform of a magnetic field and a first orientation of the electronic bearing device within the magnetic field into a first machine readable signal;
wherein the electronic bearing device provides the first bearing to the processor via the first machine readable signal;
wherein the electronic bearing device computes the second bearing via a second transform of the magnetic field and a second orientation, different from the first orientation, of the electronic bearing device within the magnetic field into a second machine readable signal, different from the first machine readable signal; and
wherein the electronic bearing device provides the second bearing to the processor via the second machine readable signal.

8. The system of claim 7,
wherein the electronic bearing device includes a plurality of magnetic field sensor devices;
wherein the electronic bearing device computes the first bearing via the first transform of the magnetic field and the first orientation of the electronic bearing device within the magnetic field into the first machine readable signal via the plurality of magnetic field sensor devices; and
wherein the electronic bearing device computes the second bearing via the second transform of the magnetic field and the second orientation, different from the first orientation, of the electronic bearing device within the magnetic field into the second machine readable signal, different from the first machine readable signal, via the plurality of magnetic field sensor devices.

9. The system of claim 8, wherein the plurality of magnetic field sensor devices includes a plurality of magnetometers.

10. The system of claim 1,
wherein when the position device determines the first position and the second position, different from the first position, via computing the first position, based on the first location of the at least one antenna and the multiple location signals, computing the second position, based on the second location of the at least one antenna and the multiple location signals, the position device:
computes the first position while the at least one antenna is moving at a first speed; and
computes the second position while the at least one antenna is moving at a second speed;
wherein the processor determines, at the first position, the first bearing to the remote object at the remote object position via the electronic bearing device that computes the first bearing occurs at the first speed;
wherein the processor determines, at the second position, the second bearing, different from the first bearing, to the remote object at the remote object position via the electronic bearing device that computes the second bearing occurs at the second speed.

11. The system of claim 10, wherein the second speed is the first speed.

12. The system of claim 1, wherein the position device includes a global position system (GPS) receiver device.

13. The system of claim 1, further comprising:
the display;
wherein the display is coupled to the processor; and
wherein the display displays the information based on the remote object position.

14. The system of claim 1,
wherein the position device includes the at least one antenna.

15. The system of claim 1,
wherein when the processor determines, at the first position, the first bearing to the remote object at the remote object position, different from the first position and different from the second position, via the electronic bearing device that computes the first bearing, the processor performs at least one of adding a declination angle and subtracting the declination angle; and
wherein when the processor determines, at the second position, the second bearing, different from the first bearing, to the remote object at the remote object position via the electronic bearing device that computes the second bearing, the processor performs at least one of adding the declination angle and subtracting the declination angle.

16. A processor-implemented method, comprising:
determining a first position and a second position, different from the first position, via an electronic position device, coupled to at least one antenna, that receives multiple location signals via the at least one antenna and computes the first position and the second position based on the multiple location signals and a first location of the at least one antenna and a second location, different from the first location, of the at least one antenna;
determining, at the first position, a first bearing to a remote object at a remote object position, different from the first position and different from the second position, via an electronic bearing device that computes the first bearing;
determining, at the second position, a second bearing, different from the first bearing, to the remote object at the remote object position via the electronic bearing device that computes the second bearing;
computing a first rotation, by the first bearing, of a first vector associated with the first position;
computing a second rotation, by the second bearing, of a second vector associated with the second position;
computing the remote object position based on the first rotation, by the first bearing, of the first vector and the second rotation, by the second bearing, of the second vector; and
providing, via a display, information based on the remote object positioning.

17. The method of claim 16,
wherein said computing the remote object position based on the first rotation, by the first bearing, of the first vector and the second rotation, by the second bearing, of the second vector includes computing an intersection of a first plane and a second plane, different from the first plane;
wherein the first plane includes the first position and the remote object position;
wherein the second plane includes the second position and the remote object position; and
wherein the intersection of the first plane and the second plane indicates the remote object position.

18. The method of claim 17, wherein said computing the intersection of the first plane and the second plane includes computing a cross product of a third vector associated with the first plane and a fourth vector, different from the third vector, associated with the second plane.

19. The method of claim 16, further comprising:
computing, utilizing the first position, a first plane, wherein the first plane is normal to the first vector and the first plane initially includes the first position, a geographic pole, and an origin; and
computing, utilizing the second position, a second plane, wherein the second plane is normal to the second vector and the second plane initially includes the second position, the geographic pole, and the origin;
wherein said computing the first rotation, by the first bearing, of the first vector associated with the first position includes computing a rotation of the first plane about the first position by the first bearing such that the first plane no longer includes the geographic pole and includes the first position, the origin, and the remote object position;
wherein said computing the second rotation, by the second bearing, of the second vector associated with the second position includes computing a rotation of the second plane about the second position by the second bearing such that the second plane no longer includes the geographic pole and includes the second position, the origin, and the remote object position; and
wherein said computing the remote object position based on the first rotation, by the first bearing, of the first vector and the second rotation, by the second bearing, of the second vector includes computing an intersection of the first plane and the second plane.

20. The method of claim 16,
wherein said computing the first rotation, by the first bearing, of the first vector associated with the first position includes utilizing a first rotation matrix based on the first position and the first bearing; and
wherein said computing the second rotation, by the second bearing, of the second vector associated with the second position includes utilizing a second rotation matrix based on the second position and the second bearing.

21. The method of claim 16,
wherein said computing the first rotation, by the first bearing, of the first vector associated with the first position includes:
computing a first quaternion, utilizing the first position and the first bearing;
computing a second quaternion, utilizing the first vector;
computing an inverse of the first quaternion as a third quaternion; and
computing a first quaternion multiplication of the first quaternion, the second quaternion, and the third quaternion; and
wherein said computing the second rotation, by the second bearing, of the second vector associated with the second position includes:
computing a fourth quaternion, utilizing the second position and the second bearing;
computing a fifth quaternion, utilizing the second vector;
computing an inverse of the fourth quaternion as a sixth quaternion; and
computing a second quaternion multiplication of the fourth quaternion, the fifth quaternion, and the sixth quaternion.

22. The method of claim 16,
wherein the first rotation, by the first bearing, of the first vector is associated with a third vector;
wherein the second rotation, by the second bearing, of the second vector is associated with a fourth vector;
wherein said computing the remote object position based on the first rotation, by the first bearing, of the first vector and the second rotation, by the second bearing, of the second vector includes computing a cross product of the third vector and the fourth vector; and
wherein the cross product indicates the remote object position.

23. The method of claim 22, further comprising:
computing, utilizing the first position, the first vector normal to the first position, an origin, and a geographic pole; and
computing, utilizing the second position, the second vector normal to the second position, the origin, and the geographic pole;
wherein said computing the first rotation, by the first bearing, of the first vector associated with the first position includes computing a first transform of the first vector into the third vector via computing the first rotation of the first vector about the first position by the first bearing; and
wherein said computing the second rotation, by the second bearing, of the second vector associated with the second position includes computing a second transform of the second vector into the fourth vector via computing the second rotation of the second vector about the second position by the second bearing.

24. The method of claim 16,
wherein the electronic bearing device computes the first bearing via transforming a magnetic field and a first orientation of the electronic bearing device within the magnetic field into a first machine readable signal; and
wherein the electronic bearing device computes the second bearing via transforming the magnetic field and a second orientation, different from the first orientation, of the electronic bearing device within the magnetic field into a second machine readable signal, different from the first machine readable signal.

25. The method of claim 16,
wherein said determining the first position and the second position via the electronic position device includes receiving the first position and the second position from the electronic position device.

26. The method of claim 16,
wherein said determining the first position and the second position, different from the first position, via the electronic position device that receives the multiple location signals via the at least one antenna and computes the first position and the second position based on the multiple location signals and the first location of the at least one antenna and the second location, different from the first location, of the at least one antenna includes:
the electronic position device computing the first position via receiving a first portion of the multiple location signals via the at least one antenna at the first location and computing the first location of the at least one antenna via the first portion of the multiple location signals; and the electronic position device computing the second position via receiving a second portion of the multiple location signals via the at least one antenna at the second location and computing the second location of the at least one antenna via the second portion of the multiple location signals.

27. The method of claim 16,
wherein said determining, at the first position, the first bearing to the remote object at the remote object position via the electronic bearing device that computes the first bearing includes receiving the first bearing from the electronic bearing device; and
wherein said determining, at the second position, the second bearing, different from the first bearing, to the remote object at the remote object position via the electronic bearing device that computes the second bearing includes receiving the second bearing from the electronic bearing device.

28. The method of claim 16,
wherein said determining the first position and the second position, different from the first position, via the electronic position device, coupled to the at least one antenna, that receives the multiple location signals via the at least one antenna and computes the first position and the second position based on the multiple location signals and the first location of the at least one antenna and the second location, different from the first location, of the at least one antenna includes:
determining the first position while the at least one antenna is moving at a first speed; and
determining the second position while the at least one antenna is moving at a second speed;
wherein said determining, at the first position, the first bearing to the remote object at the remote object position via the electronic bearing device that computes the first bearing occurs at the first speed; and
wherein said determining, at the second position, the second bearing, different from the first bearing, to the remote object at the remote object position via the electronic bearing device that computes the second bearing occurs at the second speed.

29. The method of claim 28, wherein the second speed is the first speed.

30. The method of claim 16,
wherein said determining, at the first position, the first bearing to the remote object at the remote object position via the electronic bearing device that computes the first bearing includes computing the first bearing via performing at least one of adding a declination angle and subtracting the declination angle; and
wherein said determining, at the second position, the second bearing, different from the first bearing, to the remote object at the remote object position via the electronic bearing device that computes the second bearing includes computing the second bearing via performing at least one of adding the declination angle and subtracting the declination angle.

31. The method of claim 16, wherein the position device includes a global position system (GPS) receiver device that receives the multiple location signals and computes the first position and the second position based on the multiple location signals and the first location of the at least one antenna and the second location, different from the first location, of the at least one antenna.

32. The method of claim 16,
wherein the electronic bearing device includes a digital compass;
wherein the digital compass computes the first bearing via transforming a magnetic field and a first orientation of the electronic bearing device within the magnetic field into a first machine readable signal; and
wherein the digital compass computes the second bearing via transforming the magnetic field and a second orientation, different from the first orientation, of the electronic bearing device within the magnetic field into a second machine readable signal, different from the first machine readable signal.

33. The method of claim 16,
wherein the electronic bearing device includes a plurality of magnetic field sensing devices;
wherein the electronic bearing device computes the first bearing via transforming a magnetic field and a first orientation of the electronic bearing device within the magnetic field into a first machine readable signal via the plurality of magnetic field sensing devices; and
wherein the electronic bearing device computes the second bearing via transforming the magnetic field and a second orientation, different from the first orientation, of the electronic bearing device within the magnetic field into a second machine readable signal, different from the first machine readable signal, via the plurality of magnetic field sensing devices.

34. The method of claim 33, wherein the plurality of magnetic field sensing devices includes a plurality of magnetometers.

35. A non-transitory computer readable memory device that stores instructions, which when executed by a processor, the processor:
determines a first position and a second position, different from the first position, via an electronic position device, coupled to at least one antenna and coupled to the processor, that receives multiple location signals via the at least one antenna and computes the first position and the second position based on the multiple location signals and a first location of the at least one antenna and a second location, different from the first location, of the at least one antenna;
determines, at the first position, a first bearing to a remote object at a remote object position via an electronic bearing device, coupled to the processor, that computes the first bearing;
determines, at the second position, a second bearing, different from the first bearing, to the remote object at the remote object position via the electronic bearing device that computes the second bearing;
computes a first rotation, by the first bearing, of a first vector associated with the first position;
computes a second rotation, by the second bearing, of a second vector associated with the second position;
computes the remote object position based on the first rotation, by the first bearing, of the first vector and the second rotation, by the second bearing, of the second vector; and
provides, via a display, information based on the remote object position.

36. The non-transitory computer readable memory device of claim 35, wherein when the processor computes the remote object position based on the first rotation, by the first bearing, of the first vector and the second rotation, by the second bearing, of the second vector, the processor computes an intersection of a first plane and a second plane, different from the first plane;

wherein the first plane includes the first position and the remote object position;

wherein the second plane includes the second position and the remote object position; and wherein the intersection of the first plane and the second plane indicates the remote object position.

37. The non-transitory computer readable memory device of claim 35, wherein the processor further:

computes, utilizing the first position, a first plane, wherein the first plane is normal to the first vector and the first plane initially includes the first position, a geographic pole, and an origin; and computes, utilizing the second position, a second plane, wherein the second plane is normal to the second vector and the second plane initially includes the second position, the geographic pole, and the origin;

wherein when the processor computes the first rotation, by the first bearing, of the first vector associated with the first position, the processor computes a rotation of the first plane about the first position by the first bearing such that the first plane no longer includes the geographic pole and includes the first position, the origin, and the remote object position;

wherein when the processor computes the second rotation, by the second bearing, of the second vector associated with the second position, the processor computes a rotation of the second plane about the second position by the second bearing such that the second plane no longer includes the geographic pole and includes the second position, the origin, and the remote object position; and wherein when the processor computes the remote object position based on the first rotation, by the first bearing, of the first vector and the second rotation, by the second bearing, of the second vector, the processor computes an intersection of the first plane and the second plane.

38. The non-transitory computer readable memory device of claim 35, wherein the first rotation, by the first bearing, of the first vector is associated with a third vector;

wherein the second rotation, by the second bearing, of the second vector is associated with a fourth vector;

wherein when the processor computes the remote object position based on the first rotation, by the first bearing, of the first vector and the second rotation, by the second bearing, of the second vector, the processor computes a cross product of the third vector and the fourth vector, wherein the cross product indicates the remote object position.

39. The non-transitory computer readable memory device of claim 38, wherein the processor further:

computes, utilizing the first position, the first vector normal to the first position, an origin, and a geographic pole; and computes, utilizing the second position, the second vector normal to the second position, the origin, and the geographic pole;

wherein when the processor computes the first rotation, by the first bearing, of the first vector associated with the first position, the processor computes a first transform of the first vector into the third vector, wherein the processor computes the first rotation of the first vector about the first position by the first bearing; and wherein when the processor computes the second rotation, by the second bearing, of the second vector associated with the second position, the processor computes a second transform of the second vector into the fourth vector, wherein the processor computes the second rotation of the second vector about the second position by the second bearing.

40. The non-transitory computer readable memory device of claim 35, wherein when the processor determines the first position and the second position, different from the first position, via the electronic position device, coupled to the at least one antenna and coupled to the processor, that receives the multiple location signals via the at least one antenna and computes the first position and the second position based on the multiple location signals and the first location of the at least one antenna and the second location, different from the first location, of the at least one antenna, the processor determines the first position while the at least one antenna is moving at a first speed; and wherein the processor determines, at the first position, the first bearing to the remote object at the remote object position via the electronic bearing device that computes the first bearing occurs at the first speed.

41. The non-transitory computer readable memory device of claim 40, wherein when the processor determines the first position and the second position, different from the first position, via the electronic position device, coupled to the at least one antenna and coupled to the processor, that receives the multiple location signals via the at least one antenna and computes the first position and the second position based on the multiple location signals and the first location of the at least one antenna and the second location, different from the first location, of the at least one antenna, the processor determines the second position while the at least one antenna is moving at a second speed; and wherein the processor determines, at the second position, the second bearing, different from the first bearing, to the remote object at the remote object position via the electronic bearing device that computes the second bearing at the second speed.

42. The non-transitory computer readable memory device of claim 41, wherein the second speed is the first speed.

43. The non-transitory computer readable memory device of claim 35, wherein the position device includes a global position system (GPS) receiver device.

44. The non-transitory computer readable memory device of claim 35, wherein when the processor determines, at the first position, a first bearing to a remote object at the remote object position via the electronic bearing device, coupled to the processor, that computes the first bearing, the processor performs at least one of adding a declination angle and subtracting the declination angle; and wherein when the processor determines, at the second position, the second bearing, different from the first bearing, to the remote object at the remote object position via the electronic bearing device that computes the second bearing, the processor performs at least one of adding the declination angle and subtracting the declination angle.

* * * * *